US012135523B2

(12) United States Patent
Itabashi et al.

(10) Patent No.: US 12,135,523 B2
(45) **Date of Patent: *Nov. 5, 2024**

(54) DEVELOPING CARTRIDGE

(71) Applicant: BROTHER KOGYO KABUSHIKI KAISHA, Nagoya (JP)

(72) Inventors: Nao Itabashi, Nagoya (JP); Junichi Yokoi, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/482,118

(22) Filed: Oct. 6, 2023

(65) Prior Publication Data

US 2024/0027952 A1 Jan. 25, 2024

Related U.S. Application Data

(63) Continuation of application No. 17/689,186, filed on Mar. 8, 2022, which is a continuation of application (Continued)

(30) Foreign Application Priority Data

Dec. 25, 2015 (JP) ................................ 2015-254202

(51) Int. Cl.
*G03G 15/08* (2006.01)
*G03G 21/16* (2006.01)

(52) U.S. Cl.
CPC ..... *G03G 21/1652* (2013.01); *G03G 15/0863* (2013.01); *G03G 15/0875* (2013.01); *G03G 2221/1684* (2013.01)

(58) Field of Classification Search
CPC ......... G03G 2221/166; G03G 21/1885; G03G 21/1878; G03G 21/1875; G03G 21/1871;
(Continued)

(56) References Cited

U.S. PATENT DOCUMENTS 5,250,382 A 10/1993 Shimojo et al.
5,878,309 A 3/1999 Nomura
(Continued)

FOREIGN PATENT DOCUMENTS

CA 3 008 767 C 6/2017
CN 1081350 C 3/2002
(Continued)

OTHER PUBLICATIONS

Sep. 5, 2017—(EP) Office Communication—App 16185121.7.
(Continued)

*Primary Examiner* — Sevan A Aydin
(74) *Attorney, Agent, or Firm* — Merchant & Gould P.C.

(57) ABSTRACT

A developing cartridge may include: a casing to accommodate developer; a storage medium including an electric contact surface; an elastic member extending in a first direction crossing the electric contact surface, and configured to be compressed or stretched in the first direction between a first state and a second state; and a holder including an outer surface positioned toward a side of the holder in the first direction, the electric contact surface positioned at the outer surface, and movable between first and second positions in the first direction relative to the casing. A length of the elastic member in the first direction is greater in the first state than in the second state. The electric contact surface is in the first position when the elastic member is in the first state, and the electric contact surface is in the second position when the elastic member is in the second state.

17 Claims, 35 Drawing Sheets

Related U.S. Application Data

No. 17/380,347, filed on Jul. 20, 2021, now Pat. No. 11,275,337, which is a continuation of application No. 17/015,185, filed on Sep. 9, 2020, now Pat. No. 11,073,786, which is a continuation of application No. 16/272,095, filed on Feb. 11, 2019, now Pat. No. 10,782,644, which is a continuation of application No. 16/030,985, filed on Jul. 10, 2018, now Pat. No. 10,203,651, which is a continuation of application No. 15/280,679, filed on Sep. 29, 2016, now Pat. No. 10,031,472.

(58) Field of Classification Search
CPC ............... G03G 21/1867; G03G 15/80; G03G 21/1652; G03G 15/0863
See application file for complete search history.

(56) References Cited

U.S. PATENT DOCUMENTS

| | | | | |
|---|---|---|---|---|
| 6,128,452 | A | 10/2000 | Miyabe | |
| 6,934,485 | B2 | 8/2005 | Miyabe | |
| 8,503,907 | B2 | 8/2013 | Ji | |
| 11,275,337 | B2 * | 3/2022 | Itabashi | G03G 15/0863 |
| 11,860,568 | B2 * | 1/2024 | Itabashi | G03G 15/0863 |
| 2003/0170042 | A1 | 9/2003 | Okamoto et al. | |
| 2005/0185980 | A1 | 8/2005 | Okamoto | |
| 2006/0159483 | A1 | 7/2006 | Yokoi | |
| 2007/0077083 | A1 | 4/2007 | Yokoi | |
| 2008/0159774 | A1 | 7/2008 | Tanabe et al. | |
| 2008/0212996 | A1 | 9/2008 | Yokoi | |
| 2008/0310881 | A1 | 12/2008 | Sato | |
| 2010/0054796 | A1 | 3/2010 | Nakamura | |
| 2010/0221036 | A1 | 9/2010 | Hara et al. | |
| 2011/0064457 | A1 | 3/2011 | Okabe et al. | |
| 2011/0064480 | A1 | 3/2011 | Nakasone | |
| 2011/0129252 | A1 | 6/2011 | Oda et al. | |
| 2011/0158685 | A1 | 6/2011 | Takagi et al. | |
| 2012/0200871 | A1 | 8/2012 | Takahashi et al. | |
| 2013/0051849 | A1 | 2/2013 | Itabashi et al. | |
| 2013/0183058 | A1 | 7/2013 | Won | |
| 2014/0099143 | A1 | 4/2014 | Oda et al. | |
| 2014/0205314 | A1 | 7/2014 | Chang | |
| 2014/0212151 | A1 | 7/2014 | Oda | |
| 2014/0341602 | A1 | 11/2014 | Takahashi et al. | |
| 2015/0037059 | A1 | 2/2015 | Yang et al. | |
| 2015/0037060 | A1 | 2/2015 | Hamaya | |
| 2015/0118890 | A1 | 4/2015 | Oshikawa | |
| 2015/0205254 | A1 | 7/2015 | Fujii et al. | |
| 2015/0212482 | A1 | 7/2015 | Wakimoto | |
| 2015/0261177 | A1 | 9/2015 | Moon et al. | |
| 2017/0003645 | A1 | 1/2017 | Kawakami | |
| 2017/0184998 | A1 | 6/2017 | Itabashi | |
| 2017/0185001 | A1 | 6/2017 | Itabashi et al. | |
| 2017/0185032 | A1 | 6/2017 | Itabashi et al. | |

FOREIGN PATENT DOCUMENTS

| | | | |
|---|---|---|---|
| CN | 1428668 | A | 7/2003 |
| CN | 1503070 | A | 6/2004 |
| CN | 101256388 | A | 9/2008 |
| CN | 102023523 | A | 4/2011 |
| CN | 103645621 | A | 3/2014 |
| CN | 104704430 | A | 6/2015 |
| CN | 106919026 | A | 7/2017 |
| CN | 106919026 | B | 6/2021 |
| DE | 691 26 415 | T2 | 10/1997 |
| JP | 4-4488 | A | 1/1992 |
| JP | 5-66682 | A | 3/1993 |
| JP | 9-43925 | A | 2/1997 |
| JP | 9-43927 | A | 2/1997 |
| JP | 2001-356600 | A | 12/2001 |
| JP | 2003243104 | A | 8/2003 |
| JP | 2003-257522 | A | 9/2003 |
| JP | 2003-330335 | A | 11/2003 |
| JP | 2004-61596 | A | 2/2004 |
| JP | 2004-86058 | A | 3/2004 |
| JP | 2004-252124 | A | 9/2004 |
| JP | 2008-165026 | A | 7/2008 |
| JP | 2008-185971 | A | 8/2008 |
| JP | 2008242085 | A | 10/2008 |
| JP | 2008-276138 | A | 11/2008 |
| JP | 2010-79262 | A | 4/2010 |
| JP | 2010-107679 | A | 5/2010 |
| JP | 2010-217689 | A | 9/2010 |
| JP | 3167174 | U | 3/2011 |
| JP | 2011059510 | A | 3/2011 |
| JP | 2011-118119 | A | 6/2011 |
| JP | 2012-61707 | A | 3/2012 |
| JP | 2012-234190 | A | 11/2012 |
| JP | 2013-29717 | A | 2/2013 |
| JP | 2013054058 | A | 3/2013 |
| JP | 2014-228609 | A | 12/2014 |
| JP | 3196279 | U | 2/2015 |
| JP | 2015-108802 | A | 6/2015 |
| JP | 2016-118625 | A | 6/2016 |

OTHER PUBLICATIONS

Sep. 6, 2017—(EP) Extended Search Report—App 17172620.1.
Extended European Search Report issued in related European Patent Application No. 18166158.8, Aug. 7, 2018.
Office Action issued in related European Patent Application No. 17 172 620.1, Aug. 6, 2018.
Office Action issued in related European Patent Application No. 18166158.8, Feb. 28, 2019.
International Search Report and Written Opinion issued in related International Patent Application No. PCT/JP2016/075015, mailed Nov. 22, 2016.
International Preliminary Report on Patentability issued in related International Patent Application No. PCT/JP2016/075015, mailed Jul. 5, 2018.
Office Action issued in related Australian Patent Application No. 2016376403, Jan. 7, 2019.
Office Action issued in related Canadian Patent Application No. 3,009,594, Apr. 30, 2019.
First Examination Report issued in related New Zealand Patent Application No. 743912, Nov. 6, 2018.
Office Action (Notification of Reason for Refusal) issued in related Korean Patent Application No. 10-2018-7021298, May 27, 2019.
Office Action issued in corresponding Canadian Patent Application No. 3,009,594, Apr. 28, 2020.
Extended European Search Report issued in corresponding European Patent Application No. 20151506.1, May 6, 2020.
Extended European Search Report issued in corresponding European Patent Application No. 20151527.7, May 13, 2020.
Notification of First Office Action issued in corresponding Chinese Patent Application No. 201611175969.8, May 28, 2020.
Office Action issued in corresponding European Patent Application No. 20 151 506.1, Jul. 23, 2020.
Notification of Second Office Action issued in corresponding Chinese Patent Application No. 201611175969.8, Oct. 23, 2020.
Office Action issued in corresponding European patent application No. 20151506.1, Jan. 27, 2021.
Office Action issued in related Japanese Patent Application No. 2019-169641, Dec. 22, 2020.
Canadian Office Action issued in corresponding Canadian Patent Application No. 3,009,594, mailed Sep. 7, 2021.
Extended European Search Report issued in corresponding European Patent Application No. 22153122.1, mailed May 3, 2022.
Office Action issued in corresponding Canadian Patent Application No. 3,009,594, mailed Jul. 22, 2022.
Office Action issued in corresponding Canadian Patent Application No. 3,139, 160, mailed Jan. 23, 2023.
Office Action issued in corresponding Canadian Patent Application No. 3,009,594, mailed Mar. 24, 2023.
Office Action issued in corresponding Japanese Patent Application No. 2022-132887, Jul. 4, 2023.

(56) References Cited

OTHER PUBLICATIONS

Office Action issued in corresponding Chinese Patent Application No. 202110538337.8 on Jul. 15, 2023.
Office Action issued in corresponding Chinese Patent Application No. 202110537629.X on Jul. 29, 2023.
Office Action issued in corresponding Chinese Patent Application No. 202110542956.4 on Jul. 31, 2023.
Office Action issued in corresponding Chinese Patent Application No. 202110531347.9 on Aug. 3, 2023.
Office Action issued in related Chinese application No. 202110544266.2, Oct. 31, 2023.
Office Action issued in corresponding Chinese application No. 202110537629.X, Feb. 22, 2024.
Office Action issued in corresponding Chinese application No. 202110538337.8, Feb. 3, 2024.
Office Action issued in corresponding Chinese application No. 2202110537629.X, Feb. 22, 2024.
Office Action issued in corresponding Canadian Patent Application No. 3,139,160, Jan. 31, 2024.
Office Action issued in corresponding Chinese application 202110538337.8, Jun. 13, 2024.
Office Action issued in corresponding Chinese application 202110531347.9, Apr. 20, 2024.
Office Action issued in corresponding Chinese application 202110537629.X, Jul. 1, 2024.
Office Action issued in corresponding Japanese application 2023-206263, Jul. 9, 2024.
Office Action issued in corresponding Chinese application No. 202110537629.X, Sep. 11, 2024.

* cited by examiner

DEVELOPING CARTRIDGE

CROSS-REFERENCE TO RELATED APPLICATION

This application is a continuation of U.S. patent application Ser. No. 17/689,186, filed Mar. 8, 2022, now U.S. Pat. No. 11,860,568, which is a continuation of U.S. patent application Ser. No. 17/380,347, filed Jul. 20, 2021, now U.S. Pat. No. 11,275,337, which is a continuation of U.S. patent application Ser. No. 17/015,185, filed Sep. 9, 2020, now U.S. Pat. No. 11,073,786, which is a continuation of U.S. patent application Ser. No. 16/272,095, now U.S. Pat. No. 10,782,644, filed Feb. 11, 2019, which is a continuation of U.S. patent application Ser. No. 16/030,985, filed Jul. 10, 2018, now U.S. Pat. No. 10,203,651, which is a continuation of U.S. patent application Ser. No. 15/280,679, filed Sep. 29, 2016, now U.S. Pat. No. 10,031,472, which further claims priority from Japanese Patent Application No. 2015-254202 filed on Dec. 25, 2015. The contents of the aforementioned applications are incorporated herein by reference in their entirety.

TECHNICAL FIELD

The present disclosure relates to a developing cartridge.

BACKGROUND

An electro-photographic type image forming apparatus such as a laser printer and an LED printer is known. A developing cartridge is used in the image forming apparatus. The developing cartridge includes a developing roller for supplying toner. One conventional developing cartridge is capable of being attached to a drawer unit. The drawer unit is positioned in an interior of the image forming apparatus and can be pulled from the inside of the image forming apparatus to the outside of the image forming apparatus. The drawer unit includes a photosensitive drum. The photosensitive drum faces the developing roller when the developing cartridge is attached to the drawer unit.

Further, another conventional developing cartridge is capable of being attached to a drum cartridge. The drum cartridge includes a photosensitive drum. The photosensitive drum faces the developing roller when the developing cartridge is attached to the drum cartridge. When the developing cartridge is attached to the drum cartridge, the photosensitive drum faces a developing roller of the developing cartridge. The developing cartridge is attached to the image forming apparatus in a state where the developing cartridge is attached to the drum cartridge.

SUMMARY

Further, a developing cartridge including a storage medium is also known. An IC (Integrated Circuit) chip is an example of the storage medium. The storage medium has an electric contact surface. The electric contact surface is in contact with an electric connector of the image forming apparatus or the drawer unit in a state where the developing cartridge is attached to the image forming apparats or drawer unit. However, friction between the electric contact surface and, for example, a protrusion of the image forming apparatus or the drawer unit may occur when the developing cartridge is attached to the image forming apparatus or the drawer unit.

One illustrative object of the present disclosure is to reduce friction between the electric contact surface of the developing cartridge and, for example, the protrusion of the image forming apparatus or the drawer unit.

DETAILED DESCRIPTION OF EMBODIMENTS

A preferred embodiment of the present invention will be described with reference to drawings.

In the following embodiment, a direction which crosses an electric contact surface of an IC chip (in the following embodiment, more preferably, a direction which is perpendicular to the electric contact surface of the IC chip) will be referred to as "first direction", and a moving direction of a casing in a separating operation will be referred to as "second direction". And an extending direction of a rotation axis of a developing roller will be referred to as "third direction".

Figure 1:
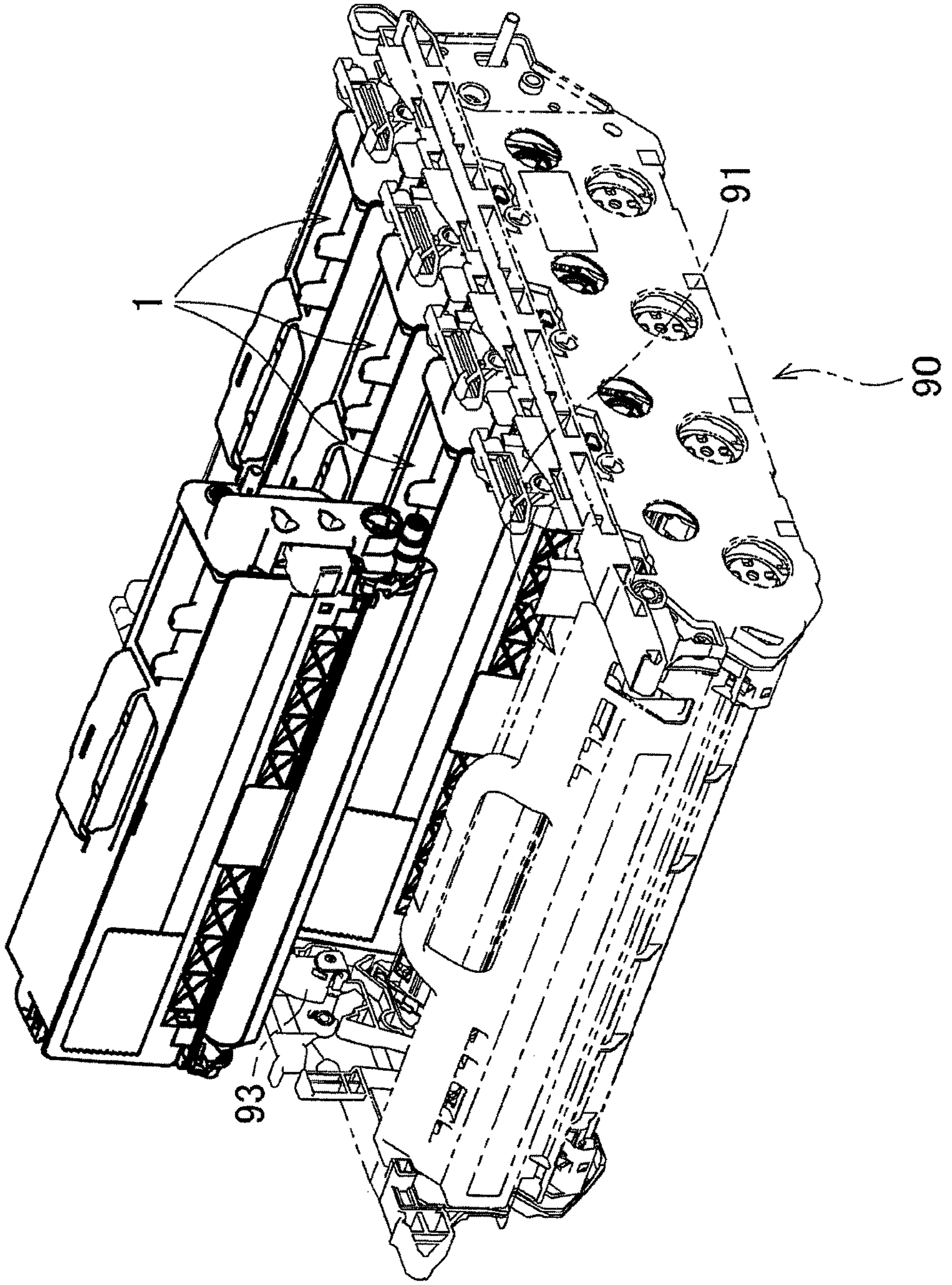
FIG. 1 is a perspective view of a developing cartridge.

1. Overall Structure of Developing Cartridge FIGS. 1 to 5 are perspective views of a developing cartridge 1. The developing cartridge 1 is used for an electro-photographic type image forming apparatus (for example, a laser printer or a LED printer), and is a unit for supplying developer (toner, for example) to a photosensitive drum. As shown in FIG. 1, the developing cartridge 1 is attached to a drawer unit 90 of the image forming apparatus. When the developing cartridge 1 is replaced, the drawer unit 90 is drawn out from a front surface of the image forming apparatus. The drawer unit 90 includes four cartridge holding portions 91, and the developing cartridge 1 is attached to four cartridge holding portions 91, respectively. Each of four cartridge holding portions 91 includes a photosensitive drum.

In the present embodiment, four developing cartridges 1 are attached to one drawer unit Each of the four developing cartridges 1 is configured to accommodate developer therein, and the color of the developer is different colors (cyan, magenta, yellow, and black, for example) among the four developing cartridges respectively. However, the number of developing cartridges 1 that can be attached to the drawer unit 90 may be 1 to 3 or be greater than or equal to 5.

As shown in FIGS. 2 to 5, each developing cartridge 1 according to the present embodiment includes a casing 10, an agitator 20, a developing roller 30, a first gear portion 40, a second gear portion 50, and an IC (Integrated Circuit) chip assembly 60.

The developing roller 30 is rotatable about a rotation axis extending in the third direction. The developing roller 30 according to the present embodiment includes a roller body 31 and a roller shaft 32. The roller body 31 is a cylinder-shaped member extending in the third direction. The roller body 31 is made of an elastic rubber, for example. The roller shaft 32 is a cylindrical member penetrating through the roller body 31 in the third direction. The roller shaft 32 is made of metal or conductive resin.

The roller shaft 32 may not penetrate through the roller body 31 in the third direction. For example, each of a pair of roller shafts 32 may extend from each end of the roller body 31 in the third direction.

The agitator 20 includes an agitator shaft 21 and an agitation blade 22. The agitator shaft 21 extends along the rotation axis extending in the third direction. The agitation blade 22 expands outward from the agitator shaft 21 in a radial direction. The agitation blade 22 is positioned inside a developing chamber 13 of the casing 10. A first agitator gear 44 and a second agitator gear 51 described later are mounted to both end portions in the third direction of the agitator shaft 21, respectively. Accordingly, the agitator shaft 21 and the agitation blade 22 are rotatable with the first agitator gear 44 and the second agitator gear 51. The developer which is accommodated in the developing chamber 13 is agitated by rotation of the agitation blade 22. Instead of the agitation blade 22, the agitator may include an agitation film.

The casing 10 is a case configured to accommodate therein developer (toner, for example) for electro-photographic printing. The casing 10 includes a first outer surface 11 and a second outer surface 12. The first outer surface 11 and the second outer surface 12 are separated from each other in the third direction. The first gear portion 40 and the IC chip assembly 60 are positioned at the first outer surface 11. The second gear portion 50 is positioned at the second outer surface 12. The casing 10 extends in the third direction from the first outer surface 11 to the second outer surface 12. The developing chamber 13 for accommodating the developer is provided in the casing 10.

The casing 10 has an opening 14. The opening 14 communicates between the developing chamber 13 and an exterior of the developing chamber 13. The opening 14 is positioned at one end portion in the second direction of the casing 10. The developing roller 30 is positioned at the opening 14. That is, the developing roller 30 is positioned closer to one side of the casing 10 than to the center of the casing 10 in the second direction. The roller body 31 is fixed to the roller shaft 32 so as to be incapable of rotating relative to the roller shaft 32. One end portion of the roller shaft 32 in the third direction is mounted to a developing gear 42 described later so as to be incapable of rotating relative to the developing gear 42. When the developing gear 42 rotates, the roller shaft 32 rotates with the developing gear 42 and then the roller body 31 rotates together with the roller shaft 32.

When the developing cartridge 1 receives a driving force, the developer is supplied from the developing chamber 13 in the casing 10 onto an outer peripheral surface of the developing roller 30 via a supply roller (omitted in the figure). At this time, the developer is tribocharged between the supply roller and the developing roller 30. On the other hand, bias voltage is applied to the roller shaft 32 of the developing roller 30. Accordingly, static electricity between the roller shaft 32 and the developer moves the developer toward the outer peripheral surface of the roller body 31.

The developing cartridge 1 further includes a layer thickness regulation blade which is omitted in the figure. The layer thickness regulation blade regulates a thin layer of the developer supplied onto the outer peripheral surface of the roller body 31 so that the thickness of the developer becomes constant. Then, the developer on the outer peripheral surface of the roller body 31 is supplied to the photosensitive drum of the drawer unit 90. At this time, the developer moves from the roller body 31 to the photosensitive drum on the basis of an electrostatic latent image formed on the outer peripheral surface of the photosensitive drum. Accordingly, the electrostatic latent image is visualized on the outer peripheral surface of the photosensitive drum.

Figure 4:
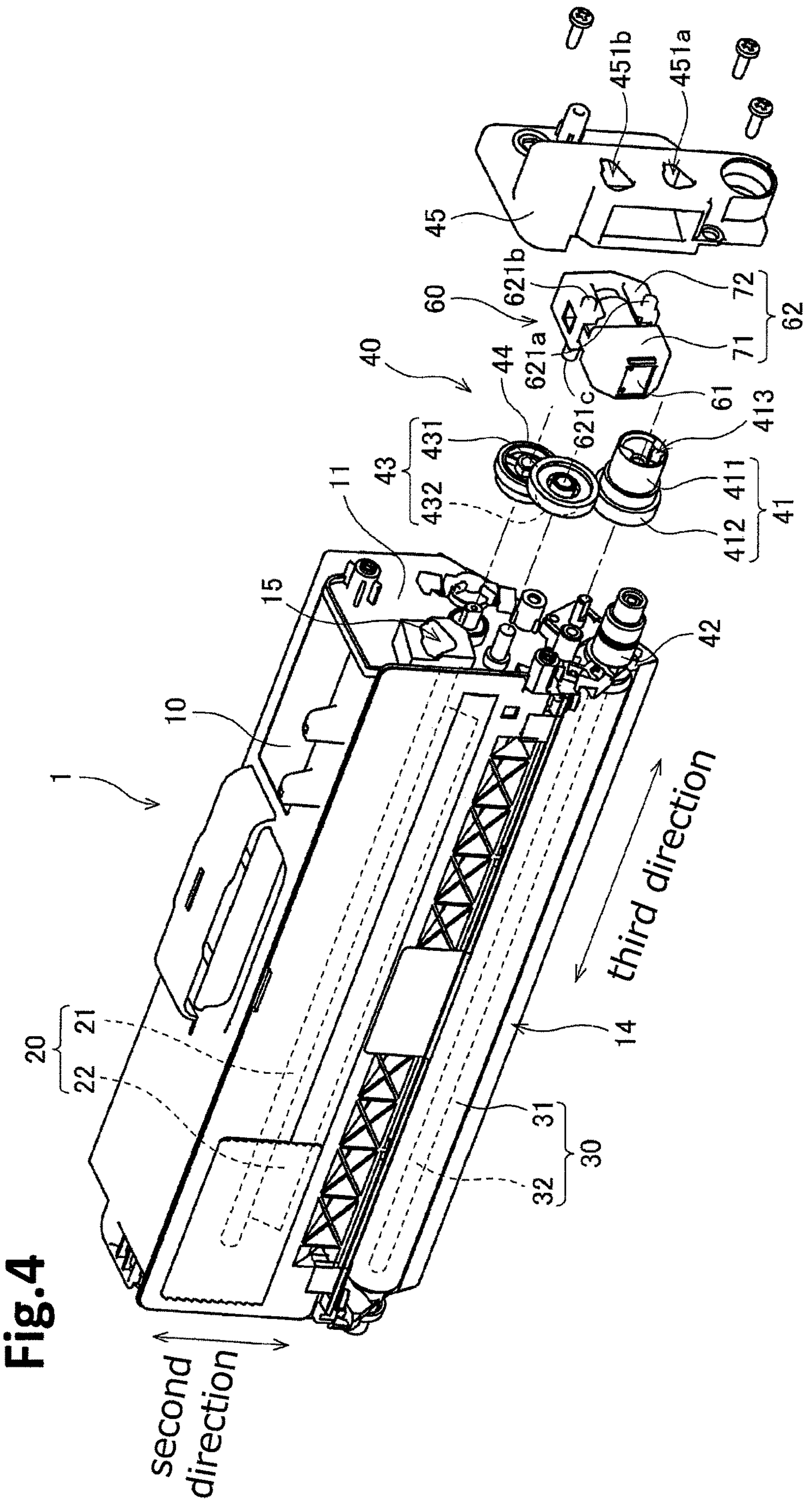
FIG. 4 is a perspective view of the developing cartridge.

The first gear portion 40 is positioned at one end portion in the third direction of the casing 10. That is, the first gear portion 40 is positioned at the first outer surface 11. FIG. 4 is a perspective view of the developing cartridge 1 in a state in which the first gear portion 40 is disassembled. As shown in FIG. 4, the first gear portion 40 includes a coupling 41, a developing gear 42, an idle gear 43, a first agitator gear 44, and a first cover 45. A plurality of gear teeth of each gear are not illustrated in FIG. 4.

The coupling 41 is a gear for initially receiving the driving force applied from the image forming apparatus. The coupling 41 is rotatable about a rotation axis extending in the third direction. The coupling 41 includes a coupling portion 411 and a coupling gear 412. The coupling portion 411 and the coupling gear 412 are integral with each other and made of a resin, for example. The coupling portion 411 has a coupling hole 413 depressed in the third direction. The coupling gear 412 includes a plurality of gear teeth. The gear teeth are provided on the entire outer peripheral surface of the coupling gear 412 at equal intervals.

When the drawer unit 90 to which the developing cartridge 1 is attached is accommodated in the image forming apparatus, a drive shaft of the image forming apparatus is inserted into the coupling hole 413 of the coupling portion 411. With this configuration, the drive shaft and the coupling portion 411 are connected so as to be incapable of rotating relative to each other. Accordingly, the coupling portion 411 rotates when the drive shaft rotates, and the coupling gear 412 rotates together with the coupling portion 411.

The developing gear 42 is a gear for rotating the developing roller 30. The developing gear 42 is rotatable about a rotation axis extending in the third direction. The developing gear 42 includes a plurality of gear teeth. The gear teeth are provided on the entire outer peripheral surface of the developing gear 42 at equal intervals. At least a portion of the plurality of gear teeth of the coupling gear 412 meshes with at least a portion of the plurality of gear teeth of the developing gear 42. Further, the developing gear 42 is mounted to the end portion of the roller shaft 32 in the third direction so as to be incapable of rotating relative to the roller shaft 32. With this construction, when the coupling gear 412 rotates, the developing gear 42 rotates with the coupling gear 412 and the developing roller 30 also rotates with the developing gear 42.

The idle gear 43 is a gear for transmitting rotational driving force of the coupling gear 412 to the first agitator gear 44. The idle gear 43 is rotatable about a rotation axis extending in the third direction. The idle gear 43 includes a large diameter gear portion 431 and a small diameter gear portion 432. The large diameter gear portion 431 and the small diameter gear portion 432 are arranged in the third direction. The small diameter gear portion 432 is positioned between the large diameter gear portion 431 and the first outer surface 11 of the casing 10. In other words, the large diameter gear portion 431 is farther away from the first outer surface 11 than the small diameter gear portion 432 is. A diameter of the small diameter gear portion 432 is smaller than a diameter of the large diameter gear portion 431. In other words, a diameter of an addendum circle of the small diameter gear portion 432 is smaller than a diameter of an addendum circle of the large diameter gear portion 431. The large diameter gear portion 431 and the small diameter gear portion 432 are integral with each other and are made of a resin.

The large diameter gear portion 431 includes a plurality of gear teeth, and the plurality of gear teeth are provided on the entire outer peripheral surface of the large diameter gear portion 431 at equal intervals. The small diameter gear portion 432 includes a plurality of gear teeth, and the plurality of gear teeth are provided on the entire outer peripheral surface of the small diameter gear portion 432 at equal intervals. The number of gear teeth of the small diameter gear portion 432 is less than the number of gear teeth of the large diameter gear portion 431. At least a portion of the plurality of gear teeth of the coupling gear 412 meshes with at least a portion of the plurality of gear teeth of the large diameter gear portion 431. Further, at least a portion of the plurality of gear teeth of the small diameter gear portion 432 meshes with at least a portion of the plurality of gear teeth of the first agitator gear 44. When the coupling gear 412 rotates, the large diameter gear portion 431 rotates together with the coupling gear 412 and the small diameter gear portion 432 rotates together with the large diameter gear portion 431. Also, the first agitator gear 44 rotates with the rotation of the small diameter gear portion 432.

The first agitator gear 44 is a gear for rotating the agitator 20 in the developing chamber 13. The first agitator gear 44 is rotatable about a rotation axis extending in the third direction. The first agitator gear 44 includes a plurality of gear teeth, and the plurality of gear teeth are provided on the entire outer peripheral surface of the first agitator gear 44 at equal intervals. As described above, at least a portion of the plurality of gear teeth of the small diameter gear portion 432 meshes with the at least a portion of the plurality of gear teeth of the first agitator gear 44. Further, the first agitator gear 44 is mounted to one end portion of the agitator shaft 21 in the third direction so as to be incapable of rotating relative to the agitator shaft 21. With the configuration, when the rotational driving force is transmitted from the coupling 41 to the first agitator gear 44 via the idle gear 43, the first agitator gear 44 rotates and the agitator 20 rotates together with the first agitator gear 44.

The first cover 45 is fixed to the first outer surface 11 of the casing 10 by screws, for example. The coupling gear 412, the developing gear 42, the idle gear 43, and the first agitator gear 44 are accommodated in a space between the first outer surface 11 and the first cover 45. The coupling hole 413 of the coupling portion 411 is exposed to an outside of the first cover 45. The first cover 45 according to the present embodiment also serves as a holder cover for holding the holder 62 of the IC chip assembly 60 described later. A structure of the first cover 45 as the holder cover will be described later in detail.

Figure 5:
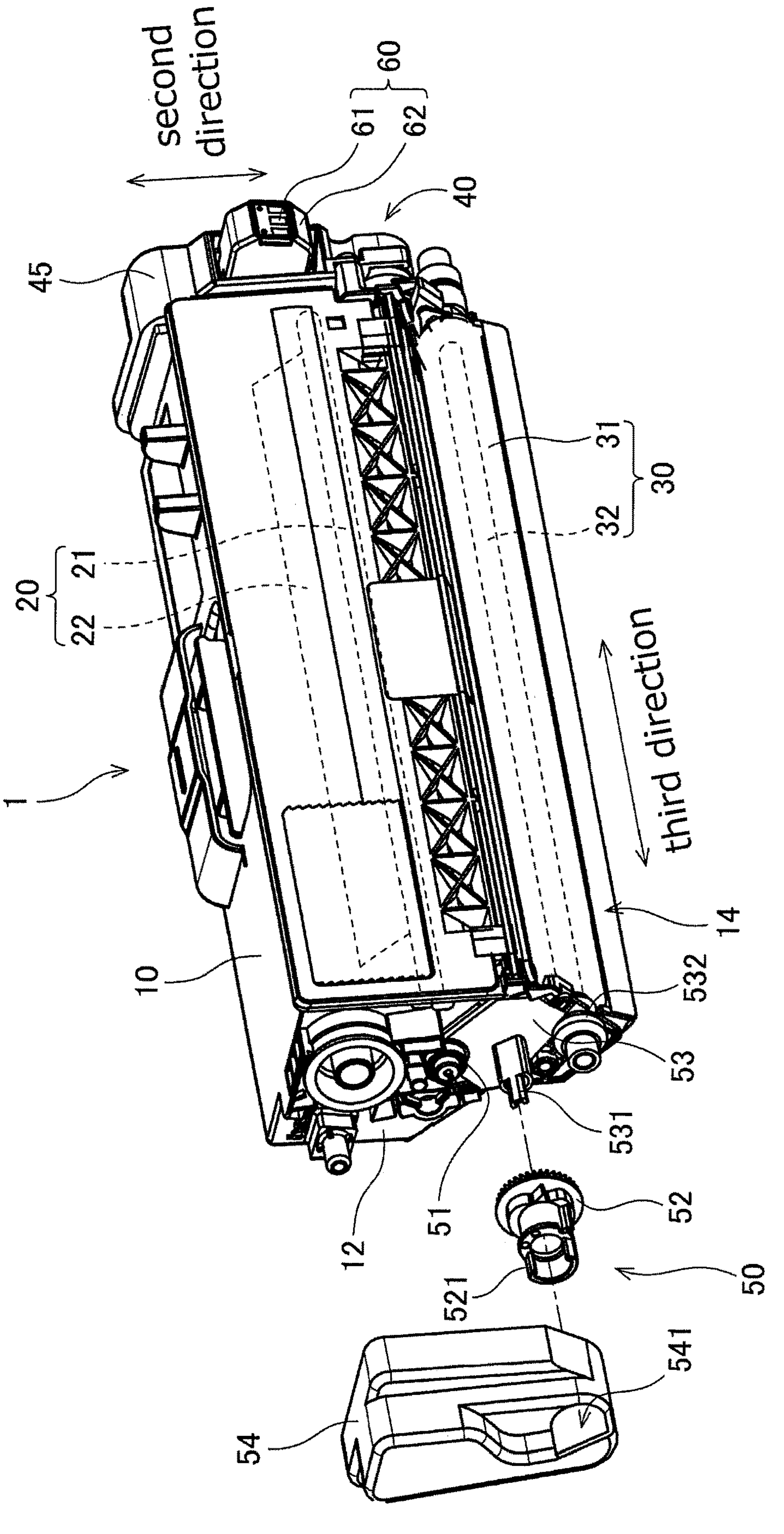
FIG. 5 is a perspective view of the developing cartridge.

The second gear portion 50 is positioned at the other end portion of the casing 10 in the third direction. In other words, the second gear portion 50 is positioned at the second outer surface 12. FIG. 5 is a perspective view of the developing cartridge 1 in which the second gear portion 50 is exploded. As illustrated in FIG. 5, the second gear portion 50 includes a second agitator gear 51, a detection gear 52, an electrically conductive member 53, and a second cover 54. Note that, in FIG. 5, gear teeth are not illustrated in the second agitator gear 51 and the detection gear 52.

The second agitator gear 51 is a gear for transmitting rotational driving force of the agitator shaft 21 to the detection gear 52. The second agitator gear 51 is rotatable about a rotation axis extending in the third direction. The second agitator gear 51 includes a plurality of gear teeth, and the plurality of gear teeth are provided on the entire outer peripheral surface of the second agitator gear 51 at equal intervals. At least a portion of the plurality of gear teeth of the second agitator gear 51 meshes with at least a portion of a plurality of gear teeth of the detection gear 52. The second agitator gear 51 is mounted to the other end portion of the agitator shaft 21 in the third direction so as to be incapable of rotating relative to the agitator shaft 21. With this configuration, the second agitator gear 51 rotates with rotation of the agitator shaft 21.

The detection gear 52 is a gear for providing information on the developing cartridge 1 for the image forming apparatus. The information on the developing cartridge 1 includes, for example, information as to whether the developing cartridge 1 is a new (unused) cartridge or a used cartridge. The information on the developing cartridge 1 also includes, for example, a product specification of the developing cartridge 1. The product specification of the developing cartridge 1 includes, for example, the number of sheets that can be printed with the developer accommodated in the developing cartridge 1 (i.e. sheet-yield number).

The detection gear 52 is rotatable about a rotation axis extending in the third direction. The detection gear 52 includes a plurality of gear teeth. The gear teeth are provided on a portion of an outer peripheral surface of the detection gear 52. When the drawer unit 90 to which an unused developing cartridge 1 is attached is attached in the image forming apparatus, the detection gear 52 can rotate by meshing with the second agitator gear 51. When the detection gear 52 is disengaged from the second agitator gear 51, rotation of the detection gear 52 is stopped.

When the drawer unit 90 to which a used developing cartridge 1 is attached is attached in the image forming apparatus, the detection gear 52 does not mesh with the second agitator gear 51. Thus, the detection gear 52 cannot rotate.

A gear may be provided between the second agitator gear 51 and the detection gear 52. For example, the second gear portion 50 may further include a second idle gear meshing with both the second agitator gear 51 and the detection gear 52. In this case, rotational driving force of the second agitator gear 51 may be transmitted to the detection gear 52 via the second idle gear.

As illustrated in FIG. 5, the detection gear 52 includes a detecting protrusion 521. The detecting protrusion 521 protrudes in the third direction. The detecting protrusion 521 has a circular arc shape extending along a portion of an addendum circle of the detection gear about the rotation axis of the detection gear 52.

The electrically conductive member 53 is electrically conductive. The electrically conductive member 53 is formed of a material such as electrically conductive metal or electrically conductive resin. The electrically conductive member 53 is positioned at the second outer surface 12 of the casing 10. The electrically conductive member 53 includes a gear shaft 531 protruding in the third direction. The detection gear 52 rotates about the gear shaft 531 in a state where the detection gear 52 is supported by the gear shaft 531. The electrically conductive member 53 further includes a bearing portion 532. The bearing portion 532 is in contact with the roller shaft 32 of the developing roller 30.

The drawer unit 90 includes an electrically conductive lever (not illustrated) that is in contact with the gear shaft 531 in a state where the developing cartridge 1 is attached to the drawer unit 90. Instead of the drawer unit 90, the image forming apparatus may include the electrically conductive lever. When the lever contacts the gear shaft 531, electrical connection between the lever and the electrically conductive member 53 is established and electrical connection between the electrically conductive member 53 and the roller shaft 32 is also established. When the image forming apparatus is in operation, electric power is supplied to the roller shaft 32 through the lever, and the roller shaft 32 can keep a prescribed bias voltage. Note that the detecting protrusion 521 covers a portion of an outer peripheral surface of the gear shaft 531. Hence, when the detection gear 52 rotates after a new developing cartridge 1 is attached in the drawer unit 90, the contact state between the lever and the gear shaft 531 changes according to the shape of the detection gear 52. More specifically, the contact state between the lever and the gear shaft 531 changes according to the shape of the detecting protrusion 521 because the detecting protrusion 521 pass through between the lever and the gear shaft according to the rotation of the detection gear 52. Alternatively, the contact state between the lever and the gear shaft 531 changes according to the number of the detecting protrusions 521 which are provided with the detection gear 52 because one or more of detecting protrusions 521 pass through between the lever and the gear shaft according to the rotation of the detection gear 52. The image forming apparatus recognizes the change in the contact state between the lever and the gear shaft 531 to identify whether the attached developing cartridge 1 is new or used and/or the product specification of the mounted developing cartridge 1.

However, the method for detecting the information on the developing cartridge 1 using the detection gear 52 is not limited to detection of electric al conduction. For example, movement of the lever may be optically detected. Further, the detecting protrusion 521 may be formed to have a different circumferential position and length from those in the present embodiment. Further, the detection gear 52 may have a plurality of detecting protrusions 521. The shape of the detection gear 52 may vary according to the product specification of the developing cartridge 1 such as the number of printable sheets. More specifically, the number of the detecting protrusions 521 may be differentiated among a plural type of the developing cartridges, and the product specification regarding each of the developing cartridges may be identified based on the number of the detecting protrusions 21. When each of the plural type of the developing cartridges includes the number of the detecting protrusions 521, circumferential intervals between the plurality of detecting projections 521 may be differentiated among the plural type of the developing cartridges. In the above-described case, a circumferential length of each detecting projection 521 and/or a radial length of each detecting projection 521 may be differentiated based on the product specification regarding each of the developing cartridges. In this way, variations in the number of the detecting protrusions 521 and/or circumferential positions of the each of the detecting projections 521 enables the image forming apparatus to identify the product specification regarding each of the developing cartridges.

The detection gear 52 may be configured of a plurality of components. For example, the detecting protrusion 521 and the detection gear 52 may be different components. Further, the detection gear 52 may include a detection gear body and a supplemental member that shifts its position relative to the detection gear body in accordance with rotation of the detection gear body. In this case, the supplemental member changes between a first position in which the supplemental member is in contact with the lever and a second position in which the supplemental member is not in contact with the lever in accordance with shifting the position of the supplemental member relative to the detection gear body. As a result, the supplemental member may change the position of the lever.

Further, the detection gear 52 may be configured of a movable gear that can move in the third direction. The movable gear may not be limited to a partially toothless gear. In other words, the movable gear includes a plurality of gear teeth, and the plurality of gear teeth are provided on an outer peripheral surface of the movable gear along the circumference of the movable gear. In this case, the movable gear moves in the third direction in accordance with rotation of the movable gear, thereby the movable gear is disengaged from the second agitator gear 51. The movable gear may be moved in the third direction away from the second outer surface 12 or toward the second outer surface 12.

Further, the detection gear 52 may include a cam, and the cam may contact the detecting protrusion 521. In this case, the cam rotates together with rotation of the detection gear 52, and the rotating cam contacts the detecting projection 521. This causes the detecting projection 521 to move relative to the detection gear 52. The detecting protrusion 521 may be rotatably attached to a shaft provided at the second outer surface 12 or the second cover 54. Alternatively, the detecting protrusion 521 may have a shaft, and the shaft of the detecting projection 521 may be inserted into a hole formed in the second outer surface 12 or the second cover 54 so that the detecting protrusion 521 is rotatably supported by the second outer surface 12 or the second cover 54.

Further, in the present embodiment, the gear shaft 531 extends in the third direction from the second outer surface 12. However, the gear shaft 531 does not need to be in direct contact with the second outer surface 12. For example, the casing 10 may have a through-hole penetrating the second outer surface 12 and a cap fitted with the through-hole, and a gear shift may extend from the cap in the third direction. In this case, the cap includes the gear shift protruding in the third direction toward the detection gear 52, and the detection gear 52 rotates about the gear shaft 531 in a state where the detection gear is supported by the gear shaft 531.

The second cover 54 is fixed to the second outer surface 12 of the casing 10 by a screw, for example. The second agitator gear 51, the detection gear 52, and the electrically conductive member 53 are accommodated in a space between the second outer surface 12 and the second cover 54. The second cover 54 has an opening 541. A portion of the detection gear 52 and a portion of the gear shaft 531 are exposed to an outside through the opening 541. The electrically conductive lever of the drawer unit 90 contacts the detection gear 52 and the gear shaft 531 through the opening 541.

2. IC Chip Assembly

Figure 6:
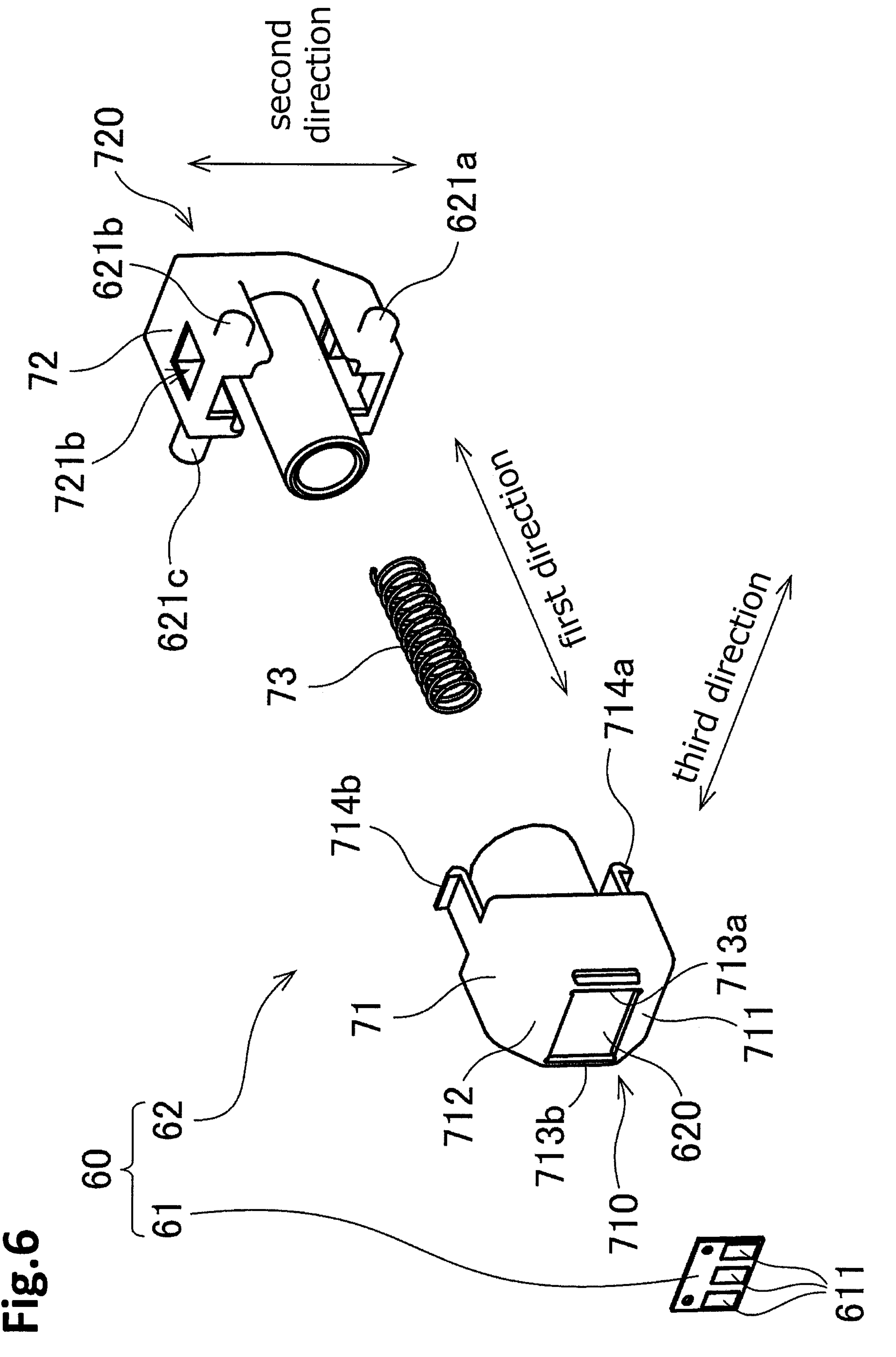
FIG. 6 is an exploded perspective view of an IC (Integrated Circuit) chip assembly.
Figure 7:
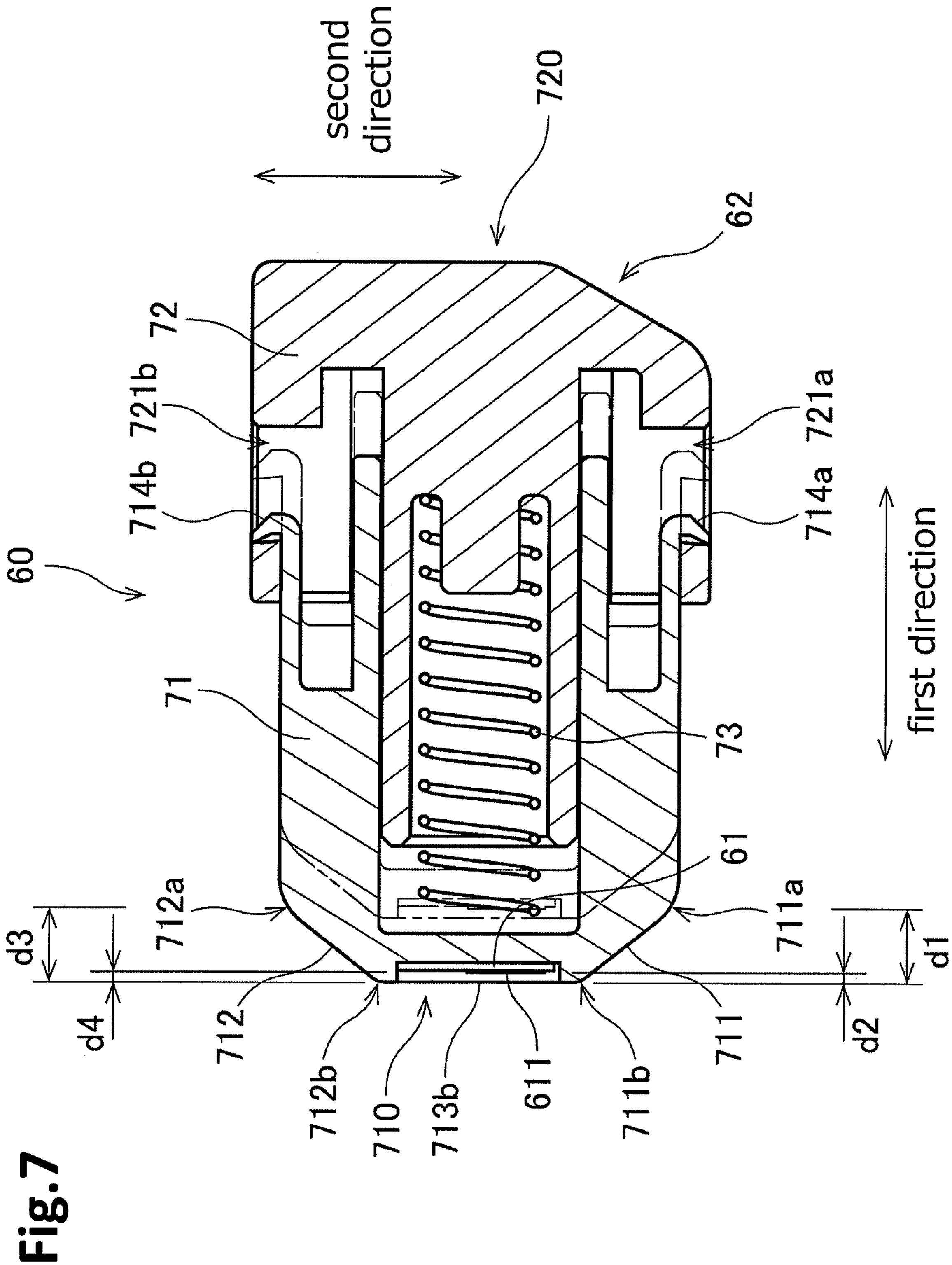
FIG. 7 is a cross-sectional view of the IC chip assembly.

The IC chip assembly 60 is positioned at the first outer surface 11 of the casing 10. FIG. 6 is an exploded perspective view of the IC chip assembly 60. FIG. 7 is a cross-sectional view of the IC chip assembly 60 taken along a plane perpendicular to the third direction. As shown in FIGS. 2 through 7, the IC chip assembly 60 includes an IC (Integrated Circuit) chip 61 as a storage medium and a holder 62 for holding the IC chip 61. The holder 62 is held to the first cover 45 at one end of the casing 10 in the third direction. The IC chip 61 stores various information on the developing cartridge 1. The IC chip 61 includes an electric contact surface 611. The electric contact surface 611 is made of electrically conductive metal. The IC chip 61 is fixed to an outer surface of the holder 62 in the third direction.

The drawer unit 90 includes an electric connector. The electric connector is made of metal, for example. The electric connector of the drawer unit 90 contacts the electric contact surface 611 when the developing cartridge 1 is attached to the drawer unit 90. At this time, the image forming apparatus can perform at least one of reading information from the IC chip 61 and writing information in the IC chip 61.

Figure 2:
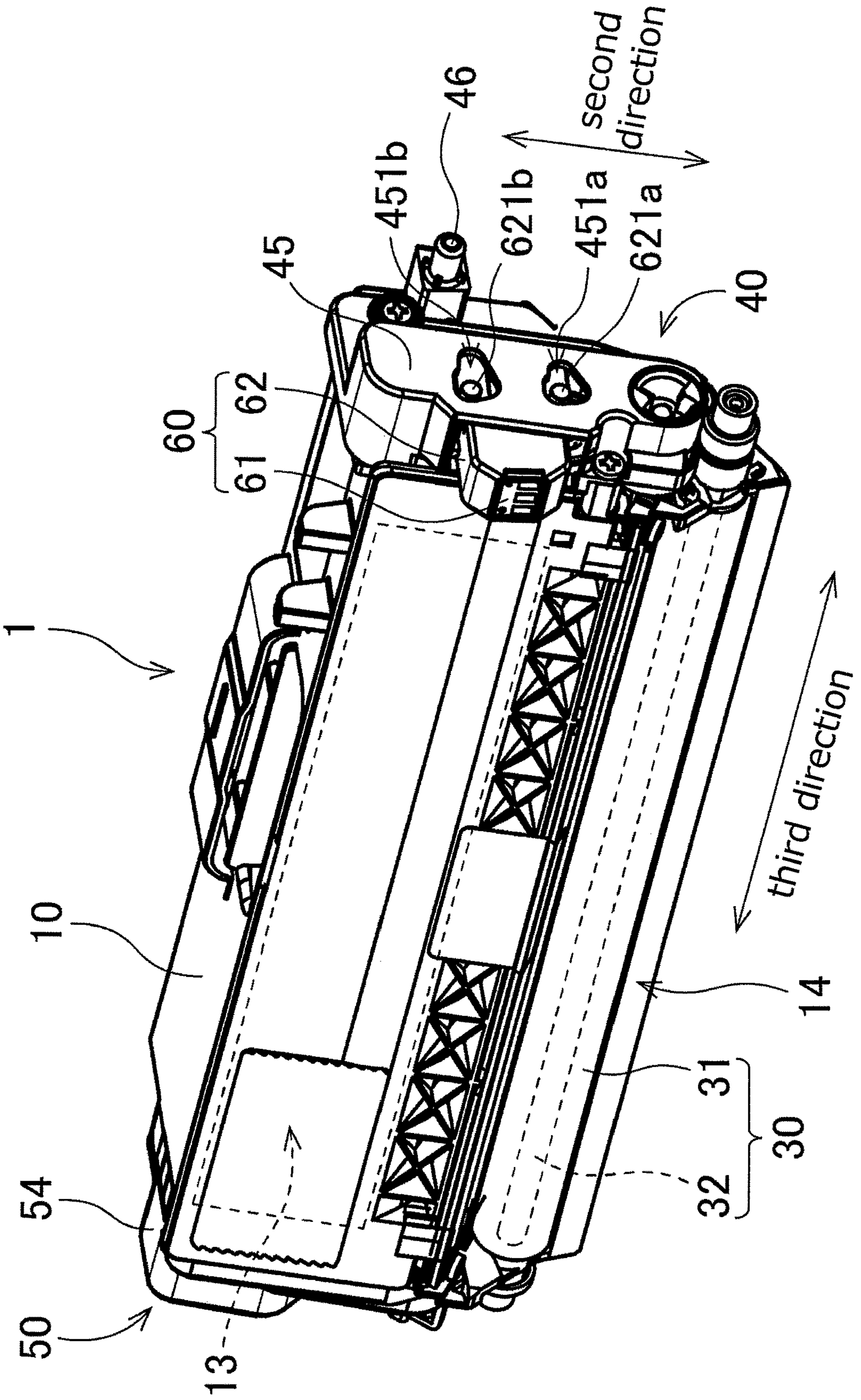
FIG. 2 is a perspective view of the developing cartridge.

At least a portion of the holder 62 is covered by the first cover 45. The holder 62 includes a boss 621*a*, a boss 621*b*, and a boss 621*c*. Each of the boss 621*a* and boss 621*b* extends in the third direction toward the first cover 45 from a surface of the holder 62 opposite to a surface thereof facing the casing 10. The boss 621*a* and boss 621*b* are aligned in the second direction. As shown in FIGS. 2 and 4, the first cover 45 has a through-hole 451*a* and a through-hole 451*b*. The through-hole 451*a* and through-hole 451*b* penetrate the first cover 45 in the third direction, respectively. The through-hole 451*a* and through-hole 451*b* are aligned in the second direction. The boss 621*a* is inserted into the through-hole 451*a*. The boss 621*b* is inserted into the through-hole 451*b*.

The boss 621*c* extends in the third direction toward the casing 10 from the surface of the holder 62 facing the casing 10. On the other hand, the casing 10 includes a recessed portion 15. The recessed portion 15 is recessed in the third direction on the first outer surface 11 of the casing 10. The boss 621*c* is inserted into the recessed portion 15. The bosses 621*a*, 621*b* and 621*c* may have a circular columnar shape or a rectangular columnar shape, respectively.

The through-hole 451*a* has a dimension (inner dimension) in the second direction larger than a dimension (outside dimension) of the boss 621*a* in the second direction. The through-hole 451*b* has a dimension (inner dimension) in the second direction larger than a dimension (outside dimension) of the boss 621*b* in the second direction. Further, the recessed portion 15 has a dimension (inner dimension) in the second direction larger than a dimension (outer dimension) of the boss 621*c* in the second direction. Hence, the holder 62 can move with the bosses 621*a*, 621*b* and 621*c* in the second direction relative to the casing 10 and the first cover 45. As the holder 62 moves in the second direction, the IC chip 61 having the electric contact surface 611 also moves in the second direction together with the holder 62.

The through-hole 451*a* has a dimension (inner dimension) in the first direction larger than a dimension (outer dimension) of the boss 621*a* in the first direction. The through-hole 451*b* has a dimension (inner dimension) in the first direction larger than a dimension (outer dimension) of the boss 621*b* in the first direction. Further, the recessed portion 15 has a dimension (inner dimension) in the first direction larger than a dimension (outer dimension) of the boss 621*c* in the first direction. Hence, the holder 62 can move with the bosses 621*a*, 621*b* and 621*c* in the first direction relative to the casing 10 and the first cover 45. As the holder 62 moves in the first direction, the IC chip 61 having the electric contact surface 611 also moves in the first direction together with the holder 62. The holder 62 may be movable in the third direction between the first cover 45 and the first outer surface 11.

Alternatively, the holder 62 may include a single boss, or equal to or more than three bosses. Likewise, the first cover 45 may have a single through-hole, or equal to or more than three through-holes. Or, instead of the through-holes 451*a* and 451*b*, the first cover 45 may include one or more of recesses to have the bosses 621*a* and/or 621*b* inserted thereinto.

As shown in FIGS. 6 and 7, the holder 62 includes a first end portion 710 and a second end portion 720. The first end portion 710 is one end portion of the holder 62 in the first direction. The second end portion 720 is another end portion of the holder 62 in the first direction. The first end portion 710 is movable relative to the second end portion 720 in the first direction. More specifically, the holder 62 of the present embodiment includes a first holder member 71, a second holder member 72, and a coil spring 73 positioned between the first holder member 71 and the second holder member 72. The first holder member 71 is made of resin, for example. The second holder member 72 is made of resin, for example. The first holder member 71 includes the first end portion 710. An outer surface of the first holder member 71 includes a holding surface 620. The IC chip 61 is fixed to the holding surface 620. The second holder member 72 includes the second end portion 720. After assembling the first holder member 71, the second holder member 72 and the coil spring 73 as the holder 62, the first end portion 710 and the second end portion 720 are separated from each other in the first direction.

The coil spring 73 is an elastic member extending in the first direction. The coil spring 73 is positioned between the first end portion 710 and the second end portion 720 in the first direction. The coil spring 73 can be stretched or compressed in the first direction at least between a first state and a second state more compressed than the first state. The coil spring 73 in the first state has a length in the first direction longer than a length of the coil spring 73 in the second state in the first direction. Therefore, a distance between the first end portion 710 and the second end portion 720 in the first direction in the first state is longer than a distance between the first end portion 710 and the second end portion 720 in the first direction in the second state. At least, the coil spring 73 in the second state has a length in the first direction shorter than a natural length of the coil spring 73.

As shown in FIGS. 6 and 7, the first holder member 71 includes a pawl 714*a* and a pawl 714*b*. The pawl 714*a* and the pawl 714*b* respectively protrude from the first holder member 71 in a direction crossing the first direction. The second holder member 72 has an opening 721*a* and an opening 721*b*. The pawl 714*a* is inserted into the opening 721*a*. The pawl 714*b* is inserted into the opening 72 lb. In the first state, the pawl 714*a* is in contact with the second holder member 72 at a periphery of the opening 721*a* on a side of the first end portion 710 in the first direction. Also, in the first state, the pawl 714*b* is in contact with the second holder member 72 at a periphery of the opening 721*b* on a side of the first end portion 710 in the first direction. With this structure, the length of the coil spring 73 in the first direction is prevented from getting further longer than the length of the coil spring 73 in the first state. Further, the first holder member 71 cannot be detached from the second holder member 72 easily. On the other hand, in the second state, the pawl 714*a* is separated from the periphery of the opening 721*a* on the side of the first end portion 710 in the first direction, and pawl 714*b* is separated from the periphery of the opening 721*b* on the side of the first end portion 710 in the first direction.

Instead of opening 721*a* and the opening 721*b*, one or more of recesses or one or more of steps which is capable of contacting the pawl 714*a* and the pawl 714*b* respectively may be provided. Alternatively, the first holder member 71 may have one or more of openings or one or more of recesses or one or more of steps, whereas the second holder member 72 may include one or more of pawls.

Due to the difference in dimension between the through-hole 451 and boss 621 and stretch and compression of the coil spring 73 described above, the holding surface 620 of the holder 62 can move in the first direction relative to the casing 10. Hereinafter, the position of the holding surface 620 in the first direction relative to the casing 10 will be referred to as an "initial position." Before attaching the developing cartridge 1 to the drawer unit 90, the holding surface 620 is in the initial position. Further, the position of the holding surface 620 in the first direction relative to the casing 10 at a moment when the coil spring 73 is most compressed during attaching the developing cartridge 1 to the drawer unit 90 will be referred to as an "intermediate position." Further, the position of the holding surface 620 in the first direction relative to the casing 10 when the electric contact surface 611 make contact with an electric connector 913 described later will be referred to as a "contact position." And the position of the holding surface 620 in the first direction relative to the casing 10 after attaching the developing cartridge 1 to the drawer unit 90 has been completed will be referred to as a "final position."

The outer surface of the first end portion 710 further includes a first guide surface 711 (an example of a first surface), a second guide surface 712 (an example of second surface), and third guide surfaces 713*a* and 713*b* (an example of a third surface), in addition to the holding surface 620 described above.

The first guide surface 711 is positioned at one side of the holding surface 620 in the second direction which is closer to the developing roller 30 than another side of the holding surface 620 in the second direction. The first guide surface 711 is inclined relative to the electric contact surface 611 of the IC chip 61 held by the holding surface 620. Specifically, the first guide surface 711 is inclined at an acute angle relative to the relative to the electric contact surface 611.

Here, one end of the first end portion 710 in the second direction will be defined as a first outer end position 711*a* (third position). One end of the holding surface 620 in the second direction is defined as a first inner end position 711*b* (fourth position). As illustrated in FIG. 7, the first guide surface 711 extends from the first outer end position 711*a* to the first inner end position 711*b* toward the electric contact surface 611. The first outer end position 711*a* is farther away from the electric contact surface 611 than the first inner end position 711*b* both in the first direction and the second direction. In addition, as illustrated in FIG. 7, the distance d1 between the first outer end position 711*a* and first inner end position 711*b* in the first direction is greater than the distance d2 between the electric contact surface 611 and first inner end position 711*b* in the first direction.

The second guide surface 712 is positioned at one side of the holding surface 620 in the second direction which is farther from the developing roller 30 than another side of the holding surface 620 in the second direction. The second guide surface 712 is inclined relative to the electric contact surface 611 of the IC chip 61 held by the holding surface 620. Specifically, the second guide surface 712 is inclined at an acute angle relative to the electric contact surface 611.

Here, another end of the first end portion 710 in the second direction will be defined as a second outer end position 712*a* (fifth position). Another end of the holding surface 620 in the second direction is defined as a second inner end position 712*b* (sixth position). As illustrated in FIG. 7, the second guide surface 712 extends from the second outer end position 712*a* to the second inner end position 712*b* toward the electric contact surface 611. The second outer end position 712*a* is farther away from the electric contact surface 611 than the second inner end position 712*b* both in the first direction and the second direction. In addition, as illustrated in FIG. 7, the distance d3 between the second outer end position 712*a* and second inner end position 712*b* in the first direction is greater than the distance d4 between the electric contact surface 611 and second inner end position 712*b* in the first direction.

The third guide surface 713*a* is positioned at one side of the electric contact surface 611 in the third direction. The third guide surface 713*b* is positioned at another side of the electric contact surface 611 in the third direction. The third guide surfaces 713*a*, 713*b* extend in the second direction respectively. Each of the third guide surfaces 713*a*, 713*b* is farther away from the coil spring 73 than the electric contact surface 611 in the first direction. Therefore, the electric contact surface 611 is positioned at a recessed area which is recessed toward the coil spring 73 side relative to the third guide surfaces 713*a*, 713*b*.

Each of the first guide surface 711, second guide surface 712, and third guide surfaces 713*a*, 713*b* may be planar or curved. However, it is preferable that each of the first guide surface 711, second guide surface 712, and third guide surfaces 713*a*, 713*b* is a smooth surface without one or more steps so that each of the first guide surface 711, second guide surface 712, and third guide surfaces 713*a*, 713*b* does not hook a portion of the drawer unit 90 when the developing cartridge 1 is attached to the drawer unit 90.

3. Attaching Operation

Subsequently, operation when each developing cartridge 1 is attached to the drawer unit 90 will be described. FIGS. 8 through 14 respectively illustrate how the developing cartridge 1 is attached to one of the cartridge holding portions 91 of the drawer unit 90.

Figure 8:
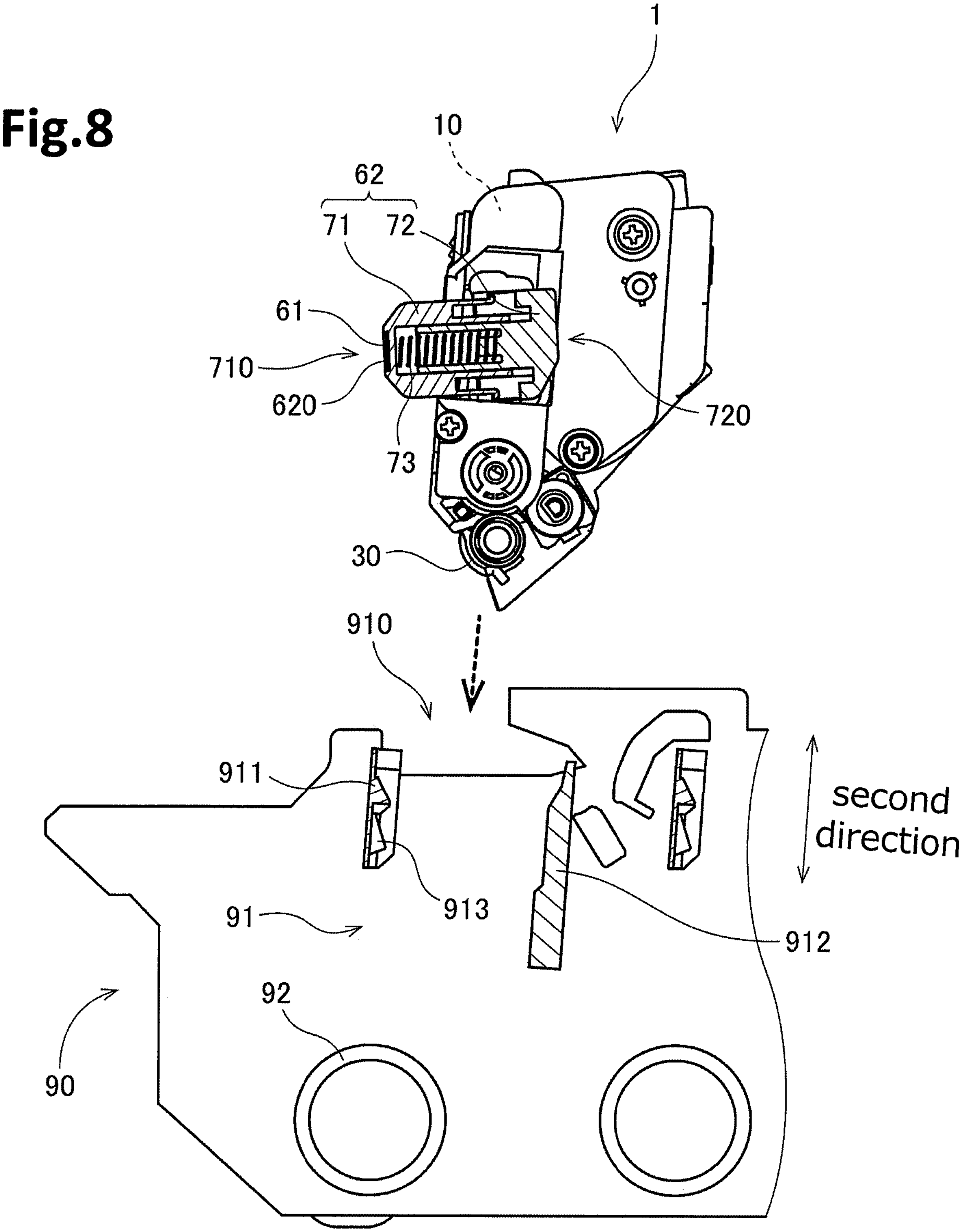
FIG. 8 is a view for illustrating the an attachment of the developing cartridge.

When the developing cartridge 1 is attached to the cartridge holding portion 91, as illustrated in FIG. 8, the developing roller 30 of the developing cartridge 1 first faces an insertion opening 910 of the cartridge holding portion 91. At this time, the first end portion 710 of the holder 720 and second end portion 720 of the holder 62 are not in contact with the drawer unit 90. Thus, the coil spring 73 is in the first state described above. The position of the holding surface 620 with respect to the casing 10 in the first direction is the initial position described above. The developing cartridge 1 is inserted into the cartridge holding portion 91 in the second direction, as shown by a dashed arrow illustrated in FIG. 8.

The cartridge holding portion 91 includes a first guide plate 911 and a second guide plate 912. The first guide plate 911 is spaced apart from the second guide plate 912 in the first direction and the first guide plate 91 and the second guide plate 912 face each other. Each of the first guide plate 911 and second guide plate 912 extends along both the second direction and the third direction. The first guide plate 911 includes an electric connector 913 made of metal. The electric connector 913 is contactable with the electric contact surface 611 of the IC chip 61. The electric connector 913 protrudes from the surface of the first guide plate 911 toward the second guide plate 912 in the first direction.

Figure 9:
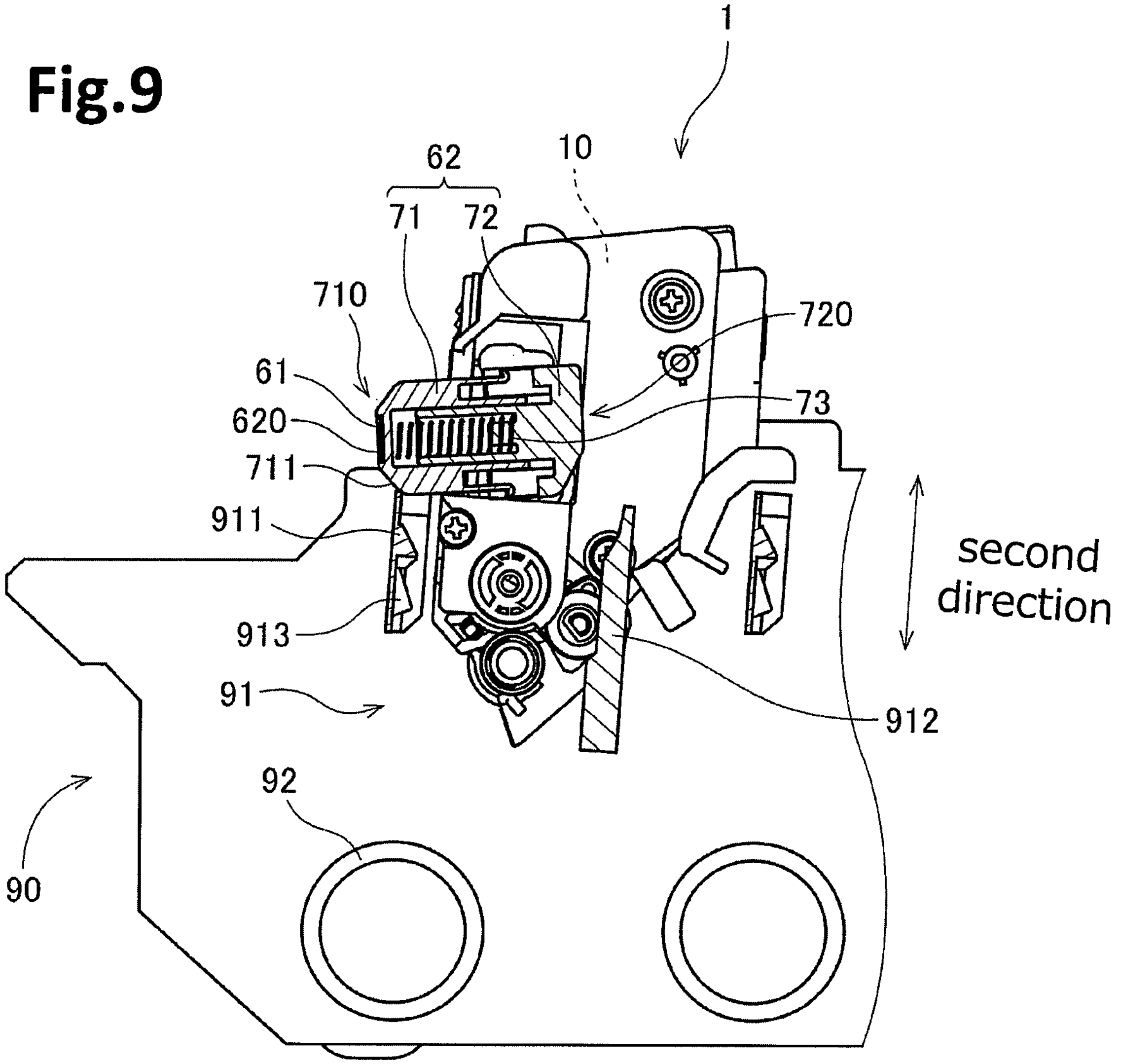
FIG. 9 is a view for illustrating the attachment of the developing cartridge.
Figure 10:
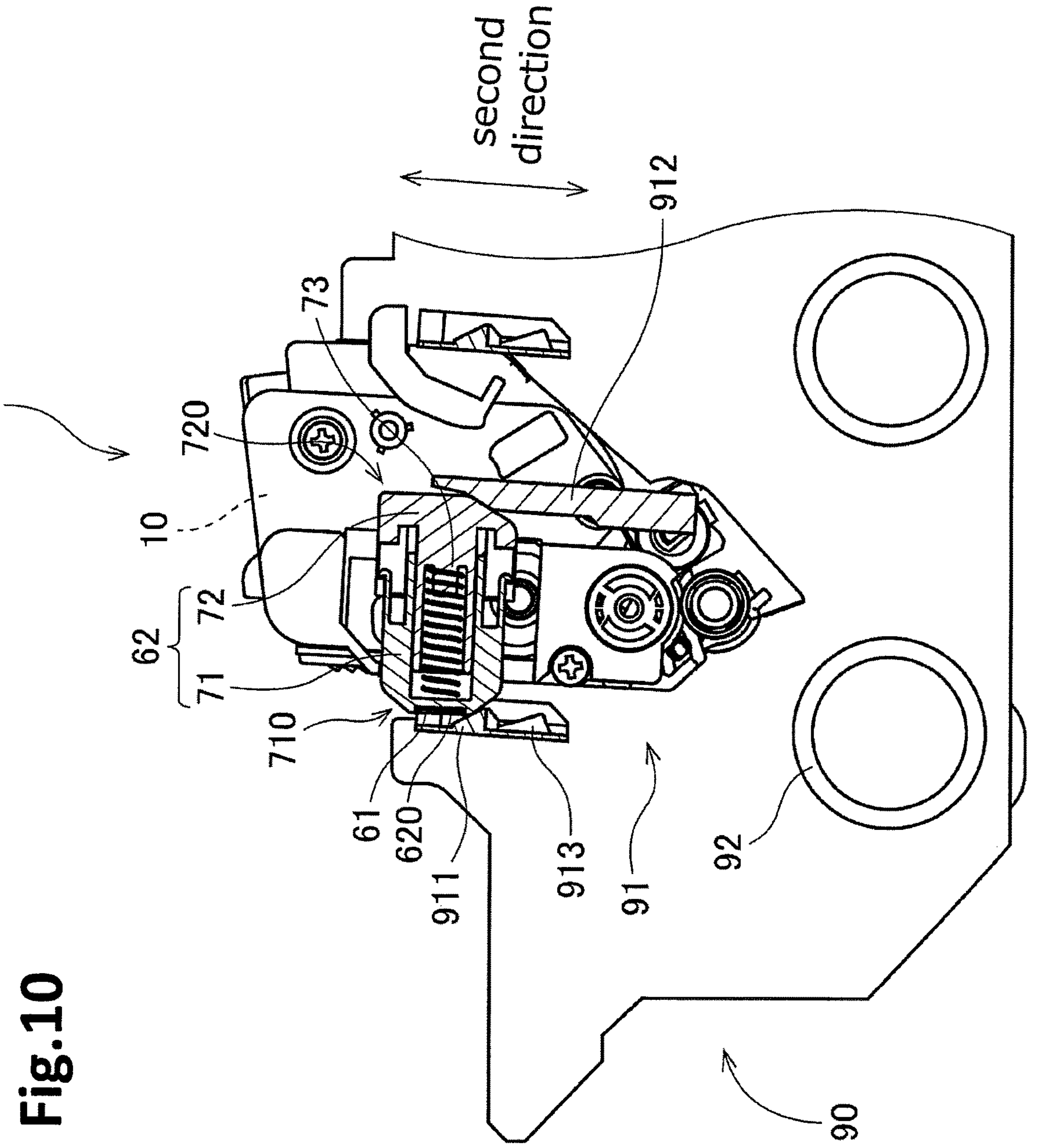
FIG. 10 is a view for illustrating the attachment of the developing cartridge.

When the developing cartridge 1 is inserted into the cartridge holding portion 91, the first guide surface 711 of the holder 62 contacts the end of the first guide plate 911 in the second direction, as illustrated in FIG. 9. Then, the first guide plate 911 presses the first guide surface 711, thereby the holder 62 moves in the first direction. At this time, the movement of the holder 62 is relative movement with respect to the casing 10. As a result, the holder 62 is positioned between the first guide plate 911 and second guide plate 912 in the first direction, as illustrated in FIG. 10.

The first end portion 710 of the first holder member 71 then contacts the first guide plate 911. The second end portion 720 of the second holder member 72 also contacts the second guide plate 912. The coil spring 73 is more compressed in the first direction than the first state.

Figure 11:
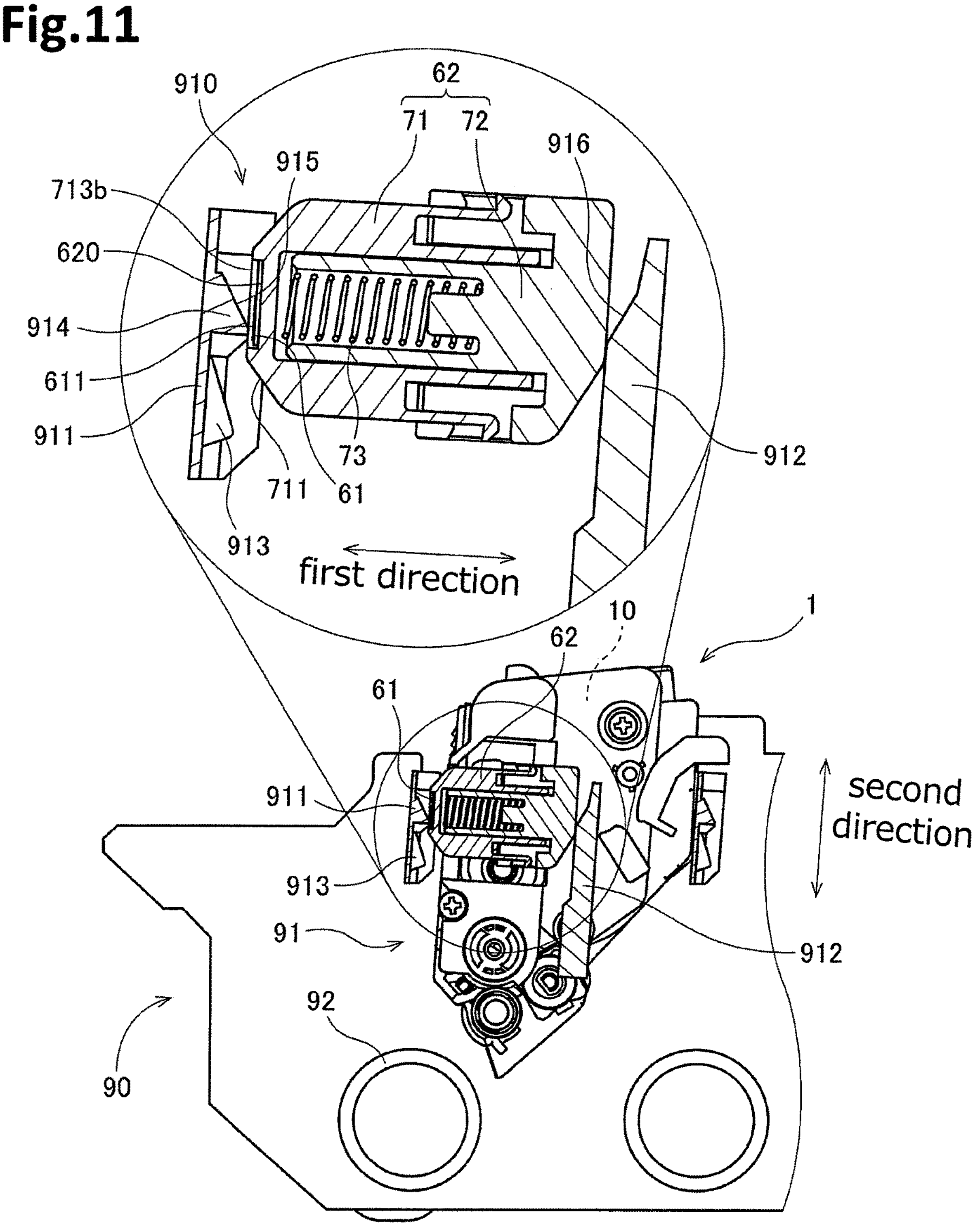
FIG. 11 is a view for illustrating the attachment of the developing cartridge.

As illustrated in FIG. 11, the first guide plate 911 includes a guide protrusion 914 protruding toward the second guide plate 912. The guide protrusion 914 is positioned closer to the insertion opening 910 than the electric connector 913. The guide protrusion 914 includes a first inclined surface 915. The second guide plate 912 also includes a second inclined surface 916. The distance between the first inclined surface 915 and second inclined surface 916 in the first direction becomes gradually smaller toward the inserting direction of the developing cartridge 1.

When the developing cartridge 1 is further inserted in the second direction, the first holder member 71 contacts the first inclined surface 915 and the second holder member 72 contacts the second inclined surface 916. As a result, the first holder member 71 and second holder member 72 become closer to each other in the first direction and the length of the coil spring 73 in the first direction becomes shorter gradually. When each of the third guide surfaces 713*a*, 713*b* of the first holder member 71 contacts the top portion of the guide protrusion 914, the length of the coil spring 73 in the first direction becomes shortest. That is, a length of the coil spring 73 in the first direction becomes a shortest state, and a length of the coil spring 73 in the shortest state is shorter than a length of the coil spring 73 in the second state described above. The position of the holding surface 620 relative to the casing 10 in the first direction is the intermediate position described above.

As described above, the IC chip assembly 60 can change the position of the holding surface 620 in the first direction when the developing cartridge 1 is inserted into the drawer unit 90. As a result, the developing cartridge 1 can be inserted into the drawer unit 90 by changing the position of the holding surface 620 in the first direction along the guide protrusion 914. Therefore, the developing cartridge 1 can be inserted into the drawer unit 90 with suppressing friction of the electric contact surface 611 of the IC chip 61. In addition, as illustrated FIGS. 10, 11, and 12, the electric contact surface 611 directly contacts the electric connector 913 after the first guide surface 711 moves over the guide protrusion 914. As a result, friction of the electric connector 913 can be reduced.

In particular, in the developing cartridge 1 according to the present embodiment, the electric contact surface 611 of the IC chip 61 is positioned at a recessed area which is recessed relative to the third guide surfaces 713*a*, 713*b*. As a result, the top portion of the guide protrusion 914 contacts only the third guide surfaces 713*a*, 713*b* but does not contact the electric contact surface 611 in the state illustrated in FIG. 11. Therefore, friction of the guide protrusion 914 against the electric contact surface 611 can be prevented.

Figure 12:
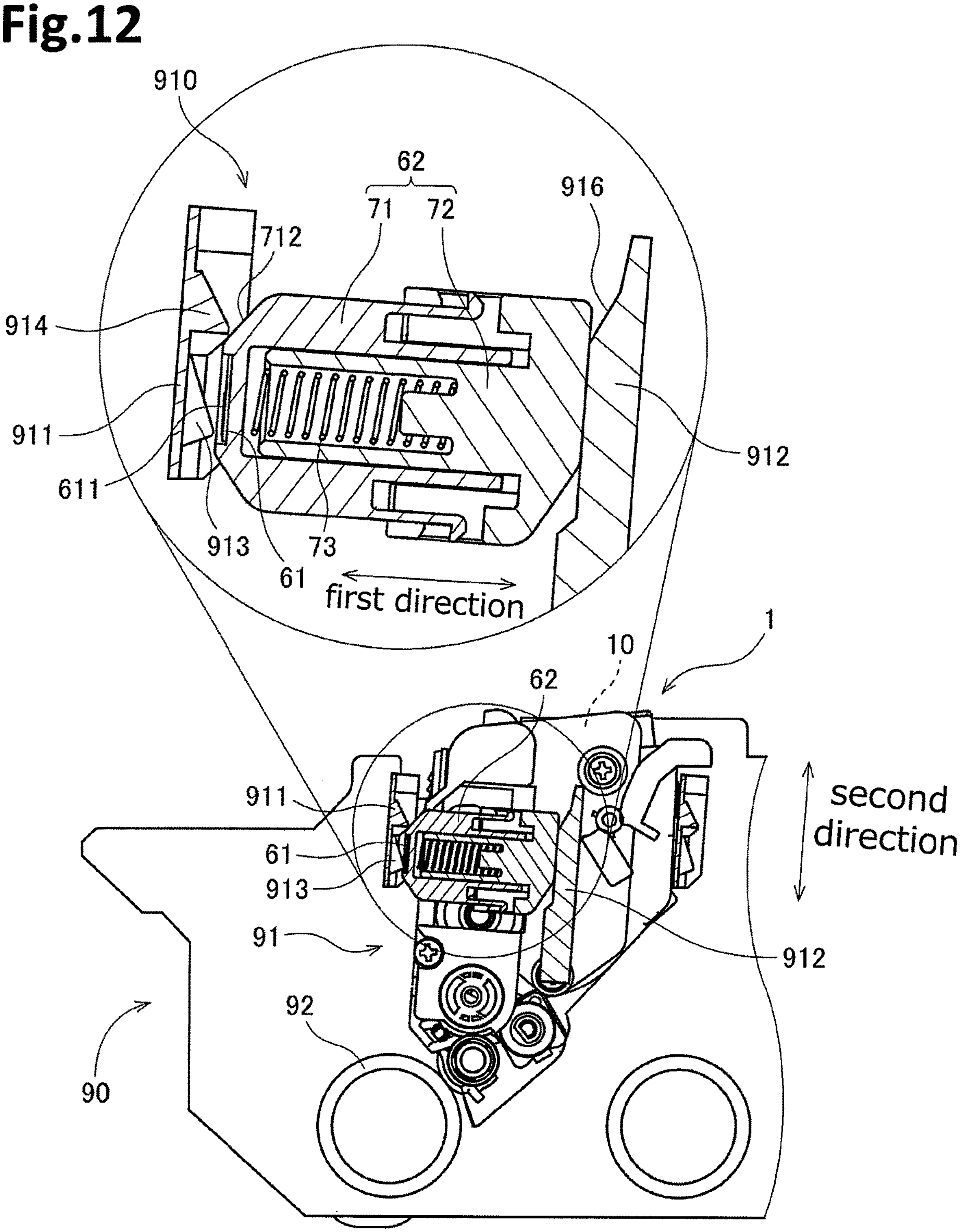
FIG. 12 is a view for illustrating the attachment of the developing cartridge.
Figure 13:
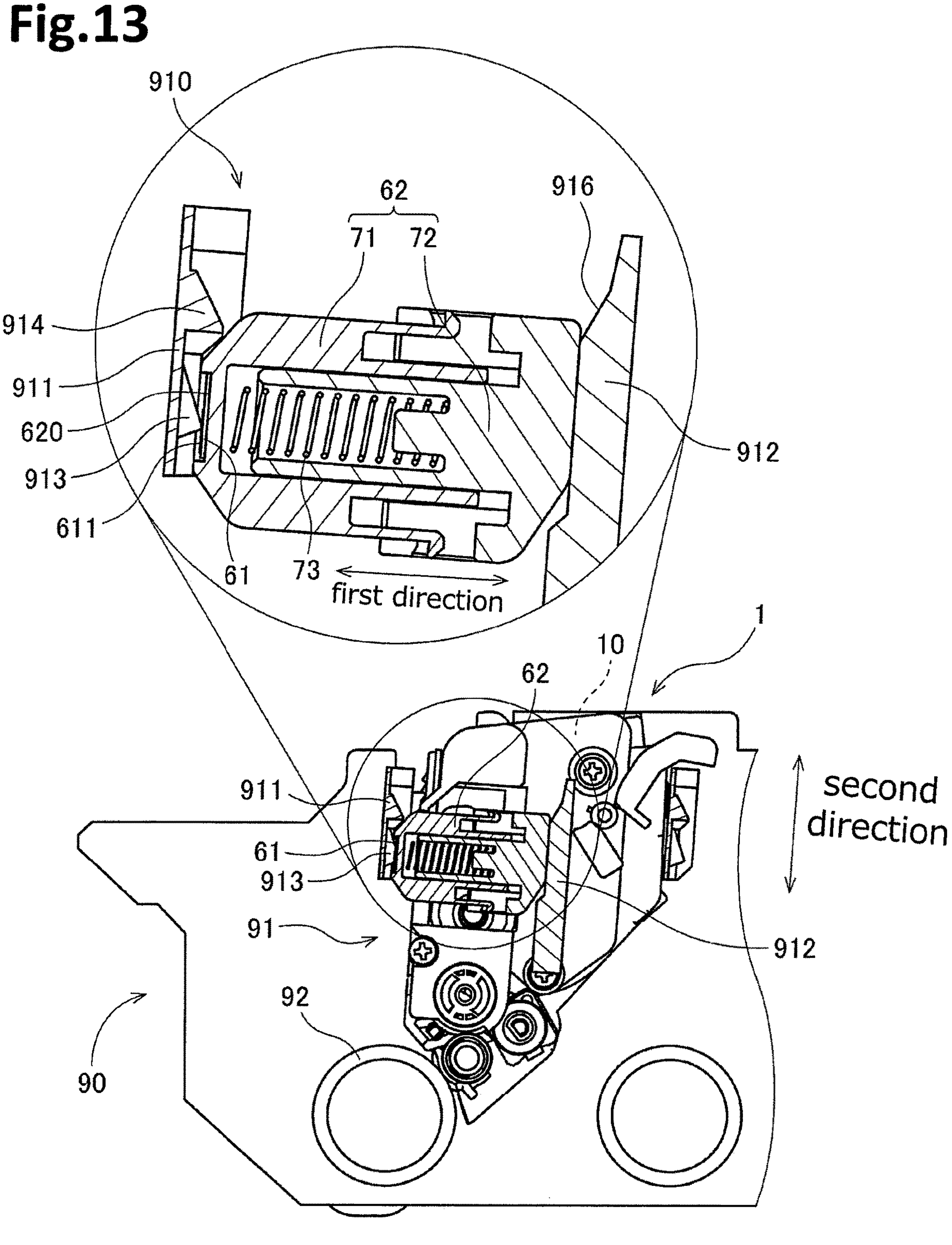
FIG. 13 is a view for illustrating the attachment of the developing cartridge.

When the developing cartridge 1 is further inserted into the second direction, the third guide surfaces 713*a*, 713*b* pass the guide protrusion 914. The second guide surface 712 then contacts the guide protrusion 914 as illustrated in FIG. 12. With such contact, the coil spring 73 stretches again from the shortest state to the second state described above. As a result, the electric contact surface 611 of the IC chip 61 contacts the electric connector 913 as illustrated in FIG. 13. The length in the first direction of the coil spring 73 in the second state is shorter than the length of the coil spring 73 in the first state and the length in the first direction of the coil spring 73 in the second state is longer than the length of the coil spring 73 in the shortest state. In addition, the length in the first direction of the coil spring 73 in the second state is shorter than the natural length of the coil spring 73. The relative position of the holding surface 620 with respect to the casing 10 in the first direction corresponds to the contact position described above.

Consequently, the IC chip assembly 60 is fixed in a state where the IC chip assembly 60 is nipped between the electric connector 913 and second guide plate 912. In the present embodiment, the casing 10 is then inclined in the first direction as shown by a dashed arrow illustrated in FIG. 14. As a result, the developing roller 30 contacts the photosensitive drum 92 in the drawer unit 90. At this time, the position of the holding surface 620 relative to the casing 10 in the first direction changes from the contact position to the final position described above. The boss 621*a* moves inside of the through-hole 451*a* in the first direction and the boss 621*b* moves inside of the through-hole 451*b* in the third direction. As a result, the boss 621*a* is not in contact with the edge of the through-hole 451*a* of the first cover 45, and the boss 621*b* is not in contact with the edge of the through-hole 451*b* of the first cover 45. Thus, the IC chip assembly 60 and first cover 45 are not in contact with each other. Accordingly, oscillation of the drive unit such as the first gear portion 40 and the like is difficult to be transmitted to the IC chip assembly 60 when the image forming apparatus executes the print process. Therefore, the contact state of the electric contact surface 611 and electric connector 913 can be sufficiently maintained.

4. Separating operation

Figure 3:
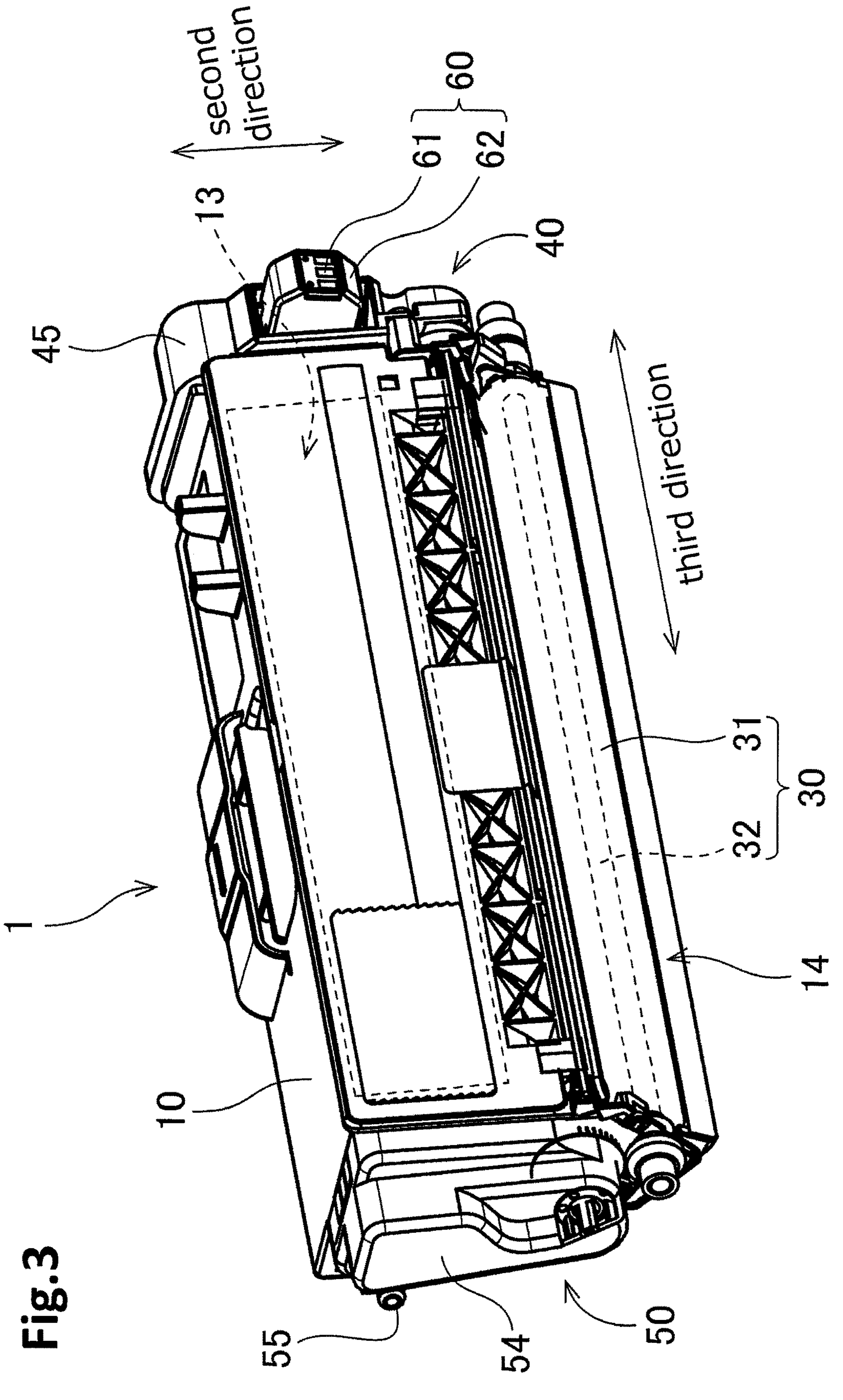
FIG. 3 is a perspective view of the developing cartridge.

After the developing cartridge 1 is attached to the drawer unit 90, the drawer unit 90 can perform a "separating operation" in which the developing roller 30 is temporarily separated from the photosensitive drum 92. As illustrated in FIG. 2, the first cover 45 of the developing cartridge 1 includes a first columnar protrusion 46 extending in the third direction. As illustrated in FIG. 3, the second cover 54 of the developing cartridge 1 includes a second columnar protrusion 55 extending in the third direction. As illustrated in FIG. 1, the drawer unit 90 includes a pressure member 93. The pressure member 93 is positioned at one side portion of the cartridge holding portion 91 in the third direction, and another pressure member (not shown in the FIG. 1) is positioned at another side portion of the cartridge holding portion 91 in the third direction. The other pressure member has same structures of the pressure member 93 and same functions of the pressure member 93. Each of four cartridge holding portions 91 includes the pressure member 93 and the other pressure member.

Figure 14:
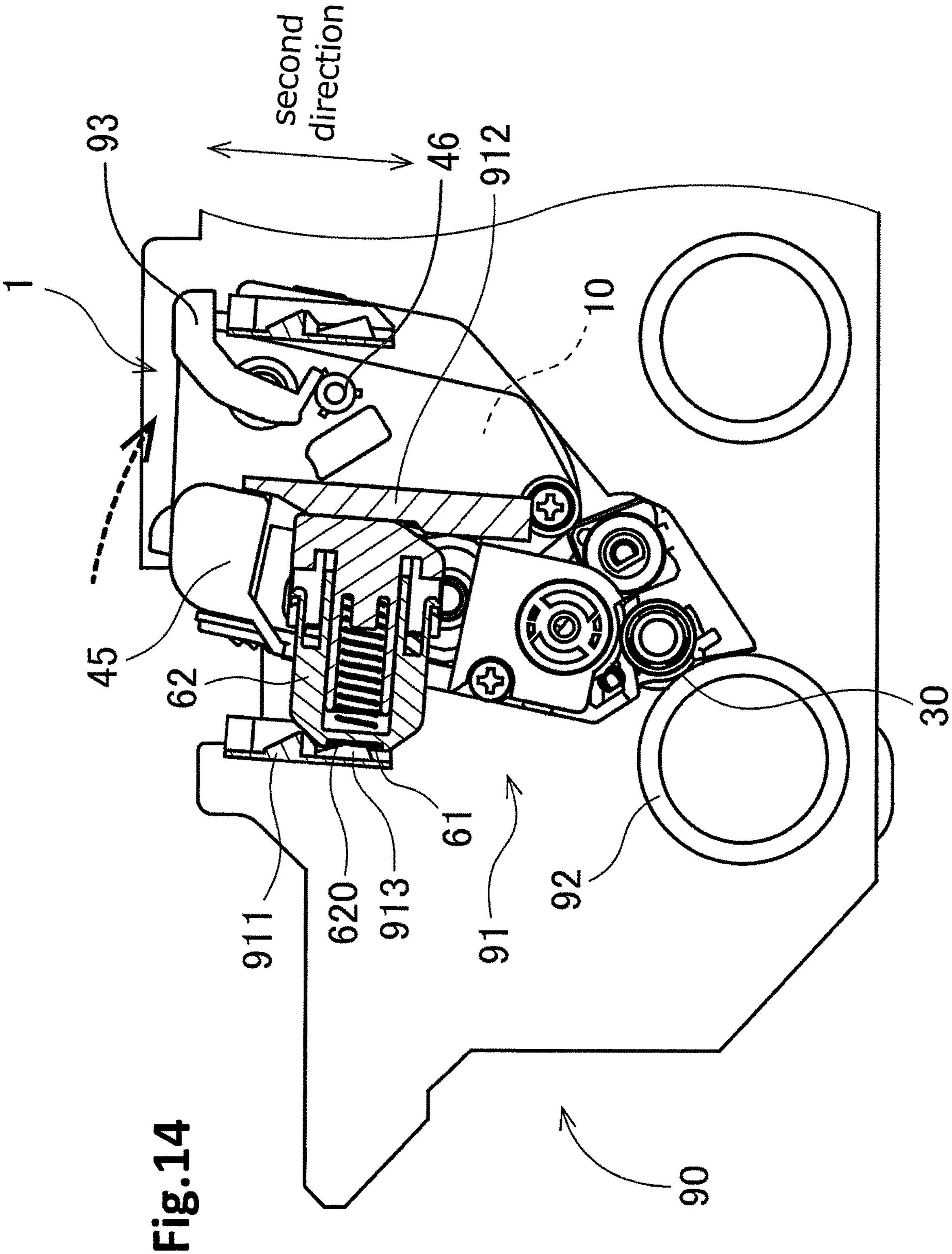
FIG. 14 is a view for illustrating the attachment of the developing cartridge.

In the motion indicated by the dashed arrow in FIG. 14, the pressure member 93 presses the first columnar protrusion 46 and the other pressure member 93 presses the second columnar protrusion 55 in the same manner as the pressure member 93 presses the first columnar protrusion 46 as shown in FIG. 14, and the casing 10 is thus inclined in the first direction. Accordingly, the position of the holding surface 620 in the first direction relative to the casing 10 is changed from the contact position to the final position, described above.

Figure 15:
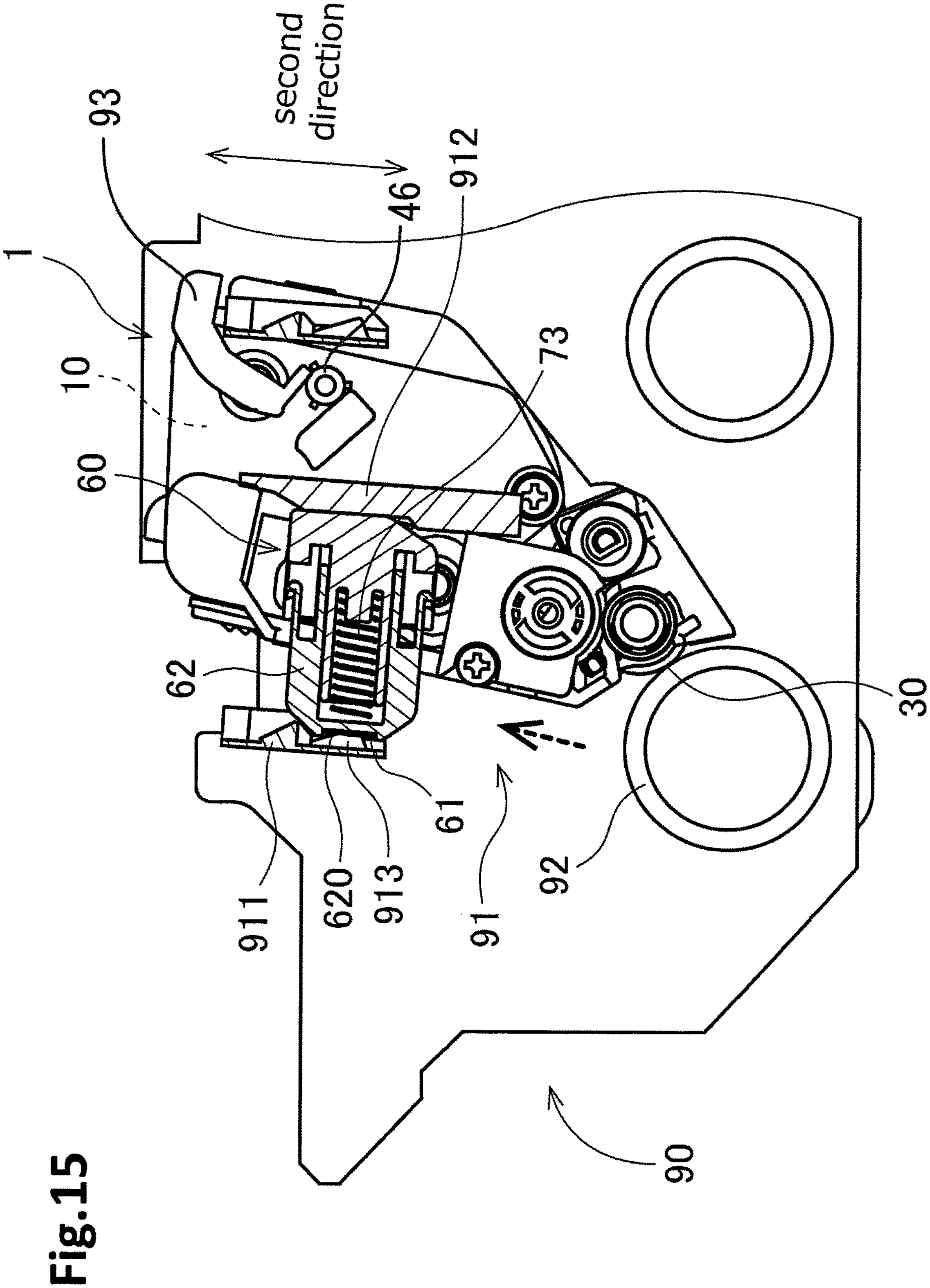
FIG. 15 is a view for illustrating a separating operation.

FIG. 15 illustrates the developing cartridge 1 in the separating operation. During the separating operation, the driving force from the image forming apparatus changes the positions of the first columnar protrusion 46 and the second columnar protrusion 55. Specifically, the lever of the drawer unit 90 (not illustrated) presses each of the first columnar protrusion 46 and the second columnar protrusion 55, and each of the first columnar protrusion 46 and the second columnar protrusion 55 thus moves against the pressing force of the pressure member 93. Consequently, as shown by a dashed arrow illustrated in FIG. 15, the casing 10 and the developing roller 30 of the developing cartridge 1 move in the second direction so as to separate away from the photosensitive drum 92.

Meanwhile, the IC chip assembly 60 is fixed in a state where the IC chip assembly 60 is nipped between the electric connector 913 and the second guide plate 912. Accordingly, the position of the IC chip assembly 60 is not changed relative to the drawer unit 90, when the casing 10 and the developing roller 30 move in the second direction so that the developing roller 30 is separated from the photosensitive drum 92. Further, the state of the coil spring 73 does not change from the second state. As a result, the position of the holder 62 relative to the casing 10 in the second direction changes from a standard position (first position) to a separation position (second position). The boss 621*a* then moves inside of the through-hole 451*a* in the second direction and the boss 621*b* then moves inside of the through-hole 451*b* in the second direction.

As described above, the developing cartridge 1 can change the position of the casing 10 relative to the drawer unit 90 in the second direction, without changing the position of the electric contact surface 611 in the second direction relative to the drawer unit 90. Accordingly, the developing cartridge 1 can maintain the contacting state between the electric contact surface 611 and the electric connector 913 during the separating operation. The contacting state between the electric contact surface 611 and the electric connector 913 can also be maintained during the shipment of the image forming apparatus in which the developing cartridge 1 is attached to the drawer unit 90. Accordingly, abrasion or wear of the electric contact surface 611 can be suppressed.

5. Modifications

While the description has been made in detail with reference to the specific embodiment thereof, it would be apparent to those skilled in the art that various changes and modifications may be made therein without departing from the spirit and scope of the above described embodiment. In the following description, differences between the above embodiment and the modifications are mainly explained.

5-1. First Modification

Figure 16:
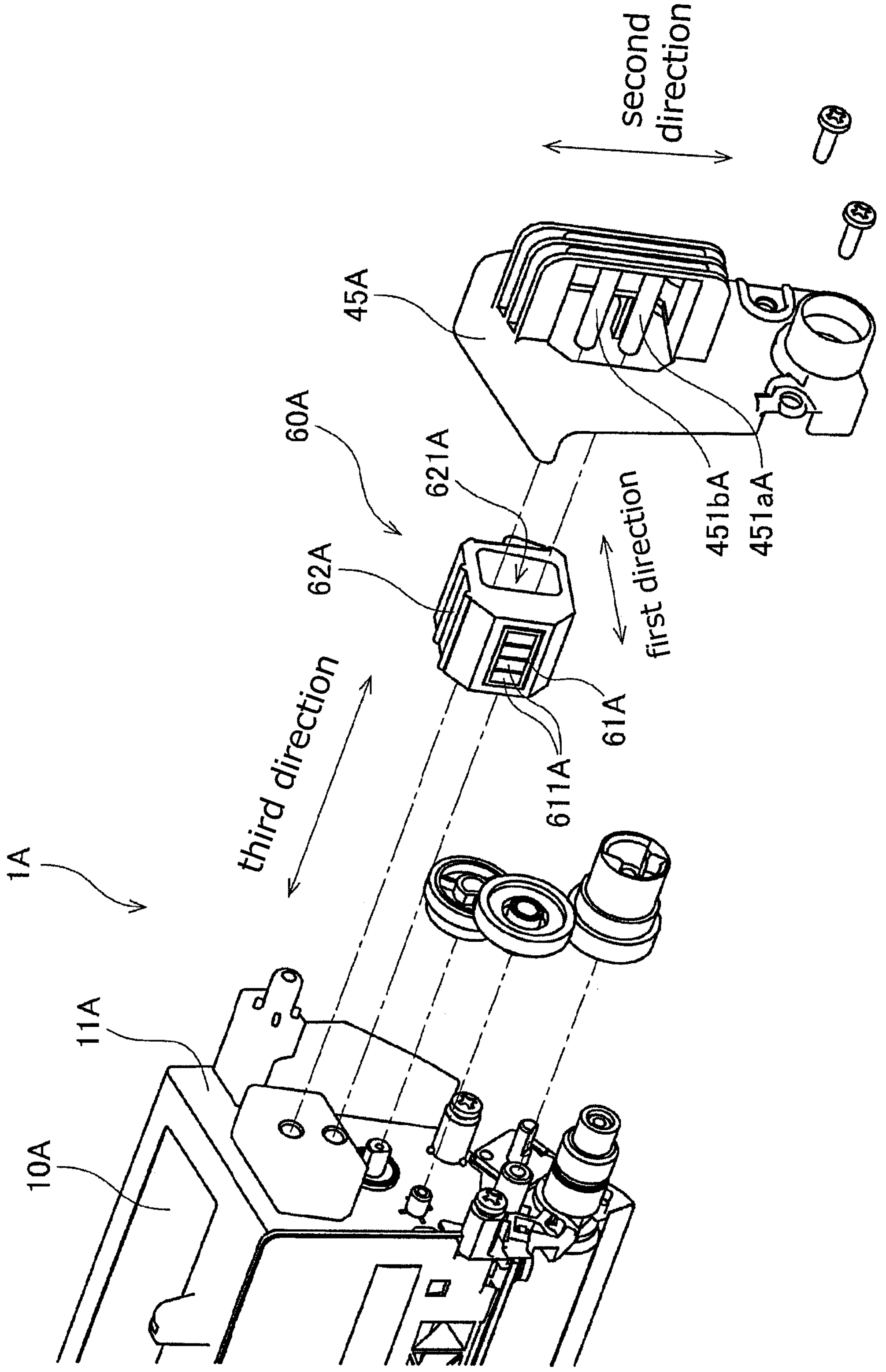
FIG. 16 is a partial exploded perspective view of a developing cartridge according to a first modification.

In the following a first modification of the main embodiment is discussed. Due to the many similarities between the first modification and the main embodiment only differences between the main embodiment and the first modification will be discussed. With regard to all other features reference is made to the discussion of the main embodiment above. FIG. 16 is a partial exploded perspective view of the developing cartridge 1A according to a first modification. In the first modification, at least a portion of the holder 62A holding the IC chip 61A is covered by the first cover 45A, as illustrated in FIG. 16. As illustrated in FIG. 16, the first cover 45A includes a boss 451*a*A and a boss 451*b*A. The boss 451*a*A and the boss 451*b*A are arrayed in the second direction. Each of the boss 451*a*A and the boss 451*b*A extends from the first cover 45A toward the casing 10A in the third direction. The holder 62A has a through-hole 621A that penetrates the holder 62A in the third direction. Both of the boss 451*a*A and the boss 451*b*A are inserted in the through-hole 621A.

The boss 451*a*A includes one edge of the boss 451*a*A and another edge of the boss 451*a*A in the second direction, and the boss 451*b*A includes one edge of the boss 451*b*A facing the other edge of the boss 451*a*A in the second direction and another edge of the boss 451*b*A in the second direction. The through-hole 621A has a dimension in the second direction greater than the distance between the one edge of the boss 451*a*A and the other edge of the boss 451*b*A in the second direction. Specifically, the distance between the one edge of the boss 451*a*A and the other edge of the boss 451*b*A in the second direction is the longest distance the boss 451*a*A and the boss 451*b*A in the second direction, and the dimension of the through-hole 621A in the second direction is greater than the longest distance. The holder 62A can move together with the through-hole 621A in the second direction relative to both the casing 10A and the first cover 45A. When the holder 62A moves in the second direction, the IC chip 61A having the electric contact surface 611A moves in the second direction together with the holder 62A.

The dimension of the through-hole 621A in the first direction is greater than each dimension of the boss 451*a*A and the boss 451*b*A in the first direction. Accordingly, the holder 62A, can move together with the through-hole 621A in the first direction relative to both the casing and the first cover 45A. When the holder 62A moves in the first direction, the IC chip 61A having the electric contact surface 611A moves in the first direction together with the holder 62A. The holder 62A may be movable in the third direction between the first cover 45A and the first outer surface 11A.

As described above, the first cover 45A may include the boss 451Aa and boss 451*b*A, and the holder 62A may have the through-hole 621A, so that the electric contact surface 611 can move relative to the casing 10A in the first and second directions. In accordance with the configuration, the boss 451*a*A and the boss 451*b*A can be moved in the first direction inside of the through-hole 621A when the casing 10A is inclined in the first direction during the attachment of the developing cartridge 1A to the drawer unit 90. When the separating operation is performed after the developing cartridge 1A is attached to the drawer unit 90, the boss 451*a*A and the boss 451*b*A can move in the second direction inside of the through-hole 621A. As a result, the position of the casing 10A can be changed in a state where the contact state of the electric contact surface 611A and the electric connecter is satisfactorily maintained.

Instead of the boss 451*a*A and the boss 451*b*A, the number of the bosses may be one, or more than or equal to three. The number of the through-holes 621A formed on the holder 62A may be more than or equal to two. Instead of the through-hole 621A, the holder 62A may have a recessed portion in which the boss 451*a*A and the boss 45*b*A can be inserted. Further, the first outer surface of the casing may have a boss and the holder has the through-hole or the recessed portion through which the boss of the casing is inserted. Each of the boss 451*a*A and the boss 451*b*A may have either a cylindrical shape or a prism shape.

Figure 17:
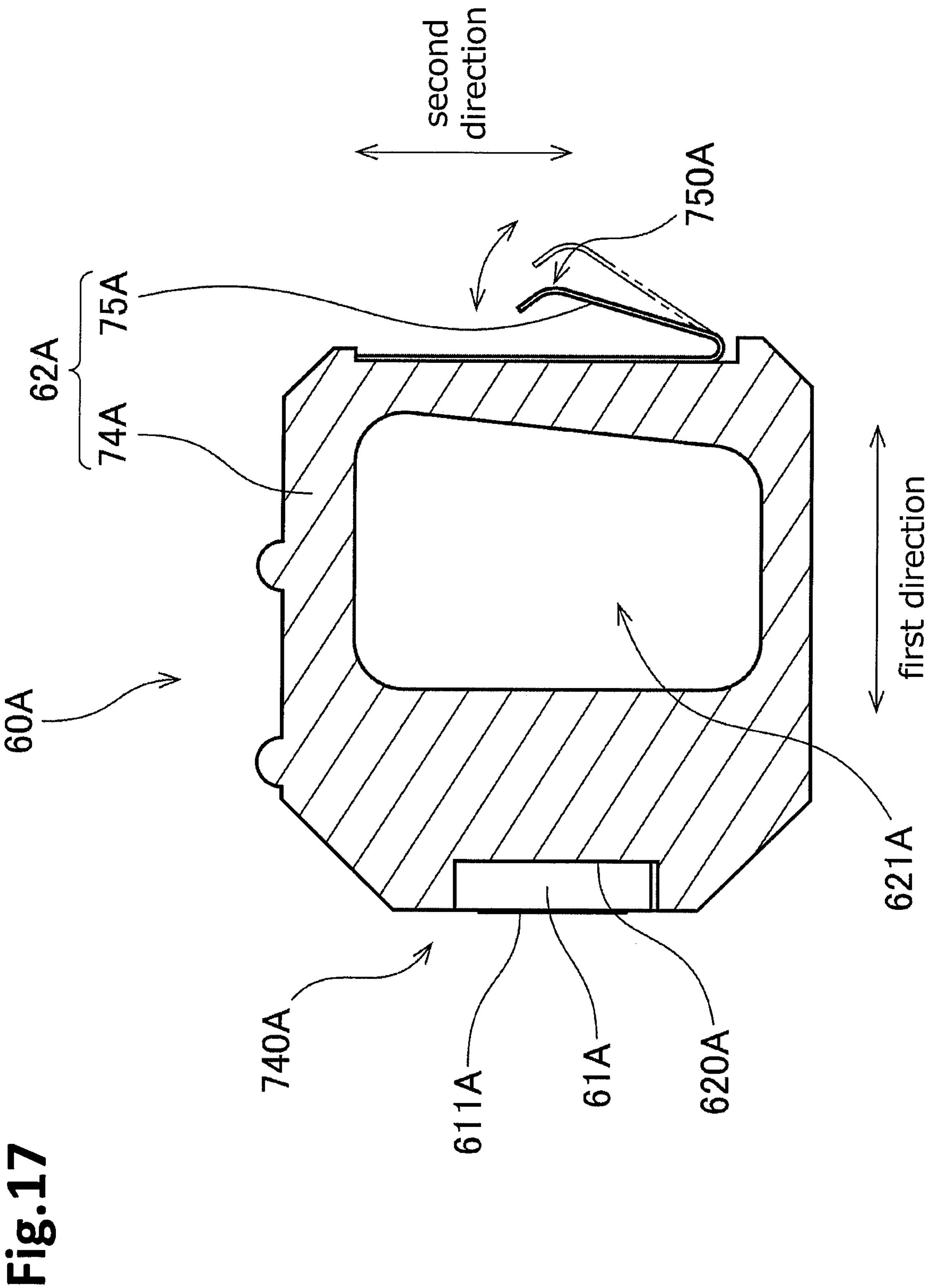
FIG. 17 is a cross-sectional view of an IC (Integrated Circuit) chip assembly according to the first modification.

FIG. 17 is a cross-sectional view of the IC chip assembly 60A indicated in FIG. 16 taken along a plane orthogonal to the third direction. As illustrated in FIG. 17, the holder 62A of the IC chip assembly 60A includes a holder member 74A made of resin and a leaf spring 75A fixed to the holder member 74A. The holder member 74A includes a first end portion 740A that is positioned at one end portion of the holder 62A in the first direction. The IC chip 61A is fixed to the holding surface 620A that is portion of the outer surface of the first end portion 740A. The leaf spring 75A includes a second end portion 750A that is positioned at the other end portion of the holder 62A in the first direction. The first end portion 740A and the second end portion 750A are separated from each other in the first direction in the assembled holder 62A.

The leaf spring 75A is made of a bent elastic metal plate, for example. The leaf spring can be stretched or compressed in the first direction between a first state, and a second state in which the leaf spring 75A is bent more than in the first state. The length in the first direction of the leaf spring 75A in the first state is larger than the length in the first direction of the leaf spring in the second state. That is, the distance in the first direction between the first end portion 740A and the second end portion 750A in the first state is longer than the distance in the first direction between the first end portion 740A and the second end portion 750A in the second state. The length in the first direction of the leaf spring 75A in the second state is smaller than the natural length of the leaf spring 75A.

As described above, instead of the coil spring, the leaf spring 75A may be used so that the IC chip assembly 60A can be stretched or compressed in the first direction. Further, as described above, the dimensional difference between the boss 451*a*A and the through-hole 621A, the dimensional difference between the boss 451*b*A and the through-hole 621A and stretch and compression of the leaf spring 75A enable the electric contact surface 611A to move in the first direction relative to the casing 10A, when the developing cartridge 1A is being attached to the drawer unit 90.

5-2. Second Modification

Figure 18:
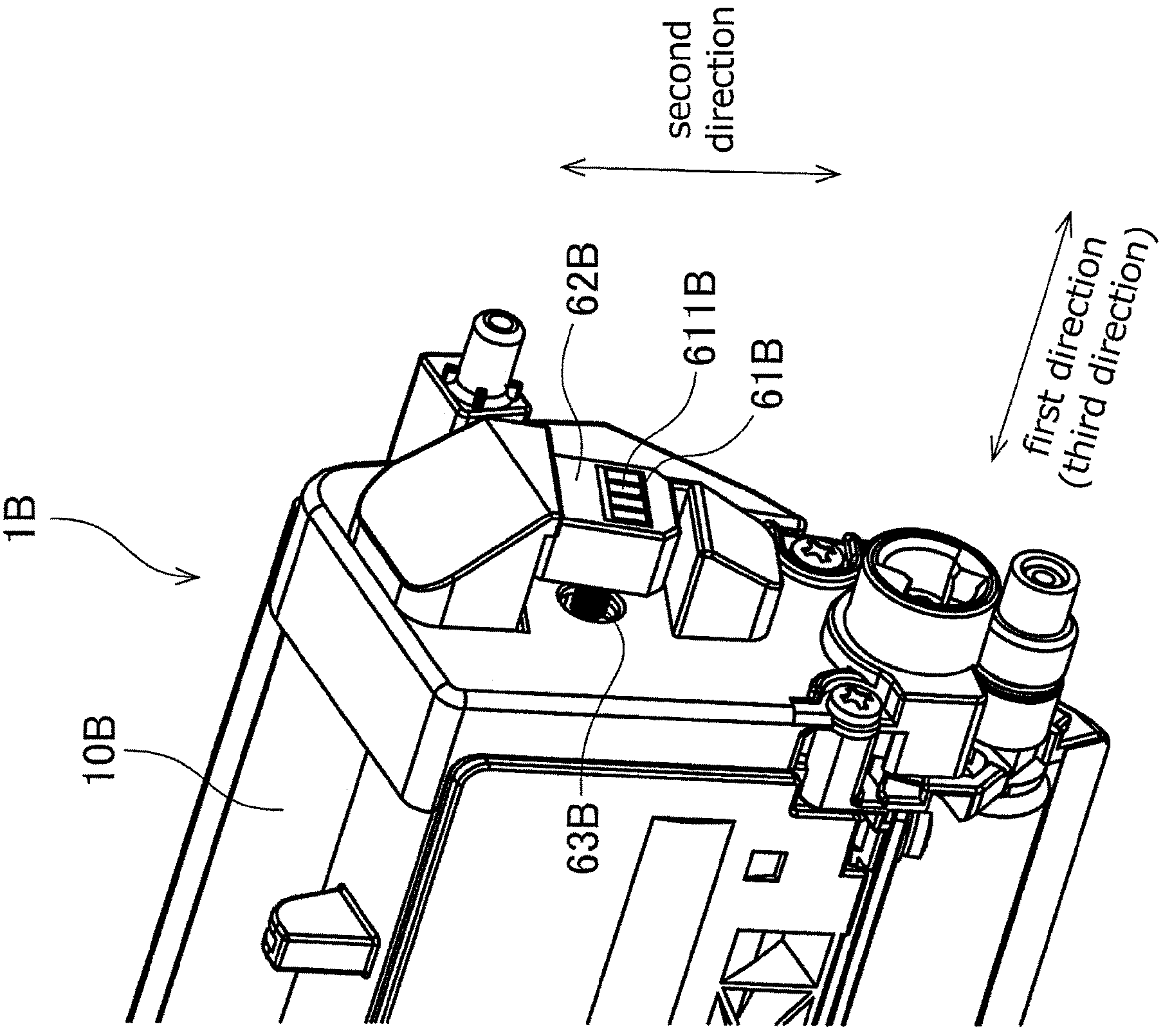
FIG. 18 is a partial perspective view of a developing cartridge according to a second modification.

In the following, a second modification of the main embodiment is discussed. Due to the many similarities between the second modification and the main embodiment only differences between the main embodiment and the second modification will be discussed. With regard to all other features reference is made to the discussion of the main embodiment above. FIG. 18 is a partial perspective view illustrating a developing cartridge 1B according to a second modification. In the second modification depicted in FIG. 18, the electric contact surface 611B of an IC chip 61B is oriented to face in the third direction. Accordingly, in the second modification, the first direction orthogonal to the electric contact surface 611B is the same direction as the third direction. In the second modification depicted in FIG. 18, a columnar elastic body 63B is positioned between a casing 10B and an IC chip assembly 60B. As the columnar elastic body 63B, for example, a coil spring extending in the first direction may be used. The columnar elastic body 63B includes one end portion in the third direction, and the one end portion is fixed to a holder 62B of the IC chip assembly 60B. The columnar elastic body 63B includes another end portion in the third direction, and the other end portion is fixed to a first outer surface of the casing 10B. That is, the casing 10B and the IC chip assembly 60B are connected to each other by the columnar elastic body 63B.

Figure 19:
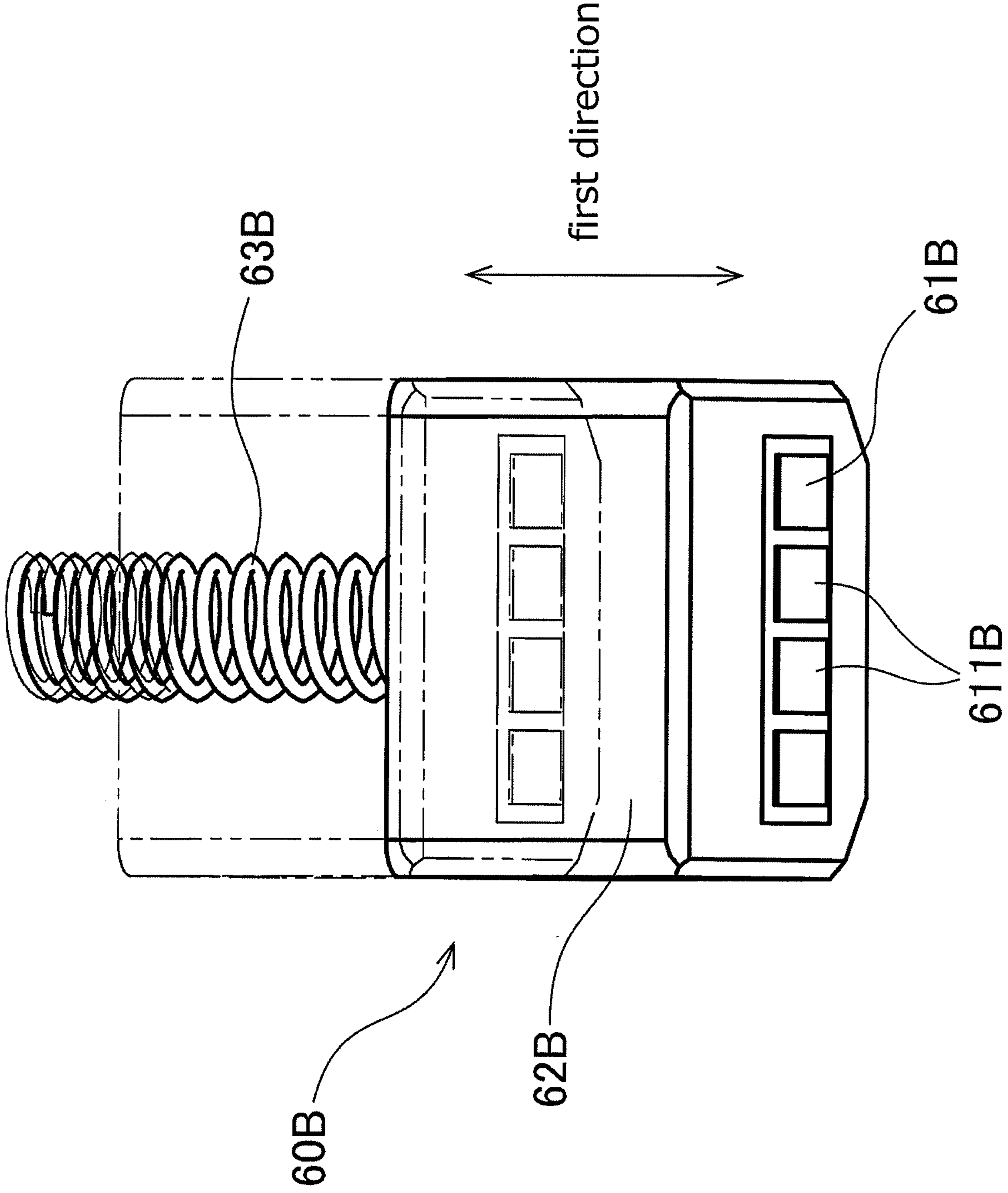
FIG. 19 is a view for illustrating the operation of a columnar like resilient member and an IC chip assembly according to the second modification.
Figure 20:
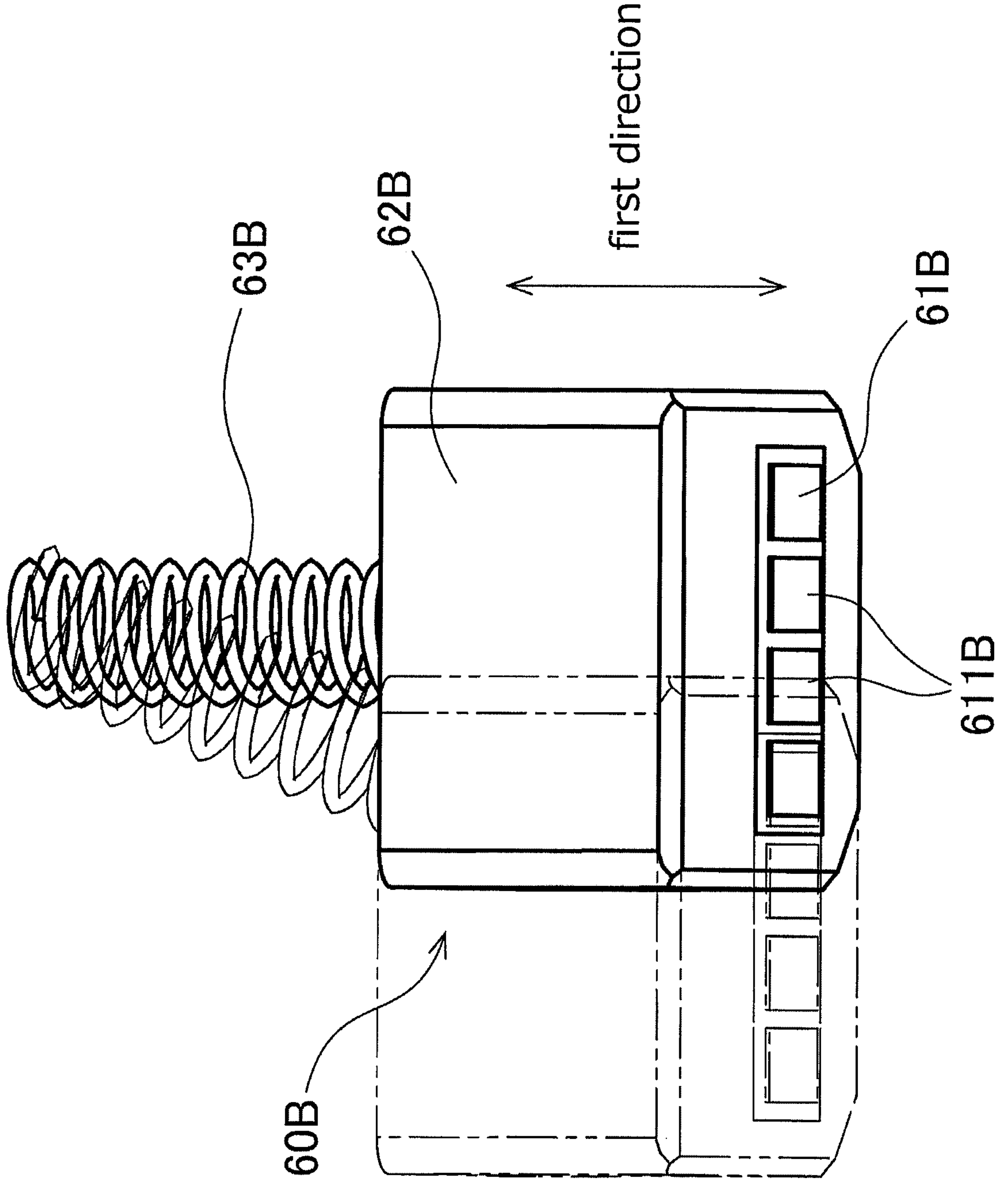
FIG. 20 is a view for illustrating the operation of the columnar like resilient member and the IC chip assembly according to the second modification.

FIGS. 19 and 20 are explanatory diagrams illustrating movement of the IC chip assembly 60B in accordance with deformation of the columnar elastic body 63B. As illustrated in FIG. 19, the columnar elastic body 63B is capable of being stretched or compressed in the first direction. As the columnar elastic body 63B is stretched or compressed, the position of the electric contact surface 611B relative to the casing 10B in the first direction also changes. Further, as illustrated in FIG. 20, the columnar elastic body 63B can deform in a direction diagonal to the first direction. As the columnar elastic body 63B diagonally deforms, the position of the one end of the columnar elastic body 63B also changes relative to another end of the columnar elastic body 63B in a direction perpendicular to the first direction.

Figure 21:
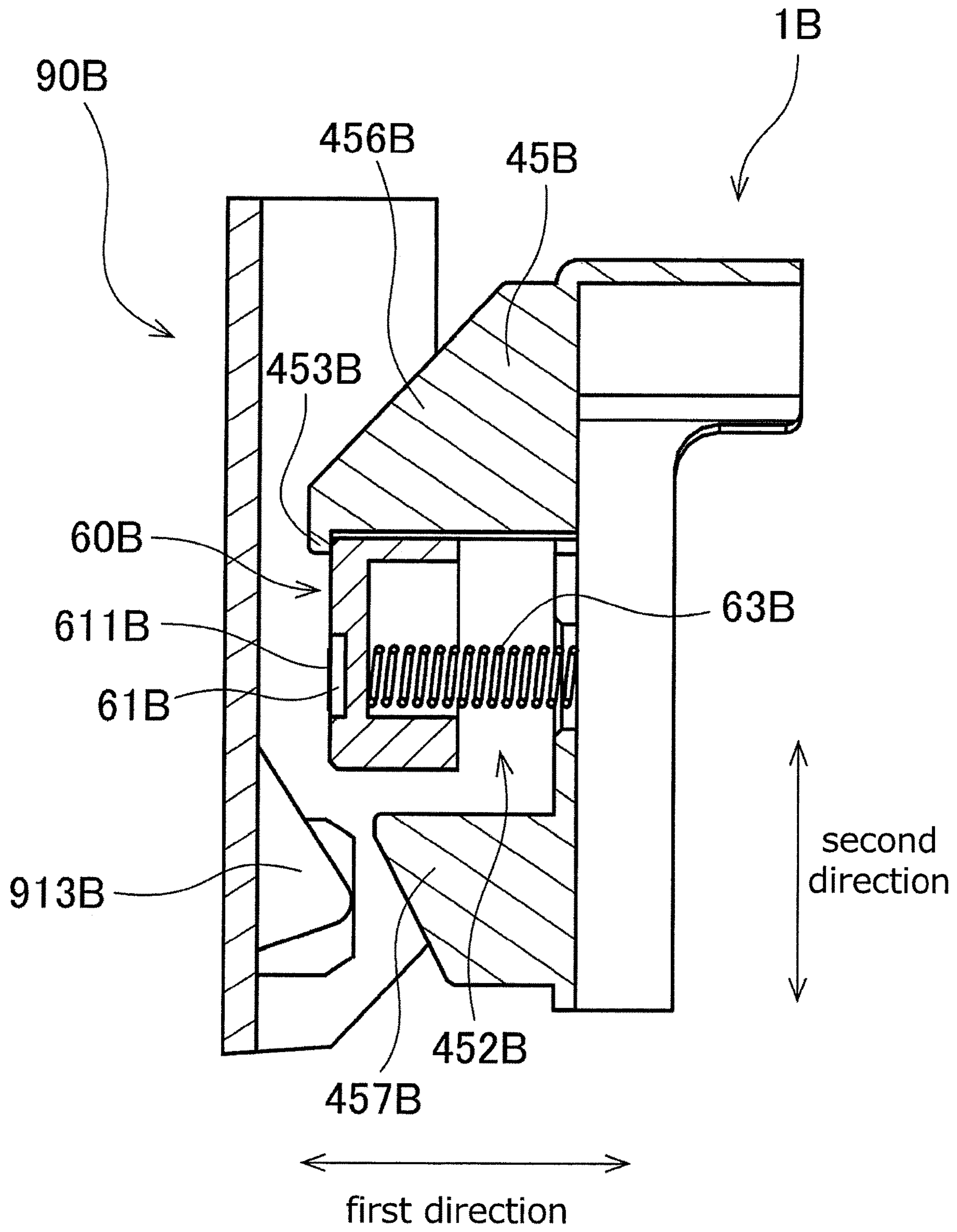
FIG. 21 is a view for illustrating an assembly of a developing cartridge according to the second modification.
Figure 22:
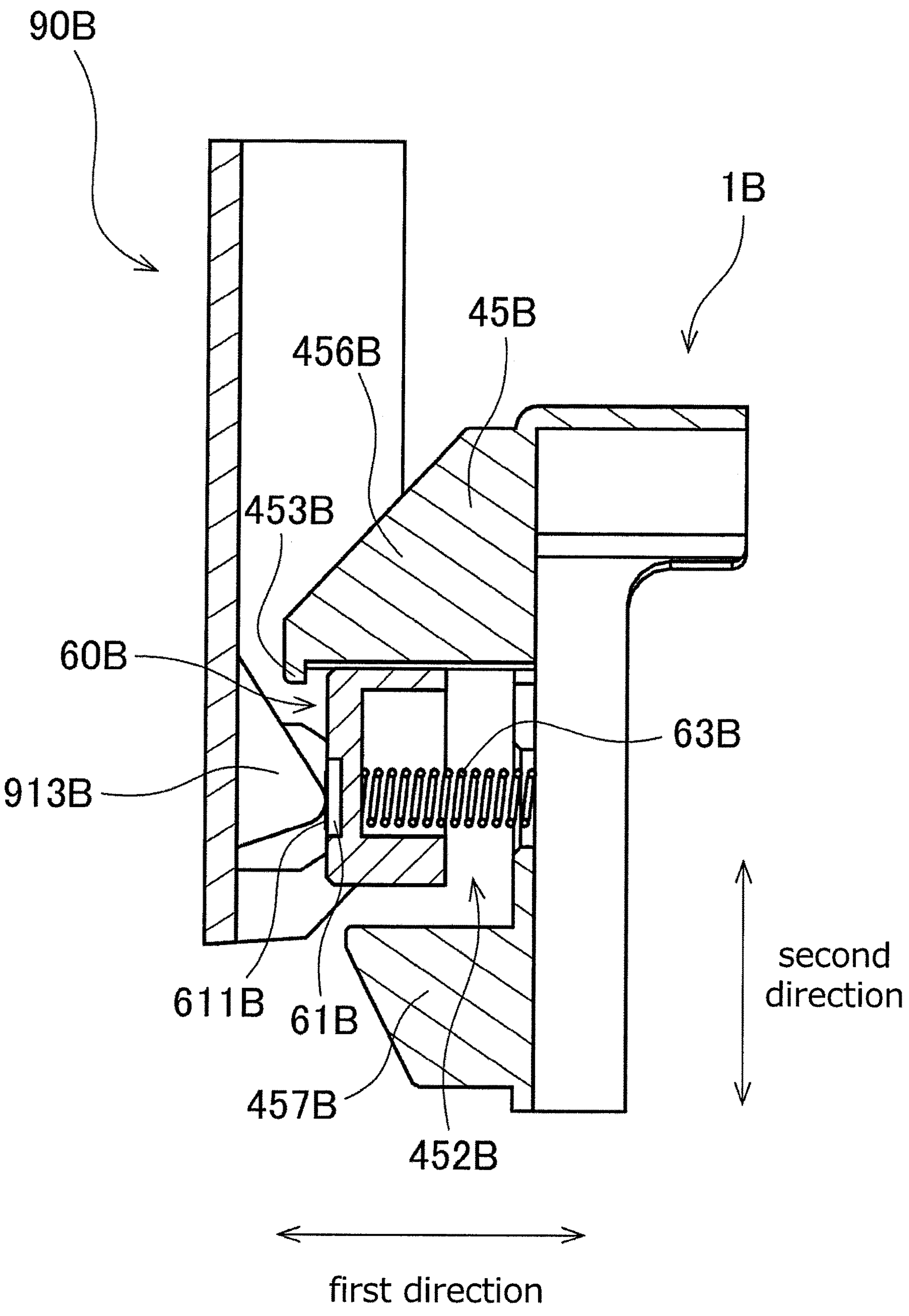
FIG. 22 is a view for illustrating the assembly of the developing cartridge according to the second modification.

FIGS. 21 and 22 are explanatory diagrams illustrating how the developing cartridge 1B according to the second modification is attached to a drawer unit 90B. As illustrated in FIGS. 21 and 22, a first cover 45B includes a first frame portion 456B and a second frame portion 457B, and the first frame portion 456B and the second frame portion 457B are arranged with a gap between the first frame portion 456B and the second frame portion 457B in the second direction. The IC chip assembly 60B and the columnar elastic body 63B are accommodated in an accommodating portion 452B which defines a space between the first frame portion 456B and the second frame portion 457B. The first cover 45B further includes a pawl 453B protruding from the first frame portion 456B toward the accommodating portion 452B. As illustrated in FIG. 21, before the developing cartridge 1B is attached to the drawer unit 90B, a portion of the IC chip assembly is in contact with the pawl 453B. Hence, the columnar elastic body 63B is maintained in a more compressed state than the natural length of the columnar elastic body 63B in the first direction.

When the developing cartridge 1B has been attached to the drawer unit 90B, as illustrated in FIG. 22, the electric contact surface 611B of the IC chip 61B contacts an electric connector 913B. In this state, a length of the columnar elastic body 63B in the first direction is shorter than the length in the first direction of the columnar elastic body 63B in the compressed state illustrated in FIG. 21. Thus, due to a repulsion force of the columnar elastic body 63B, a contact state between the electric contact surface 611B and the electric connector 913B is maintained.

Figure 23:
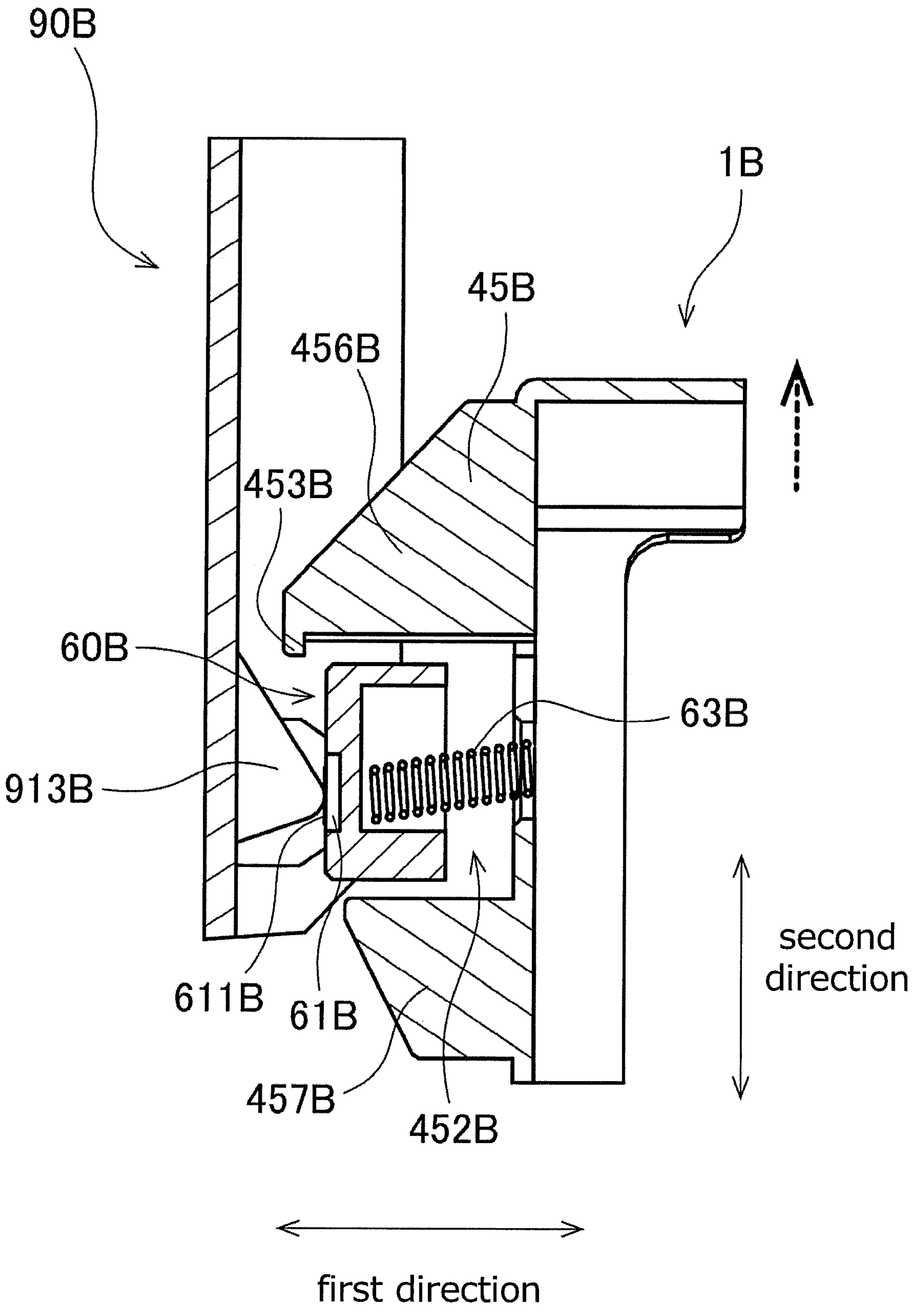
FIG. 23 is a view illustrating a separating operation in the developing cartridge according to the second modification.

FIG. 23 is an explanatory diagram illustrating a state where the separating operation is performed after the developing cartridge 1B is attached to the drawer unit 90B. When the separating operation is performed, as illustrated in FIG. 23, the columnar elastic body 63B is deformed diagonally with respect to the first direction. Thus, the IC chip assembly 60B connected to the one end of the columnar elastic body 63B moves in the second direction relative to the casing connected to the other end of the columnar elastic body 63B. Thus, the position of the casing in the second direction can be changed without changing the position of the electric contact surface 611B in the second direction relative to the drawer unit 90B. That is, the separating operation can be performed in a state where the contact state between the electric contact surface 611B and the electric connector 913B is maintained.

5-3. Third Modification

Figure 24:
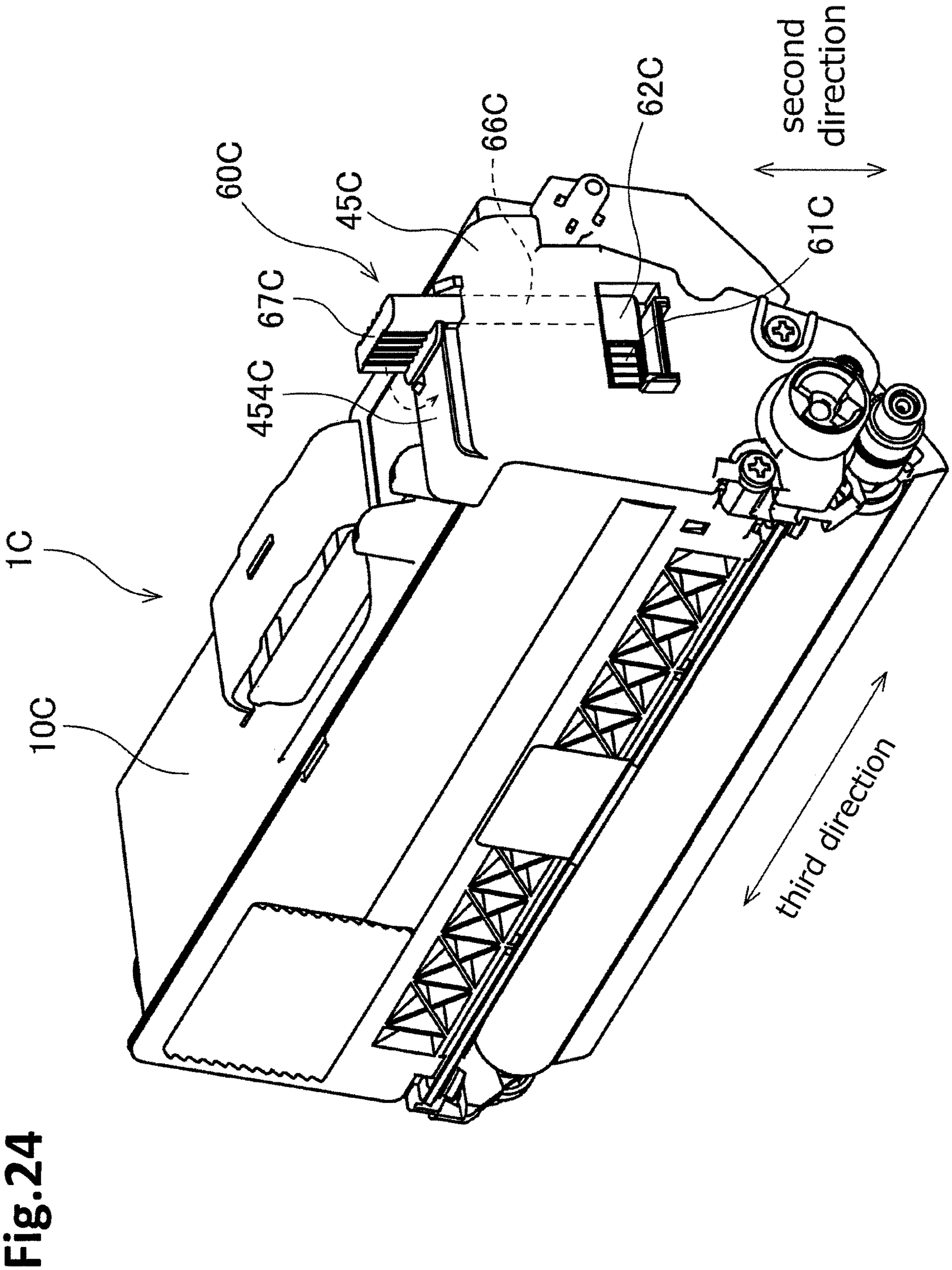
FIG. 24 is a perspective view of a developing cartridge according to a third modification.

In the following, a third modification of the main embodiment is discussed. Due to the many similarities between the third modification and the main embodiment only differences between the main embodiment and the third modification will be discussed. With regard to all other features, reference is made to the discussion of the main embodiment above. FIG. 24 is a perspective view of a developing cartridge 1C according to a third modification. In the third modification depicted in FIG. 24, an IC chip assembly 60C includes an IC chip 61C, a holder 62C, a shaft portion 66C, and a lever 67C. The shaft portion 66C extends in the second direction within a first cover 45C. The shaft portion 66C includes one end portion in the second direction, and the one end portion of the shaft portion 66C is mounted to the holder 62C so as to be incapable of rotating relative to the holder 62C. The shaft portion 66C includes other end portion in the second direction, and the another end portion is mounted to the lever 67C positioned outside the first cover 45C so as to be incapable of rotating relative to the lever 67C. Accordingly, as the lever 67C pivots about the shaft portion 66C as indicated by a dashed line arrow depicted in FIG. 24, the shaft portion 66C and the holder 62C also pivots about the shaft portion 66C. In the third modification, the third direction orthogonal to the electric contact surface 611C of the IC chip 61C is the same direction as the first direction. Accordingly, a position of the holder 62C in the first direction is changed.

Figure 25:
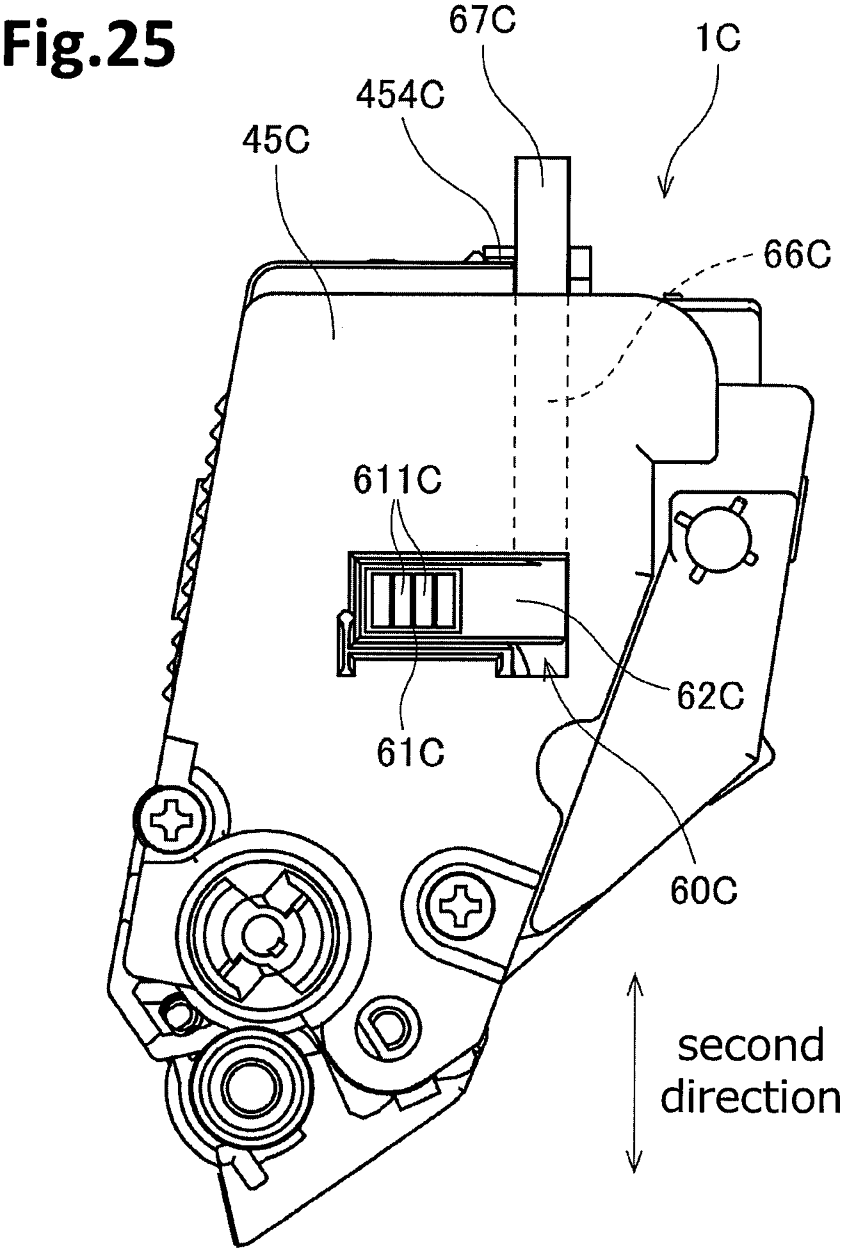
FIG. 25 is a view of the developing cartridge according to the third embodiment as viewed from one side thereof in a first direction.
Figure 26:
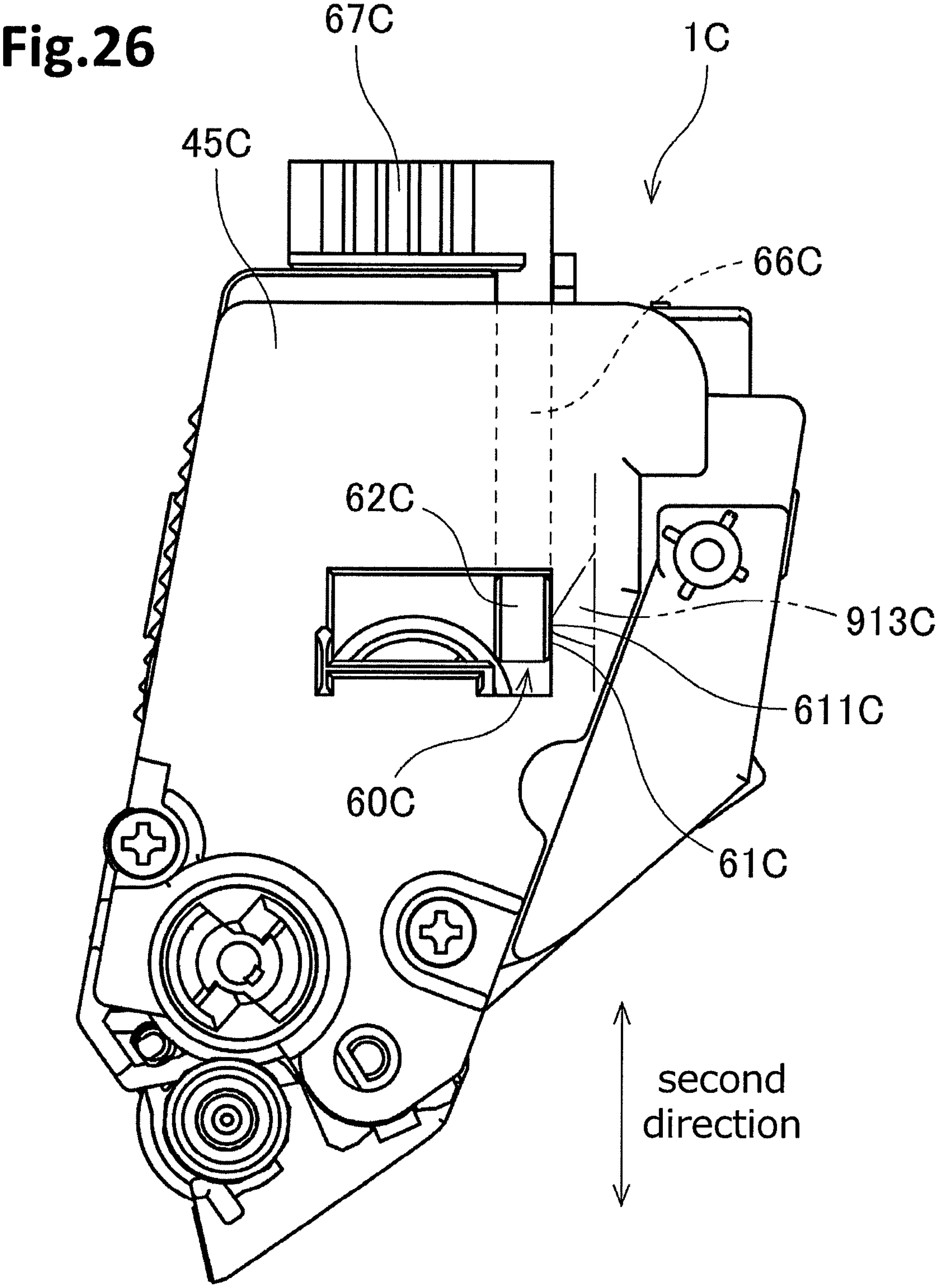
FIG. 26 is a view of the developing cartridge according to the third embodiment as viewed from the one side thereof in the first direction.
Figure 27:
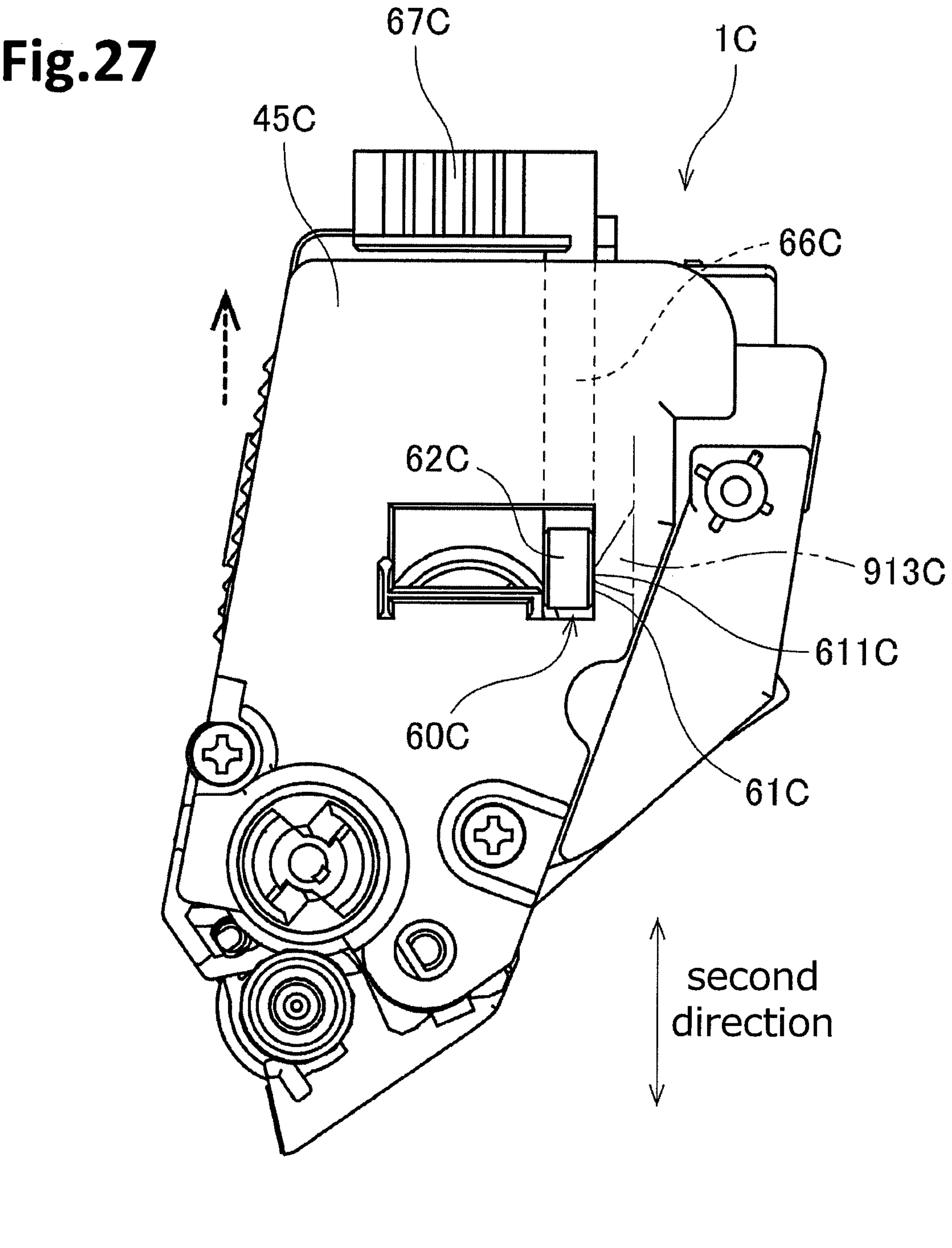
FIG. 27 is a view of the developing cartridge according to the third embodiment as viewed from the one side thereof in the first direction.

FIGS. 25 through 27 are views of the developing cartridge 1C according to the third modification as viewed in the third direction. Before the developing cartridge 1C is attached to the drawer unit, as illustrated in FIGS. 24 and 25, the IC chip 61C and the holder 62C are accommodated inside the first cover 45C. When the developing cartridge 1C is attached to the drawer unit and then the drawer unit is accommodated in the image forming apparatus, the lever 67C pivots about the shaft portion 66C. As a result, a portion of the holder 62C and the IC chip 61C protrude from the first cover 45C. Further, as illustrated in FIG. 27, the electric contact surface 611C of the IC chip 61C are in contact with an electric connector 913C of the drawer unit.

The lever 67C may be manually operated by a user after the developing cartridge 1C is attached to the drawer unit. Alternatively, the lever 67C may be pivoted by a guide surface provided at a main body of the image forming apparatus when the drawer unit is attached into the main body of the image forming apparatus.

The first cover 45C includes a support surface 454C that can contact the lever 67C before the lever 67C pivots. In a state depicted in FIG. 25, one surface of the lever 67C in the second direction is in contact with the support surface 454C. Accordingly, the lever 67C, the shaft portion 66C, the holder 62C and the IC chip 61C as a whole are supported by the first cover 45C in the second direction. However, as illustrated in FIG. 26, as the lever 67C pivots, the lever 67C moves outside the support surface 454C. Accordingly, the one surface of the lever 67C in the second direction and the support surface 454C are not in contact with each other. Further, the holder 62C is held at a position depicted in FIG. 26, by a positioning member of the drawer unit. As a result, a state in which the electric contact surface 611C of the IC chip 61C and the electric connector 913C are in contact with each other is maintained.

Further, in the state depicted in FIG. 26, the one surface of the holder 62C in the second direction is not in contact with the first cover 45C. Accordingly, the lever 67C, the shaft portion 66C, the holder 62C and the IC chip 61C as a whole can move relative to the first cover 45C in the second direction. Consequently, as illustrated in FIG. 27, when the separating operation is performed, the casing 10C and the first cover 45C can move in the second direction in a state where the contact state between the electric contact surface 611C of the IC chip 61C and the electric connector 913C is maintained.

5-4. Fourth Modification

Figure 28:
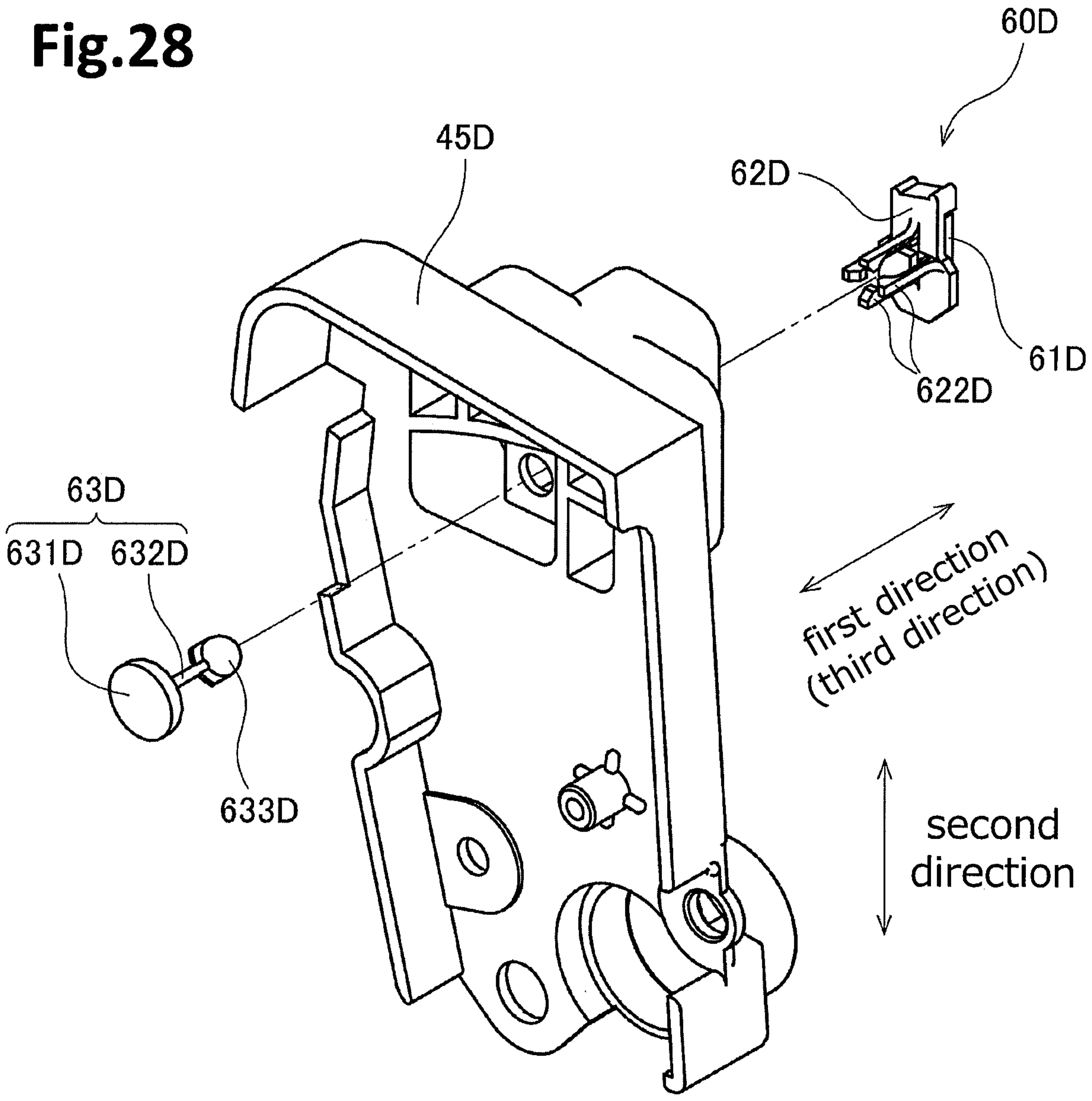
FIG. 28 is an exploded perspective view of a first cover and an IC (Integrated Circuit) chip assembly according to a fourth modification.
Figure 29:
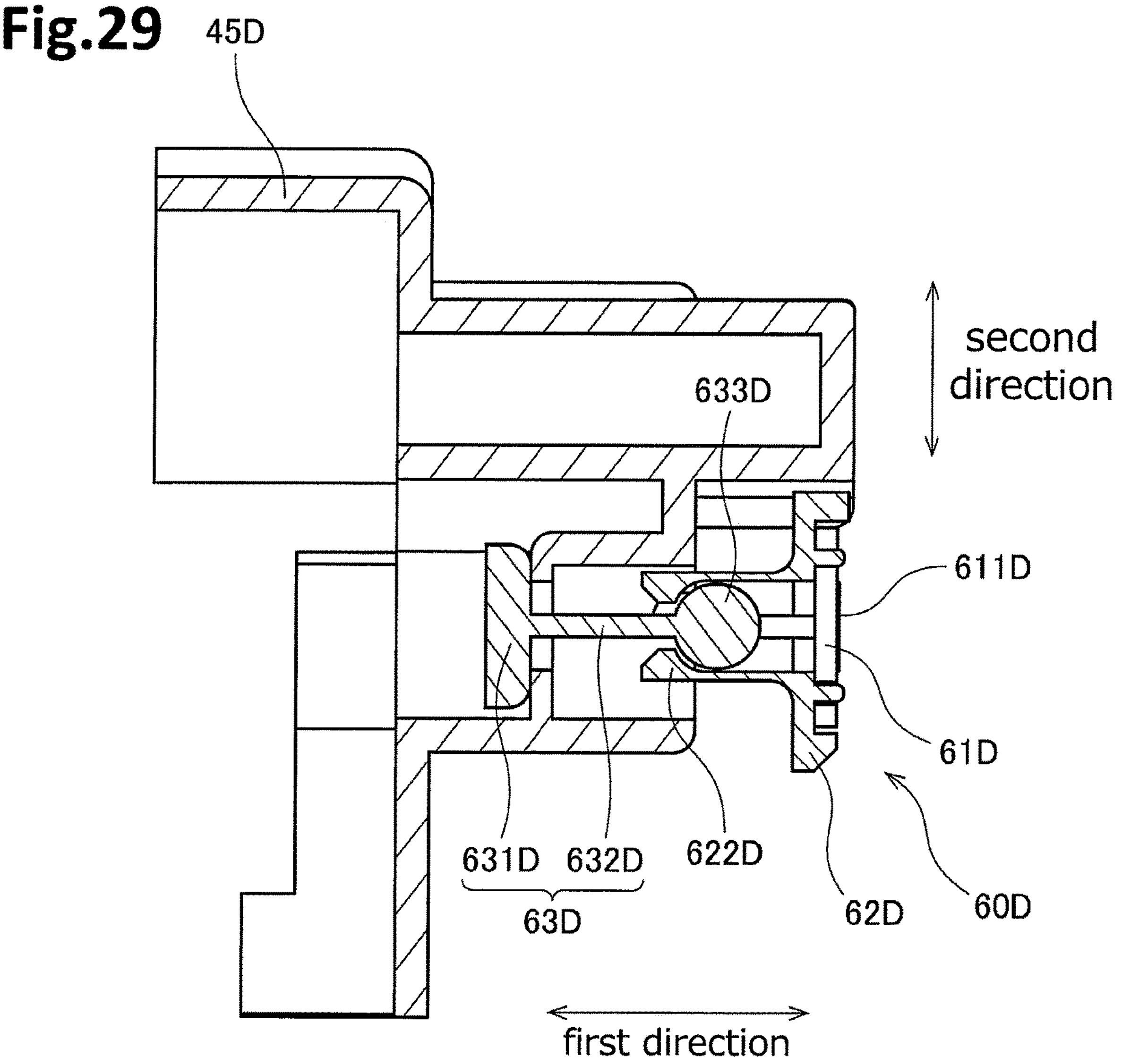
FIG. 29 is a cross-sectional view of the first cover and the IC chip assembly according to the fourth modification.

In the following, a fourth modification of the main embodiment is discussed. Due to the many similarities between the fourth modification and the main embodiment only differences between the main embodiment and the fourth modification will be discussed. With regard to all other features, reference is made to the discussion of the main embodiment above. FIG. 28 is an exploded perspective view illustrating a first cover 45D and an IC chip assembly 60D of the developing cartridge according to a fourth modification. FIG. 29 is a cross-sectional view illustrating the first cover 45D and the IC chip assembly 60D. In the fourth modification depicted in FIGS. 28 and 29, the electric contact surface 611D of the IC chip 61D are oriented to face in the third direction. Accordingly, the first direction orthogonal to the electric contact surfaces 611D is the same direction as the third direction.

As illustrated in FIGS. 28 and 29, the IC chip assembly 60D according to the fourth modification includes the IC chip 61D, the holder 62D holding the IC chip 61D, and a joint member 63D. The holder 62D includes a plurality of pawls 622D, and each of the plurality of pawls 622D extends away from the electric contact surfaces 611D in the first direction. In the fourth modification depicted in FIG. 28, the holder 62D has four pawls 622D. The joint member 63D includes a fixing portion 631D fixed to the first cover 45D, and an arm 632D extending from the fixing portion 631D toward the holder 62D in the first direction.

Figure 30:
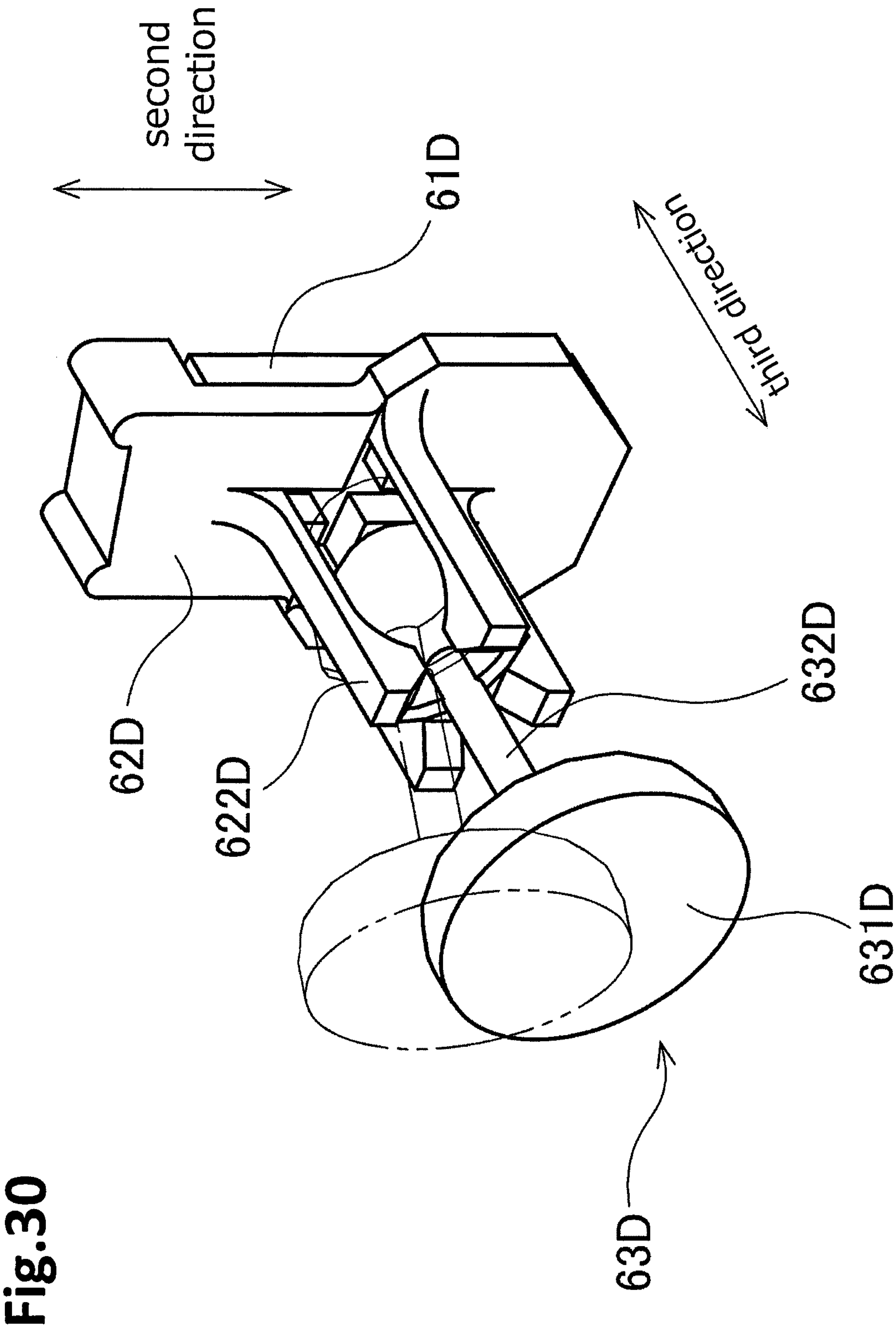
FIG. 30 is a perspective view of the IC chip assembly according to the fourth modification.

The arm 632D includes a distal end in the first direction, and a spherical portion 633D whose diameter is larger than a thickness of the arm 632D. The spherical portion 633D is positioned at the distal end of the arm 632D. The spherical portion 633D is held at a position inside of the holder 62D by the plurality of pawls 622D. With this configuration, as illustrated in FIG. 30, the arm 632D and the holder 62D are connected to each other so as to be rotatable relative to each other. That is, the IC chip 61D and the holder 62D are rotatable relative to each other about the spherical portion 633D. Accordingly, the position of the electric contact surfaces 611D of the IC chip 61D relative to the fixing portion 631D can be moved in the second direction. Therefore, when the separating operation of the developing cartridge is performed, the casing and the first cover 45D can move in the second direction in a state where the contact state between the electric contact surfaces 611D of the IC chip 61D and the electric connector is maintained.

Further, with the configuration depicted in FIGS. 28 through 30, the plurality of pawls 622D of the holder 62D and the arm 632D of the joint member 63D are movable relative to each other in the first direction. Thus, when the developing cartridge is inserted into the drawer unit, the IC chip 61D and the holder 62D can move relative to the fixing portion 631D in the first direction. Accordingly, the developing cartridge can be inserted, while the electric contact surfaces 611D of the IC chip 61D can be suppressed from being rubbed.

An elastic member such as a coil spring being stretched or compressed in the first direction may be positioned between the fixing portion 631D of the joint member 63D and the plurality of pawls 622D. An elastic member such as a coil spring being stretched or compressed in the first direction may be positioned between the first cover 45D and the plurality of pawls 622D. Accordingly, a repulsion force by the elastic member allows the electric contact surface 611D to reliably contact the electric connector.

Further, the arm 632D may be rotatably connected to the fixing portion 631D or the first cover 45D. For example, the arm 632D includes one spherical portion at one end of the arm 632D and another spherical portion at another end of the arm 632D. Either the one spherical portion or the other spherical portion may be rotatably held by a plurality of pawls of the first cover 45D. In this manner, when both ends of the arm 632D are rotatably connected, the position of the electric contact surface 611D in the second direction may be changed more flexibly.

5-5. Fifth Modification

Figure 31:
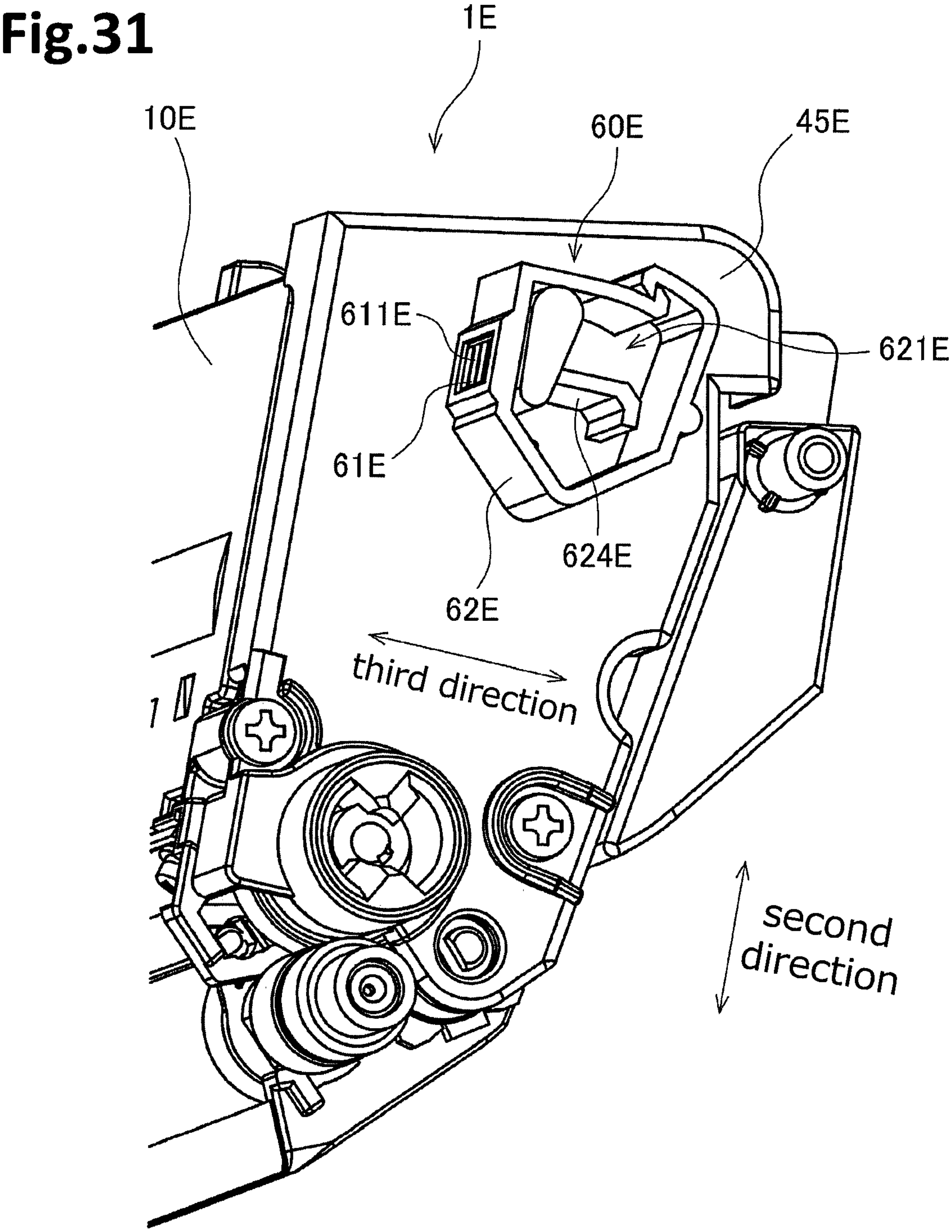
FIG. 31 is a partial perspective view of a developing cartridge according to a fifth modification.

In the following, a fifth modification of the main embodiment is discussed. Due to the many similarities between the fifth modification and the main embodiment only differences between the main embodiment and the fifth modification will be discussed. With regard to all other features, reference is made to the discussion of the main embodiment above. FIG. 31 is a partial perspective view of a developing cartridge 1E of the fifth modification. In the embodiment shown in FIG. 31, the holder 62E holding the IC chip 61E has a plate shape which has been deformed in a circular manner and whose ends are connected to each other. The holder 62E is made of a flexible resin, for example. Accordingly, in the embodiment shown in FIG. 31, the holder 62E itself is an elastic member which is stretched or compressed in the first direction. With this structure, a distance between both ends of the holder 62E in the first direction is changeable. Accordingly, when the developing cartridge 1E is inserted into the drawer unit, abrasion or wear of the electric contact surface 611E of the IC chip 61E can be suppressed.

In the embodiment shown in FIG. 31, the holder 62E is not necessarily configured by a plurality of members due to stretch and compression of the holder 62E in the first direction. The holder 62E is not necessarily comprised by an elastic member which is different from the member for holding the IC chip 61E.

Figure 32:
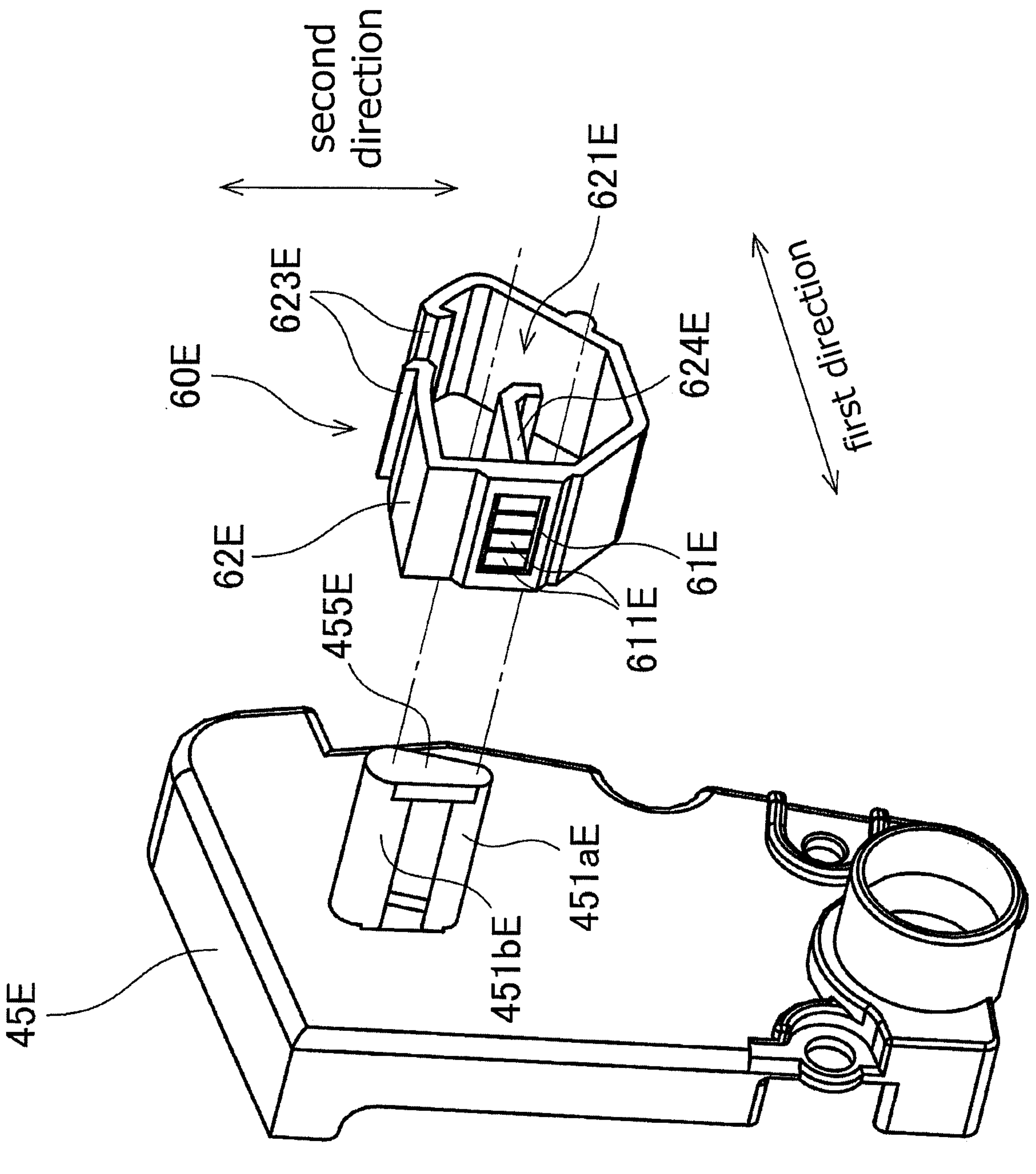
FIG. 32 is an exploded perspective view of the first cover and the IC chip assembly according to the fifth modification.

FIG. 32 is an exploded perspective view showing a first cover 45E and an IC chip assembly 60E of the fifth modification. As shown in FIG. 32, the first cover 45E includes a boss 451*a*E extending in the third direction and a boss 451*b*E extending in the third direction. The boss 451*a*E and the boss 451*b*E are aligned in the second direction. And, the first cover 45E includes a connecting portion 455E which connects a top of the boss 451*a*E and a top of the boss 451*b*E to each other.

The holder 62E extends in a ring shape surrounding the boss 451*a*E and the boss 451*b*E. And one pawl 623E positioned at one end of the holder 62E and another pawl 623E positioned at another end of the holder 62E are engaged with each other. Accordingly, a through-hole 621E is positioned at the inside of the holder 62E and the through-hole 621E penetrates through the holder 62E in the third direction. The boss 451*a*E and the boss 451*b*E are positioned inside of the through-hole 621E. The holder 62E further includes a plate portion 624E protruding from an inner surface of the holder 62E toward the through-hole 621E. The plate portion 624E is inserted between the boss 451*a*E and the boss 451*b*E.

The distance between the boss 451*a*E and the boss 451*b*E in the second direction is greater than the thickness of the plate portion 624E in the second direction. Therefore, the holder 62E is able to relatively move together with the plate portion 624E with respect to the casing 10E and the first cover 45E in the second direction. When the holder 62E moves in the second direction, the IC chip 61E having the electric contact surface 611E moves together with the holder 62E in the second direction.

The size of the through-hole 621E in the first direction is greater than the sizes of each of the boss 451*a*E and the boss 451*b*E in the first direction. Therefore, the holder 62E is movable with respect to the casing 10E and the first cover 45E in the first direction. When the holder 62E moves in the first direction, the IC chip 61E having the electric contact surface 611E moves together with the holder 62E in the first direction.

When the developing cartridge 1E is attached to the drawer unit, the holder 62E is nipped by the guide plates of the drawer unit and the holder 62E is compressed in the first direction. Specifically, when the one pawl 623E and the other pawl 623E approach each other, an urging force exerting in the direction to separate the one pawl 623E and the other pawl 623E from each other is generated. The electric contact surface 611E of the IC chip 61E is in contact with the electric connector in a state where the holder 62E is elastically deformed. The electric contact surface 611E is fixed to the electric connector due to the urging force in a state where the electric contact surface 611E is in contact with the electric connector. And, in the separating operation, the casing 10E moves in the second direction in a state where the contact between the electric contact surface 611E and the electric connector is maintained.

With the above configuration, when the developing cartridge 1E is attached to the drawer unit and the casing 10E is inclined in the first direction, the boss 451*a*E and the boss 451*b*E are able to move in the first direction inside the through-hole 621E. After the developing cartridge 1E is attached to the drawer unit and the separating operation is performed, the boss 451*a*E and the boss 451*b*E are able to move in the second direction inside the through-hole 621E. As a result, the position of the casing 10E can be changed in a state where the contact condition between the electric contact surface 611E and the electric connector is maintained in a good manner.

The number of the bosses provided at the first cover 45E may be one, two, three or more than three.

5-6. Sixth Modification

Figure 33:
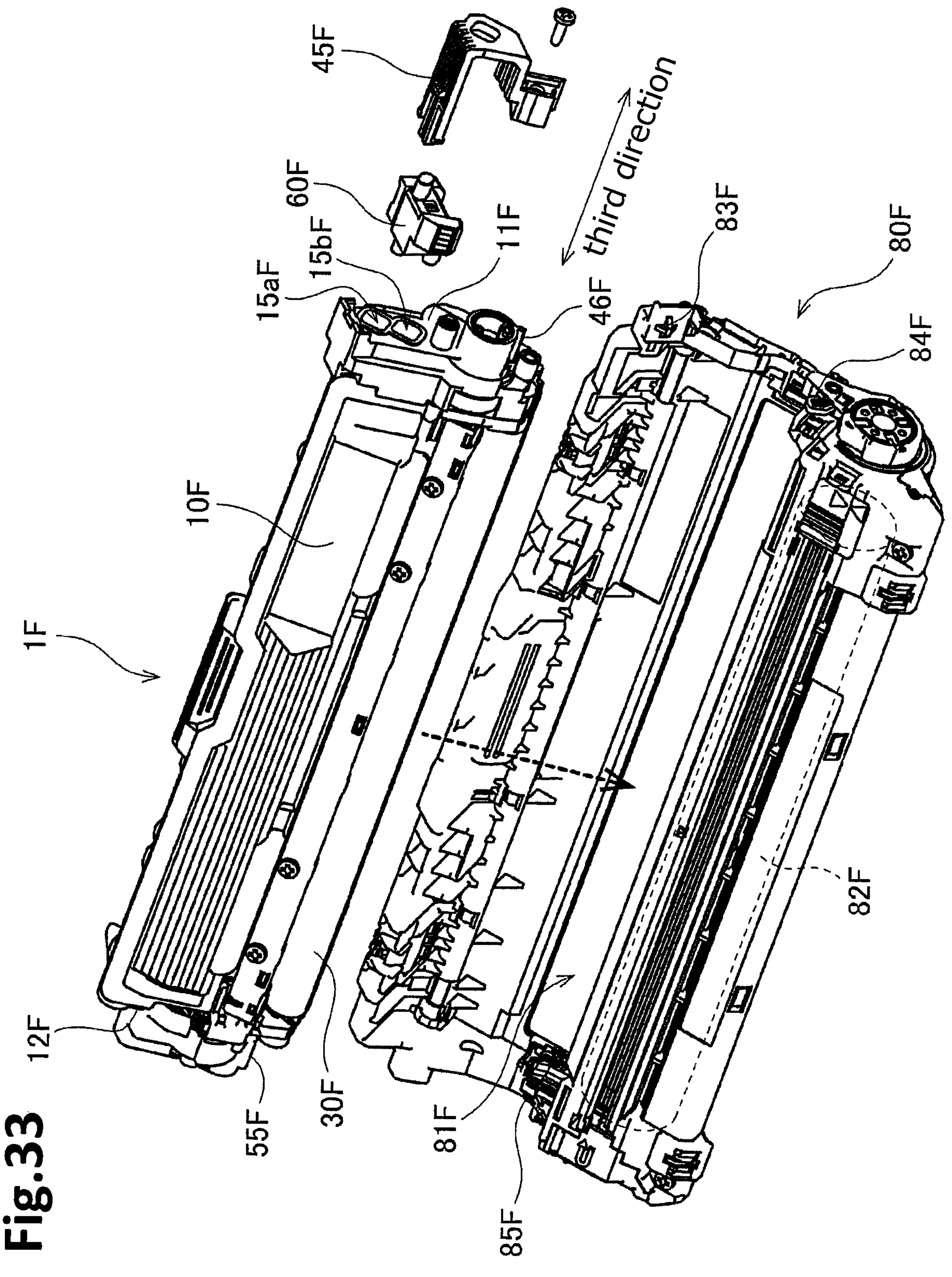
FIG. 33 is a perspective view of a developing cartridge and a drum cartridge according to a sixth embodiment.

In the following, a sixth modification of the main embodiment is discussed. Due to the many similarities between the sixth modification and the main embodiment only differences between the main embodiment and the sixth modification will be discussed. With regard to all other features, reference is made to the discussion of the main embodiment above. FIG. 33 is a perspective view showing a developing cartridge 1F and a drum cartridge 80F of the sixth modification. The developing cartridge 1F shown in FIG. 33 includes a casing 10F, a developing roller 30F, an IC chip assembly 60F, and a first cover 45F. In the embodiment shown in FIG. 33, the developing cartridge 1F is attached to the drum cartridge 80F instead of the drawer unit. The drum cartridge 80F includes one developing cartridge holding portion 81F holding the developing cartridge 1F. The developing cartridge holding portion 81F includes a photosensitive drum 82F. When the developing cartridge 1F is attached to the drum cartridge 80F, the developing roller 30F of the developing cartridge 1F is in contact with the photosensitive drum 82F.

Figure 34:
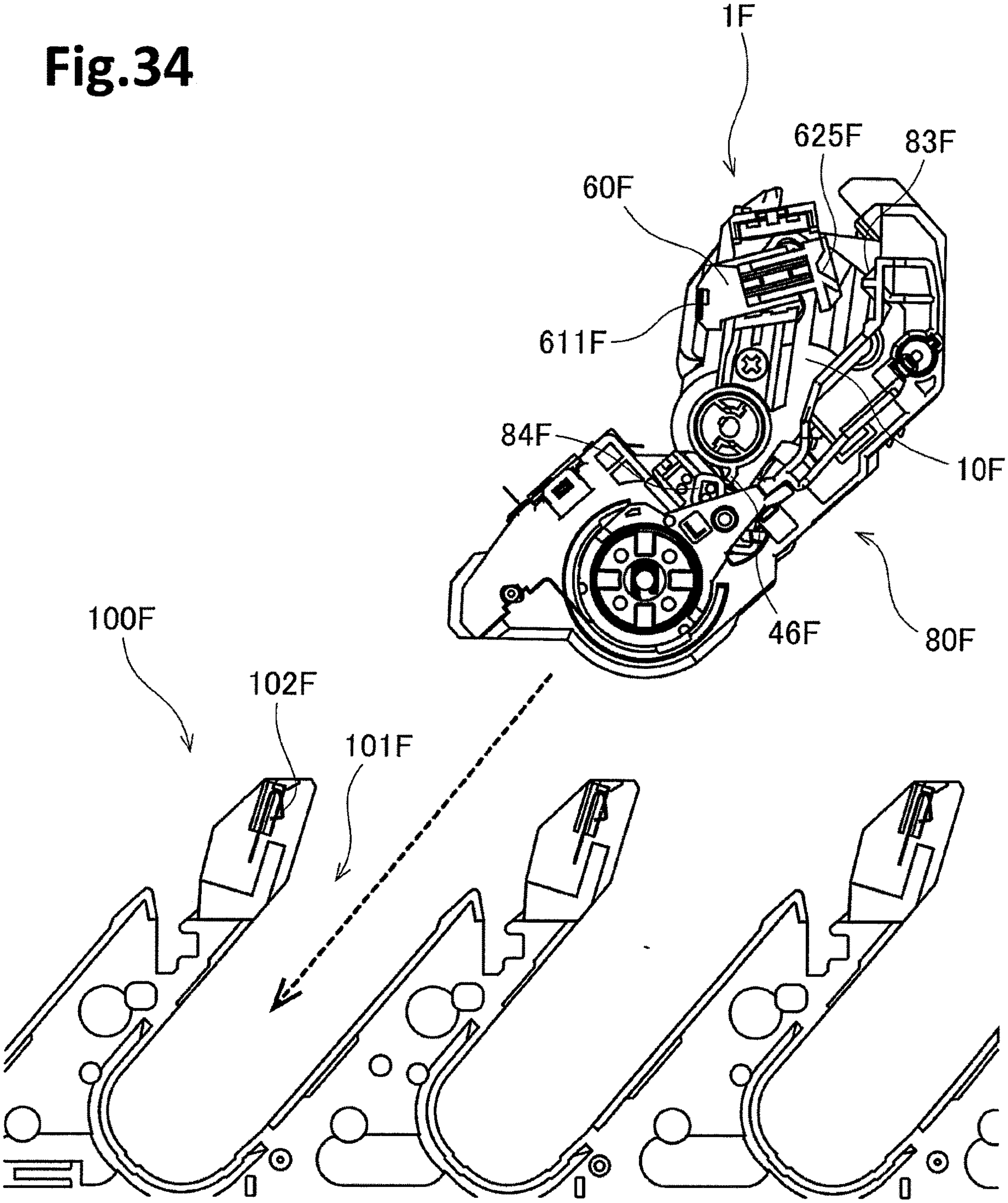
FIG. 34 is a view illustrating attachment of the drum cartridge to an image forming apparatus according to the sixth embodiment.

FIG. 34 is a view showing how to attach the drum cartridge 80F to an image forming apparatus 100F in a state where the developing cartridge 1F is attached to the drum cartridge 80F. As shown in FIG. 34, the drum cartridge 80F is attached to a drum cartridge holding portion 101F provided in the image forming apparatus 100F in a state where the developing cartridge 1F is attached to the drum cartridge 80F.

Figure 35:
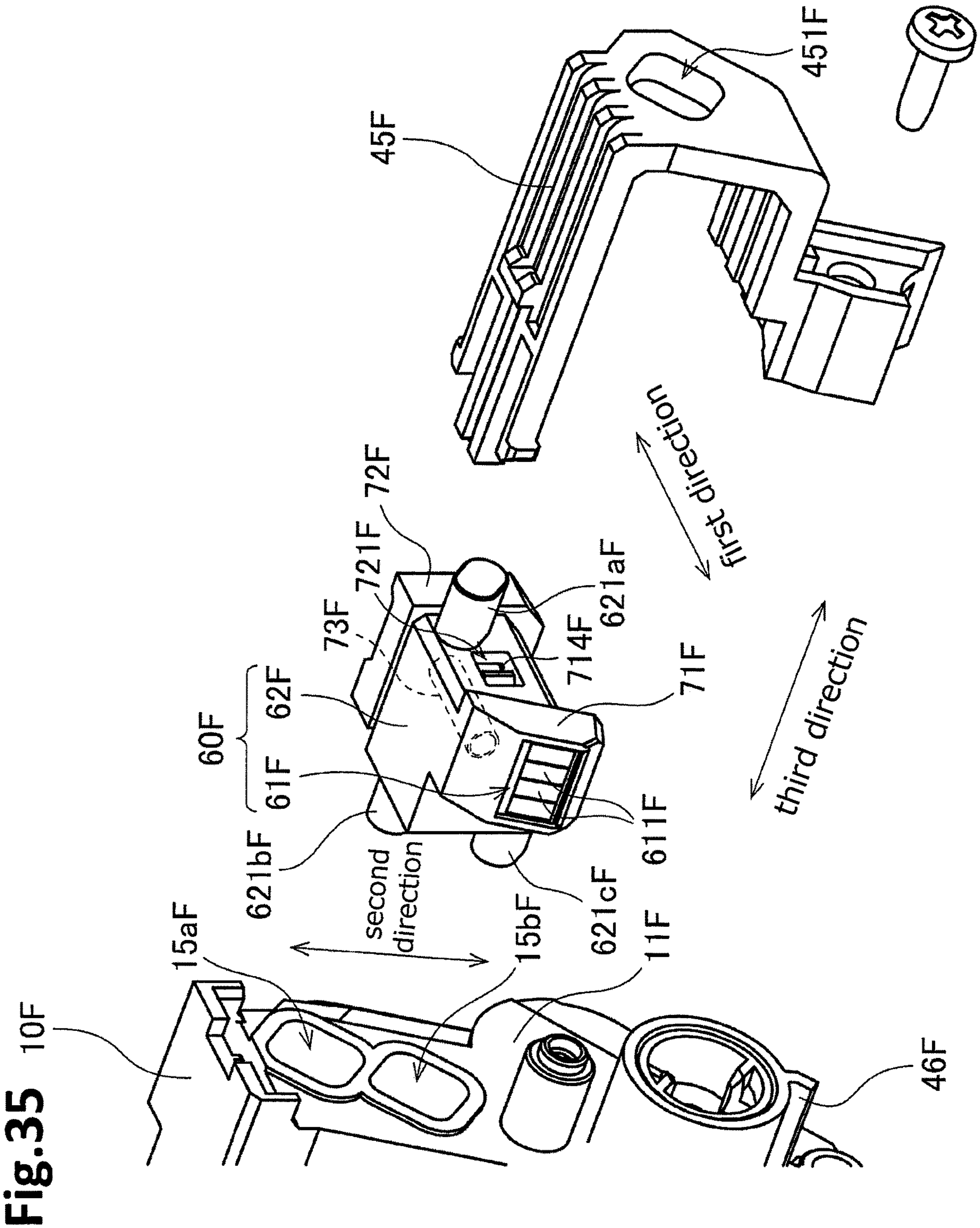
FIG. 35 is an exploded perspective view of the IC chip assembly and components ambient thereto according to the sixth embodiment.

In the above manner, the similar structure to that of the IC chip assemblies according to the above embodiment or the first to fifth modifications respectively can be applied to the developing cartridge 1F to be attached to the drum cartridge 80F. FIG. 35 is an exploded perspective view showing a detail of the IC chip assembly 60F of the developing cartridge 1F. As shown in FIG. 35, the IC chip assembly 60F of the developing cartridge 1F includes an IC chip 61F as a storage medium and a holder 62F holding the IC chip 61F. The first cover holds the holder 62F at a side of the casing 10F in the third direction.

The holder 62F includes a first holder member 71F, a second holder member 72F, and a coil spring 73F. The coil spring 73F is an elastic member that can be stretched or compressed in the first direction.

The first holder member 71F includes a boss 621*a*F, a boss 621*b*F, and a boss 621*c*F. The boss 621*a*F extends in the third direction toward the first cover 45F from a certain surface of the first holder member 71F, and the certain surface faces the first cover 45F. On the other hand, the first cover 45F has a through-hole 451F. The through-hole 451F penetrates through the first cover 45F in the third direction. The boss 621*a*F is inserted through the through-hole 451F.

Each of the boss 621*b*F and the boss 621*c*F extends in the third direction toward the casing 10F from a certain surface of the first holder member 71F, and the certain surface faces casing 10F. On the other hand, the casing 10F includes a recessed portion 15*a*F and a recessed portion 15*b*F. Each of the recessed portion 15*a*F and the recessed portion 15*b*F is recessed from the first outer surface 11F of the casing 10F in the third direction. The boss 621*b*F is inserted through the recessed portion 15*a*F. The boss 621*c*F is inserted through the recessed portion 15*b*F.

The through-hole 451F has a size (inner dimension) in the second direction greater than a size (outer dimension) of the boss 621*a*F in the second direction. The recessed portion 15*a*F has a size (inner dimension) in the second direction greater than a size (outer dimension) of the boss 621*b*F in the second direction. Further, the recessed portion 15*b*F has a size (inner dimension) in the second direction greater than a size (outer dimension) of the boss 621*c*F in the second direction. Hence, the holder 62F can move in the second direction relative to the casing 10F and the first cover 45F, together with the bosses 621*a*F, 621*b*F, and 621*c*F. As the holder 62F moves in the second direction, the IC chip 61F including the electric contact surface 611F also moves in the second direction, together with the holder 62F.

The through-hole 451F has a size (inner dimension) in the first direction greater than a size (outer dimension) of the boss 621*a*F in the first direction. The recessed portion 15*a*F has a size (inner dimension) in the first direction greater than a size (outer dimension) of the boss 621*b*F in the first direction. Further, the recessed portion 15*b*F has a size (inner dimension) in the first direction greater than a size (outer dimension) of the boss 621*c*F in the first direction. Hence, the holder 62F can move in the first direction relative to the casing 10F and the first cover 45F, together with the boss 621*a*F, boss 621*b*F, and boss 621*c*F. As the holder 62F moves in the first direction, the IC chip 61F including the electric contact surface 611F also moves in the first direction, together with the holder 62F.

As shown in FIG. 34, the second holder member 72F includes a recess portion 625F. On the other hand, the drum cartridge 80F includes a convex portion 83F. The recess portion 625F and the convex portion 83F face each other in the first direction. The size of the recess portion 625F gradually enlarges while progressing away from the IC chip 61F in the first direction. The size of the convex portion 83F gradually diminishes while progressing toward a top of the convex portion 83F in the first direction.

As shown in FIG. 34, the image forming apparatus 100F includes an electric connector 102F. When the drum cartridge 80F is inserted into the image forming apparatus 100F in a state where the developing cartridge 1F is attached to the drum cartridge 80F, the first holder member 71F is brought into contact with a component of the image forming apparatus 100F. The convex portion 83F of the drum cartridge 80F is fitted in the recess portion 625F of the second holder member 72F. Therefore, the position of the second holder member 72F relative to the drum cartridge 80*f* is fixed. As a result, the holder 62F is nipped between the component of the image forming apparatus 100F and the drum cartridge 80F, whereby the coil spring 73F is compressed in the first direction. When the drum cartridge 80F is further inserted into the image forming apparatus 100F, the electric contact surfaces 611F of the IC chip 61F are brought into contact with the one or more of electric connectors 102F.

The IC chip 61F is brought into contact with the electric connector 102F, while receiving a repulsion force from the coil spring 73F. The holder 62F is nipped between the electric connector 102F and the convex portion 83F. In this way, the holder 62F is positioned relative to the image forming apparatus 100F and the drum cartridge 80F.

As shown in FIG. 35, the second holder member 72F includes a pawl 714F. The pawl 714F protrudes from the second holder member 72F in a direction that crosses the first direction. In the example of FIG. 35, the pawl 714F protrudes in the third direction from the second holder member 72F. The first holder member 71F has an opening 721F. The pawl 714F is inserted through the opening 721F. This prevents the first holder member 71F from being detached from the second holder member 72F.

The casing 10F of the developing cartridge 1F includes a first rib 46F and a second rib The first rib 46F protrudes from the first outer surface 11F in the third direction. The second rib 55F protrudes from the second outer surface 12F in the third direction. The drum cartridge 80F includes a first lever 84F and a second lever 85F. During the separating operation, the first lever 84F and second lever 85F are operated by a driving force supplied from the image forming apparatus, whereupon the first rib 46F is pushed by the first lever 84F and the second rib 55F is pushed by the second lever 85F. This operation changes the positions of the first rib 46F and second rib 55F. As a result, the casing 10F of the developing cartridge 1F and the developing roller 30F move in the second direction and move away from the photosensitive drum 92.

As described above, also in the developing cartridge 1F, the position of the holder 62F can be changed in the second direction relative to the casing 10F. Accordingly, the position of the casing 10F in the second direction can be changed, while the positions of the electric contact surface 611F relative to the electric connector 102F in the second direction being maintained, that is, the positions of the electric contact surface 611F relative to the electric connector 102F in the second direction being unchanged. Therefore, it is possible to perform the separating operation, while maintaining the electric contact surface 611F and electric connector 102F in contact with each other. Accordingly, abrasion or wear of the electric contact surface 611F can be suppressed.

Also in the developing cartridge 1F, the electric contact surfaces 611F are movable relative to the casing 10F in the first direction. Accordingly, when the drum cartridge 80F is attached to the image forming apparatus 100F, abrasion or wear of the electric contact surface 611F can be suppressed.

5-7. Other Modifications

In the above-described embodiments, the IC chip including the electric contact surfaces is fixed to the outer surface of the holder. However, only the electric contact surfaces of the IC chip that serve to contact the electric connectors may be fixed to the outer surface of the holder, but portions of the IC chip other than the electric contact surfaces may be positioned at other portions of the developing cartridge.

According to the above-described embodiments, the plural gears provided within each of the first gear portion and the second gear portion are engaged with one another through meshing engagement of the gear teeth. However, the plural gears provided within each of the first gear portion and the second gear portion may be engaged with one another through a frictional force. For example, instead of the plural gear teeth, frictional members, such as rubber members, may be provided to the outer circumferences of two gears that engage with each other.

According to the above-described embodiments, the developing cartridge can be attached to the drawer unit of the image forming apparatus. However, the developing cartridge may be attached to the image forming apparatus which does not include the drawer unit.

Shapes of the details in the developing cartridge may differ from those shown in the drawings attached to this application. The respective components employed in the above-described embodiment and modifications can be selectively combined together within an appropriate range so that no inconsistency will arise.

What is claimed is:

1. A developing cartridge comprising:

a developing roller rotatable about a first axis extending in a first direction;

a casing configured to accommodate developer therein;

a storage medium including an electric contact surface;

a holder including a first end portion and a second end portion being separated from the first end portion in a second direction which crosses the electric contact surface, the electric contact surface being positioned at the first end portion of the holder, an elastic member configured to be compressed or stretched between a first state and a second state, the elastic member being positioned between the first end portion and the second end portion in the second direction;

wherein the second end portion is movable relative to the casing in the second direction when the elastic member is compressed or stretched between the first state and the second state.

2. The developing cartridge according to claim 1, wherein the elastic member is a spring.

3. The developing cartridge according to claim 2, wherein the elastic member is a coil spring.

4. The developing cartridge according to claim 1, wherein the elastic member is configured to be compressed or stretched in the second direction.

5. The developing cartridge according to claim 1, further comprising:

a coupling rotatable about a second axis extending in the first direction, the coupling configured to receive driving force, the coupling positioned at the casing, and the coupling including a first gear; and a second gear engaging with the first gear, wherein the second gear is mounted to the developing roller.

6. The developing cartridge according to claim 5, wherein the coupling has a coupling hole depressed in the first direction.

7. The developing cartridge according to claim 1, wherein the developing cartridge is for use with an image forming apparatus.

8. The developing cartridge according to claim 7, wherein the image forming apparatus is a laser printer or an LED printer.

9. The developing cartridge according to claim 1, wherein the first end portion is connected to one end portion of the elastic member in the second direction, and wherein the second end portion is connected to another end portion of the elastic member in the second direction.

10. The developing cartridge according to claim 1, wherein the elastic member is configured to bias the first end portion in the second direction when the elastic member is compressed.

11. The developing cartridge according to claim 1, wherein the first end portion is movable relative to the casing in the second direction when the elastic member is compressed or stretched between the first state and the second state.

12. The developing cartridge according to claim 1, wherein the first end portion includes an outer surface positioned toward a side of the holder in the second direction, the electric contact surface being positioned at the outer surface, and wherein the outer surface includes a first inclined surface relative to the electric contact surface, the first inclined surface is positioned at one side of the electric contact surface in a third direction.

13. The developing cartridge according to claim 1, wherein the first end portion and the second end portion are movable relative to each other in the second direction when the elastic member is compressed or stretched between the first state and the second state.

14. The developing cartridge according to claim 1, wherein the elastic member is in the first state when the elastic member is compressed, and wherein the elastic member is in the second state when the elastic member is stretched.

15. The developing cartridge according to claim 1, wherein a length of the elastic member is greater in the first state than in the second state.

16. The developing cartridge according to claim 1, wherein the storage medium stores information regarding the developing cartridge.

17. The developing cartridge according to claim 1, wherein the second end portion is movable relative to the first end portion in the second direction when the elastic member is compressed or stretched between the first state and the second state.

* * * * *